(12) United States Patent
Goto et al.

(10) Patent No.: US 8,281,327 B2
(45) Date of Patent: Oct. 2, 2012

(54) MECHANISM TO LOAD DISC FROM CARTRIDGE TO RECORDING APPARATUS

(75) Inventors: Naofumi Goto, Kanagawa (JP); Takeharu Takasawa, Kanagawa (JP); Takeshi Kubo, Kanagawa (JP); Nobuhiko Tsukahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 12/942,074

(22) Filed: Nov. 9, 2010

(65) Prior Publication Data

US 2011/0119691 A1 May 19, 2011

(30) Foreign Application Priority Data

Nov. 16, 2009 (JP) ................................. 2009-261405

(51) Int. Cl.
*G11B 17/04* (2006.01)
*G11B 17/22* (2006.01)
(52) U.S. Cl. .................... 720/615; 369/30.83; 369/30.85
(58) Field of Classification Search .................. 720/614, 720/615; 369/30.68, 30.69, 30.7, 30.78, 369/30.83, 30.84, 30.85
See application file for complete search history.

(56) References Cited

U.S. PATENT DOCUMENTS

| | | | | | |
|---|---|---|---|---|---|
| 5,159,585 | A | * | 10/1992 | Ikedo et al. | 369/30.28 |
| 5,200,938 | A | * | 4/1993 | Akiyama et al. | 369/30.83 |
| 5,933,403 | A | * | 8/1999 | Kim et al. | 720/615 |
| 5,956,300 | A | * | 9/1999 | Chigasaki | 369/30.32 |
| 5,970,043 | A | * | 10/1999 | Fujisawa | 720/714 |
| 6,493,308 | B2 | * | 12/2002 | Takamatsu et al. | 369/178.01 |
| 6,744,704 | B1 | * | 6/2004 | Funaya et al. | 369/30.85 |
| 7,716,691 | B2 | * | 5/2010 | Tatekawa | 720/619 |
| 7,730,502 | B2 | * | 6/2010 | Goto | 720/615 |
| 8,136,129 | B2 | * | 3/2012 | Lee et al. | 720/614 |
| 2001/0036144 | A1 | * | 11/2001 | Goto et al. | 369/192 |
| 2002/0172108 | A1 | * | 11/2002 | Moreira et al. | 369/30.36 |
| 2003/0151986 | A1 | * | 8/2003 | Otsuki | 369/30.85 |
| 2006/0005217 | A1 | * | 1/2006 | Leonhardt et al. | 720/725 |
| 2006/0143625 | A1 | * | 6/2006 | Chuo | 720/614 |
| 2007/0201320 | A1 | * | 8/2007 | Suzuki et al. | 369/30.78 |
| 2011/0119691 | A1 | * | 5/2011 | Goto et al. | 720/601 |
| 2011/0296445 | A1 | * | 12/2011 | Takasawa et al. | 720/606 |
| 2011/0296451 | A1 | * | 12/2011 | Goto et al. | 720/740 |

FOREIGN PATENT DOCUMENTS

| JP | 2004-134019 A | 4/2004 |
|---|---|---|
| JP | 2007-115328 A | 5/2007 |
| JP | 2007-172726 A | 7/2007 |

* cited by examiner

*Primary Examiner* — Brian Miller
(74) *Attorney, Agent, or Firm* — Wolf, Greenfield & Sacks, P.C.

(57) ABSTRACT

A disc loading mechanism transporting a disc between a disc cartridge and a recording and reproducing apparatus includes: a loading arm having at a leading end thereof claw members which comes into contact with an outer circumference of the disc and performs drawing of the disc into the recording and reproducing apparatus and insertion of the disc into the disc cartridge; an arm driving mechanism which slides the loading arm in a disc transport direction; a disc extruding lever which extrudes the disc up to a contact position with the claw members when discharging the disc; and a lever driving mechanism which drives the extrusion lever, wherein each of the claw members includes a draw-in surface portion and an insertion surface portion provided at the opposite side to the draw-in surface portion.

8 Claims, 42 Drawing Sheets

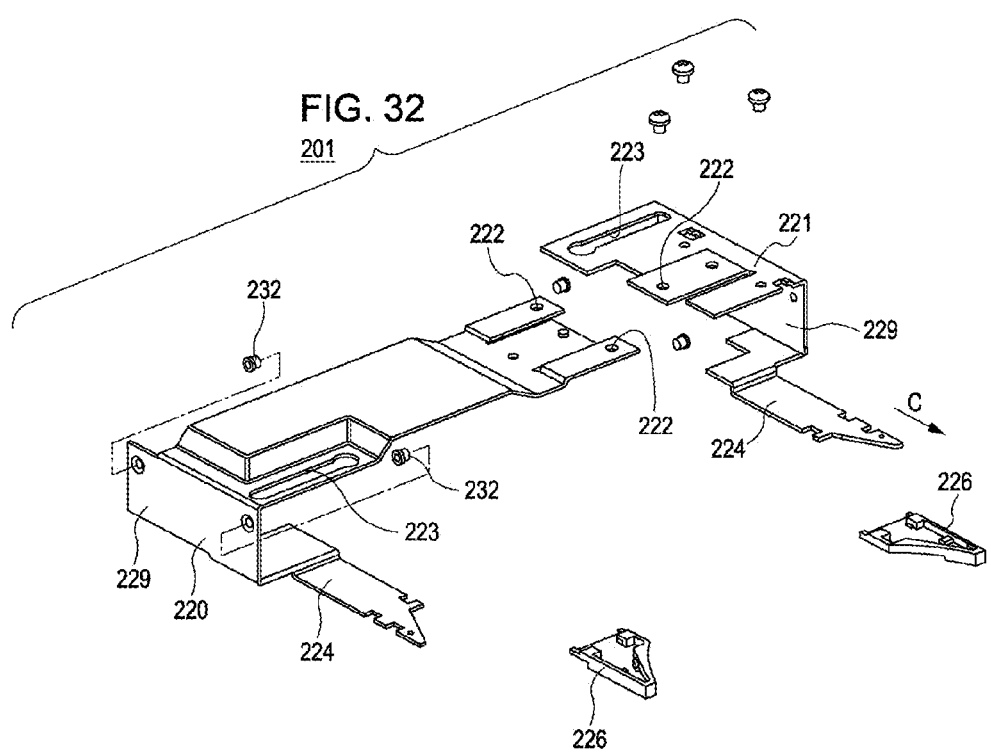

203, 204

MECHANISM TO LOAD DISC FROM CARTRIDGE TO RECORDING APPARATUS

BACKGROUND OF THE INVENTION

1. Field of the Invention

The present invention relates to a disc loading mechanism which ejects a disc from a disc cartridge which stores discs without using a disc tray, and in particular, to a disc loading mechanism of a disc cartridge in which insertion and ejection of a disc can be performed by separating a cartridge main body.

2. Description of the Related Art

In the past, various drive apparatuses for a disc cartridge in which an optical disc is stored have been provided. This kind of disc drive apparatus is provided with a shutter opening and closing mechanism which draws a cartridge main body into an apparatus main body and also opens a shutter that blocks an opening portion for recording and reproducing formed in the cartridge main body. Then, in the disc drive apparatus, by opening of the opening portion for recording and reproducing, an optical pickup mechanism faces in the radial direction of the optical disc, thereby performing writing and/or reading of an information signal.

However, in recent years, recording capacity of a disc-like recording medium has been dramatically increased, thereby having the capacity necessary to store the amount of information which is handled at the individual level. On the other hand, even in a case where an ultra-multilayer disc or a volumetric recording disc, in which a practical application is expected in the future, is applied to a cloud computer data center or a system in which the recording and storage of large-volume data are necessary, in a case where like a Blu-ray Disc (BD) or a Professional Disc, a disc is stored in a cartridge one by one, recording capacity in one cartridge will be insufficient in the future.

Also, if it is tried to configure a data center by using a disc loader machine or a cart machine, which deals with a number of disc cartridges, each of which stores a high-capacity disc, an increase in space use efficiency is insufficient.

As its solution, configurations in which a number of sheet-like discs are stored in one cartridge are proposed in Japanese Unexamined Patent Application Publication Nos. 2004-134019 (Patent Document 1), 2007-115328 (Patent Document 2), and 2007-172726 (Patent Document 3). However, in such configurations, the same number of dedicated disc trays as the number of discs which can be stored is necessary, thereby causing increases in size and weight of a cartridge main body and a drive apparatus, into which the cartridge main body is inserted. Also, on the disc drive apparatus side which drives the disc, a mechanism which transports the disc tray and also ejects only the disc from the disc tray is necessary or the like, so that a disc loading mechanism is complicated and increased in size. Also, a mechanism for stabilizing the rotation of the sheet-like disc is necessary or the like, so that problems such as increases in size and cost of an apparatus main body also arise.

SUMMARY OF THE INVENTION

Therefore, in a loading mechanism for a disc cartridge in which discs are stored without using a disc tray, it is desirable to provide a disc loading mechanism which transports the disc stored in a cartridge main body into an apparatus main body and transports the disc from the apparatus main body to the inside of the cartridge main body, with a simple configuration.

According to an embodiment of the present invention, there is provided a disc loading mechanism which transports a disc between a disc cartridge which stores the disc so as to be able to slide in a disc surface direction and in which the disc is inserted or ejected in the surface direction and a recording and reproducing apparatus, the loading mechanism including: a loading arm provided at a leading end with claw members which come into contact with an outer circumference of the disc and performs drawing of the disc into the recording and reproducing apparatus and insertion of the disc into the disc cartridge; an arm driving mechanism which slides the loading arm in a transport direction of the disc; a disc extruding lever which extrudes the disc up to a position where the claw members can come into contact with the disc, at the time of ejection of the disc; and a lever driving mechanism which drives the disc extruding lever, wherein each of the claw members includes a draw-in surface portion which comes into contact with a rear side in an extrusion direction of the outer circumference of the disc extruded by the disc extruding lever, at the time of the drawing of the disc into the recording and reproducing apparatus, and an insertion surface portion which is provided at the opposite side to the draw-in surface portion and comes into contact with a rear side in an insertion direction of the outer circumference of the disc at the time of the insertion of the disc into the disc cartridge.

The disc loading mechanism according to an embodiment of the present invention includes the extrusion lever which extrudes a disc from the disc cartridge in which the disc is inserted and ejected by sliding the disc in a disc surface direction, and the loading arm having the claw members which draw in the extruded disc and insert the disc into the cartridge. Therefore, according to an embodiment of the present invention, a disc loading mechanism can be realized in which insertion and ejection of a disc can be performed without using a disc tray and with a simple configuration.

BRIEF DESCRIPTION OF THE DRAWINGS

FIGS. 4A and 4B are exterior perspective views showing the disc cartridge, wherein FIG. 4A shows the upper face side, and FIG. 4B shows the lower face side.

FIGS. 26A and 26B are perspective views showing a state where the optical disc is ejected from the lower shell, wherein FIG. 26A shows a state where an extrusion lever is guided to a guide portion and FIG. 26B shows a state where the extrusion lever is deviated from the guide portion, so that the optical disc is ejected up to a position where the optical disc is drawn in by a carrying loader.

FIG. 32 is an exploded perspective view showing a loading arm.

FIGS. 41A and 41B are diagrams showing a slide limiter mechanism in an ordinary push-back process, wherein FIG. 41A is a perspective view and FIG. 41B is a cross-sectional view.

FIGS. 42A and 42B are diagrams showing the slide limiter mechanism in a state where movement of the loading arm is restricted in the push-back process, wherein FIG. 42A is a perspective view and FIG. 42B is a cross-sectional view.

DESCRIPTION OF THE PREFERRED EMBODIMENTS

Hereinafter, a disc cartridge and a disc changer apparatus, to which the present invention is applied, will be described in detail with reference to the drawings. In addition, the description is done in the following order.

Figure 1:
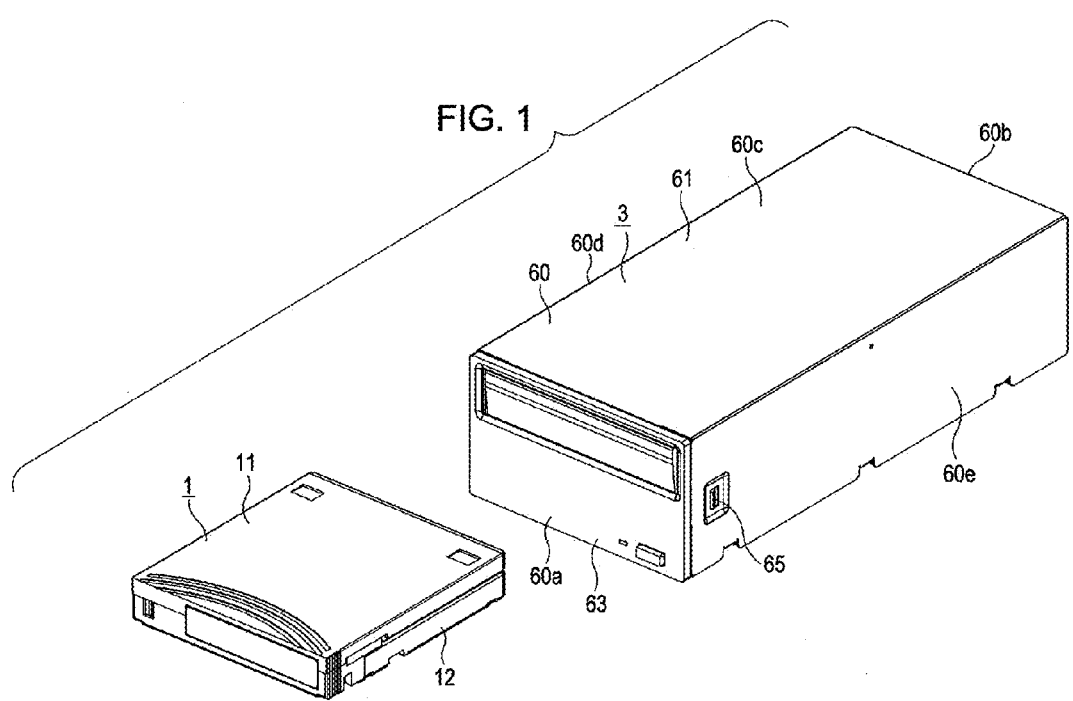
FIG. 1 is an exterior perspective view showing a disc cartridge and a disc changer apparatus.
Figure 2:
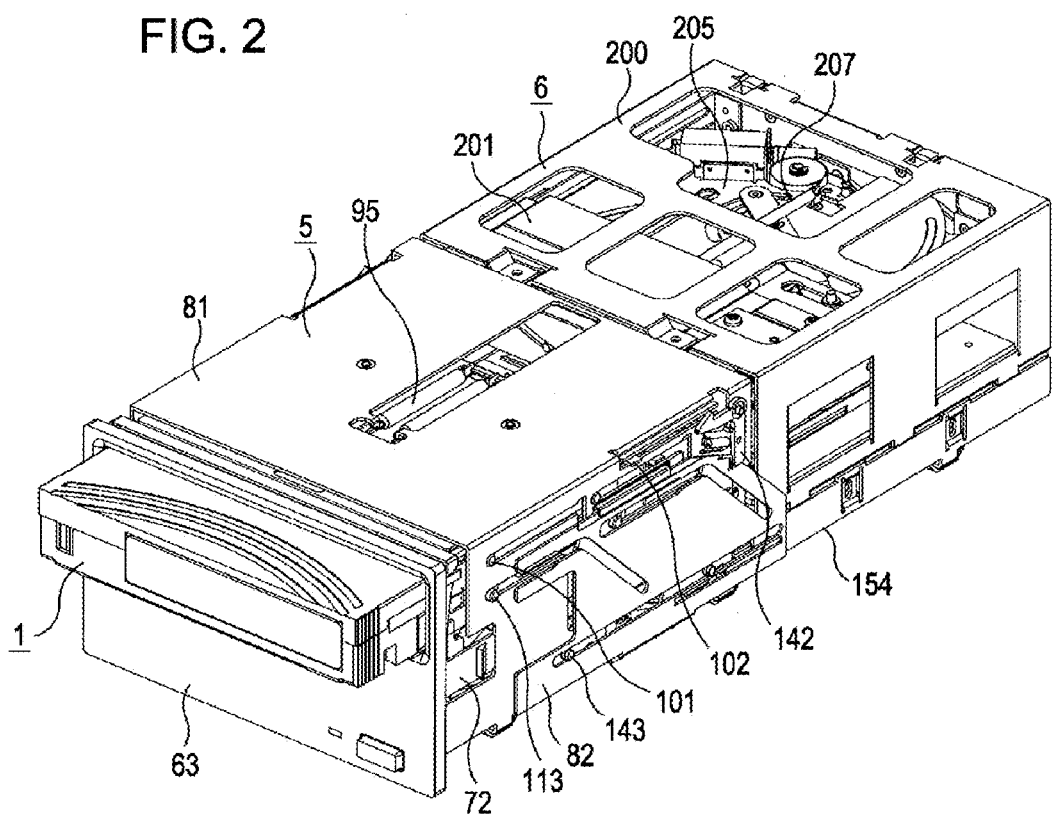
FIG. 2 is an exterior perspective view showing the disc changer apparatus.
Figure 3:
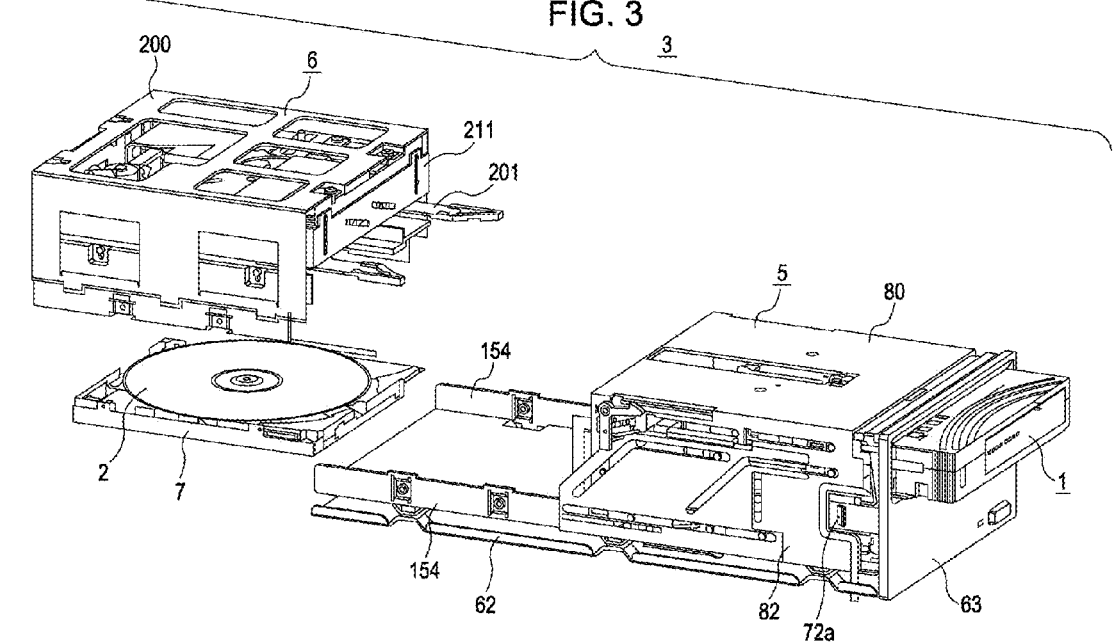
FIG. 3 is an exploded perspective view showing the disc changer apparatus.

1. Disc Cartridge
1-1. Upper Shell
1-2. Lower Shell
2. Disc Changer Apparatus
2-1. Apparatus Main Body
2-2. Selection Loader
2-3. Carrying Loader
2-4. Operation of Disc Changer Apparatus The disc cartridge and the disc changer apparatus, to which the present invention is applied, include a disc cartridge 1 which stores a plurality of optical discs 2, each of which is a disc-shaped recording medium, and a disc changer apparatus 3, in which the disc cartridge 1 is mounted and which selectively transports the optical disc 2, as shown in FIG. 1. The disc changer apparatus 3 in a state where a top cover 61 is removed is shown in FIGS. 2 and 3. As shown in FIGS. 2 and 3, the disc changer apparatus 3 includes a selection loader 5 which ejects the optical disc 2, in which recording or reproducing of an information signal is performed, out of a plurality of optical discs 2 stored in the disc cartridge 1, and a carrying loader 6 which draws in the optical disc 2 ejected from the selection loader 5 and transports the optical disc to a recording and reproducing apparatus 7.

When the disc cartridge 1 is inserted into the disc changer apparatus 3, the disc changer apparatus divides upper and lower shells 11 and 12 of the disc cartridge 1 by the selection loader 5, thereby discharging the optical disc 2, and transports the optical disc 2 up to a position where the optical disc can be chucked to the recording and reproducing apparatus 7, by the carrying loader 6. Also, if writing or reading of an information signal with respect to the optical disc 2 is finished, the disc changer apparatus 3 inserts the optical disc 2 into the disc cartridge 1 mounted on the selection loader 5 by the carrying loader 6 and combines the upper and lower shells 11 and 12 of the disc cartridge 1 and ejects the disc cartridge out of an apparatus main body by the selection loader 5.

1. Disc Cartridge

Figure 4A:
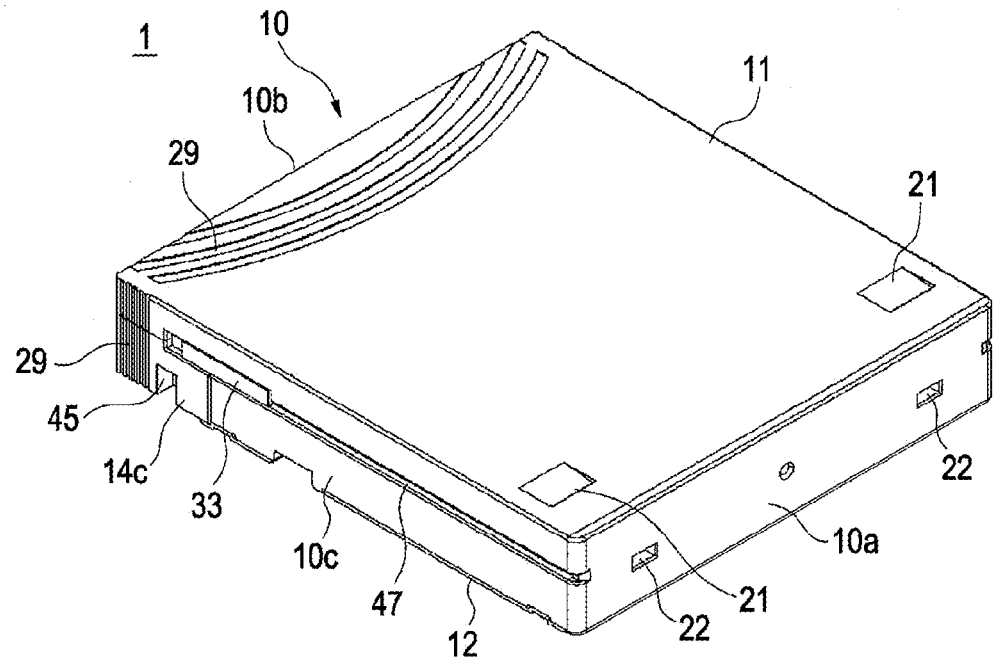
Figure 4B:
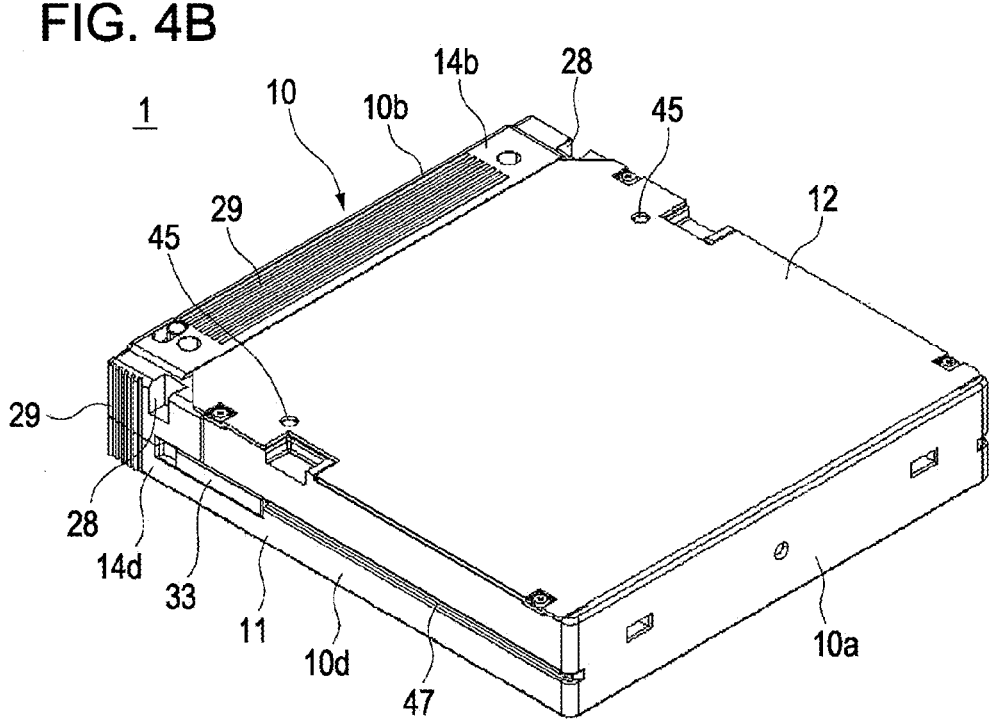
Figure 5:
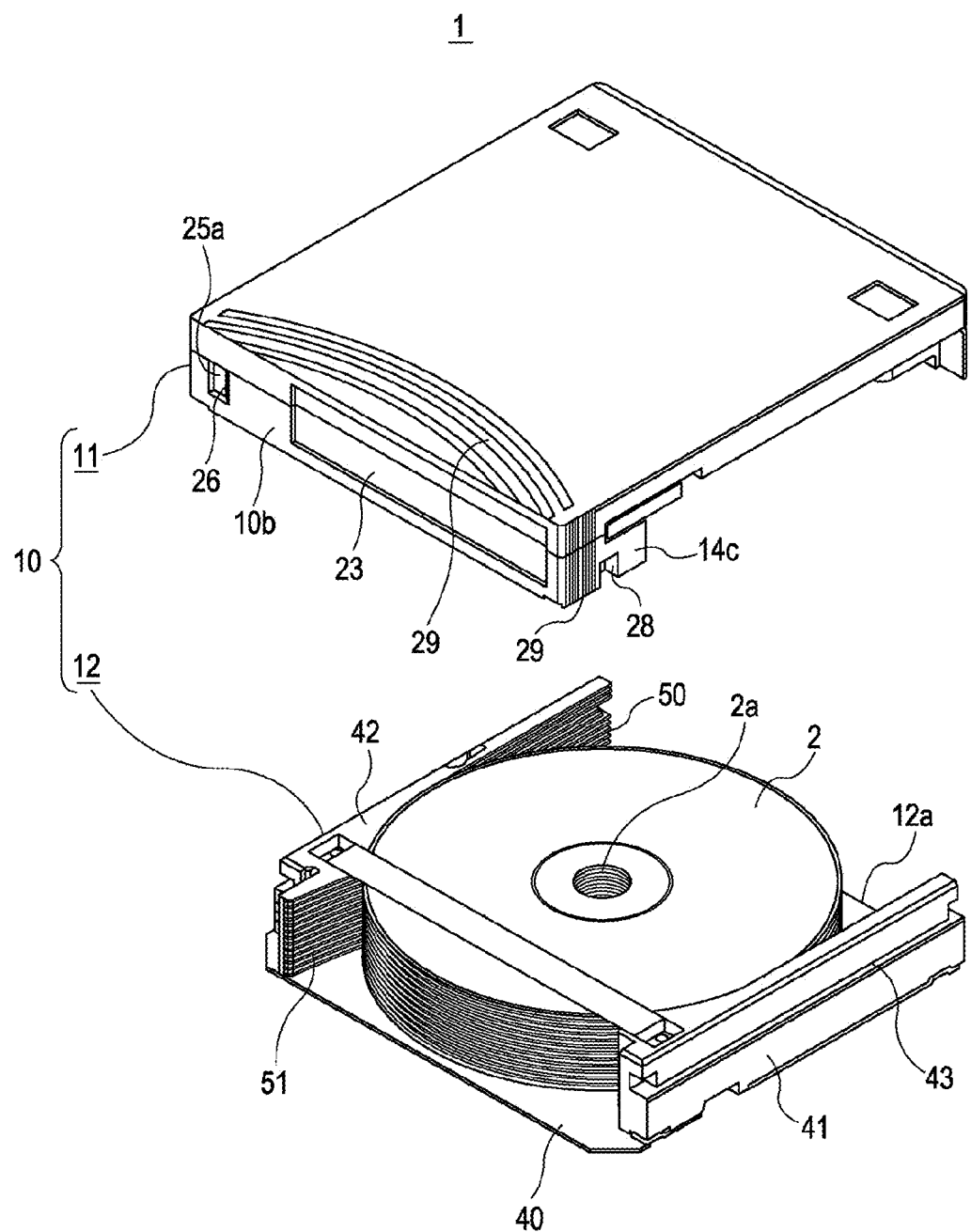
FIG. 5 is an exterior perspective view showing a state where the disc cartridge is divided into an upper shell and a lower shell.

The disc cartridge 1 has a rectangular cartridge main body 10 which includes the upper and lower shells 11 and 12 which are combined being confronted with each other, as shown in FIGS. 4A, 4B, and 5. In the disc cartridge 1, after the upper and lower shells 11 and 12 are divided, a plurality of optical discs 2 is stored in the lower shell 12, and the insertion and ejection of the optical disc 2 are performed from one end 12a side in the longitudinal direction of the lower shell 12. That is, in the disc cartridge 1, an insertion/ejection opening for the optical disc 2 is not provided at the cartridge main body 10 and the insertion and ejection of the optical disc 2 are performed by dividing the upper and lower shells 11 and 12 which constitute the cartridge main body 10.

In addition, in the following description, in the cartridge main body 10, a side face of one end side in the longitudinal direction, in which the optical disc 2 is ejected from and inserted into the lower shell 12 and which becomes an insertion end into the disc changer apparatus 3, is set to be a front face 10a, a side face of the other end side, which is the opposite side to the front face 10a and in which a concave surface portion 23 for label adhesion is formed, is set to be a back face 10b, and side faces, which are perpendicular to the front face 10a and the back face 10b and in which dividing grooves 47 of the upper and lower shells 11 and 12 are provided, are set to be a left side face 10c and a right side face 10d.

1-1. Upper Shell

Figure 6:
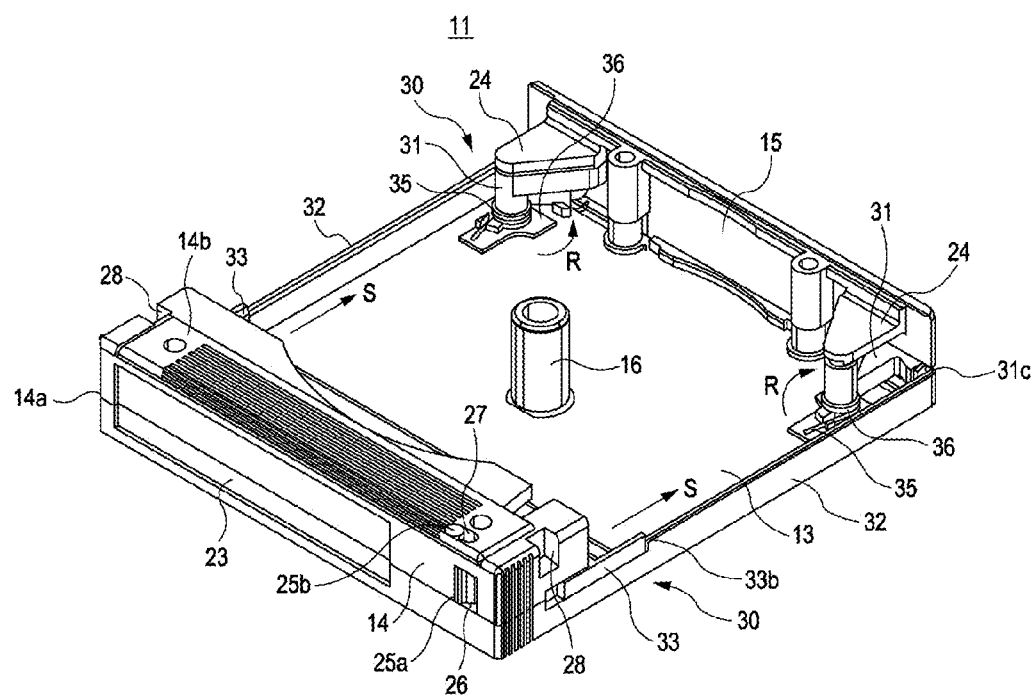
FIG. 6 is an exterior perspective view showing the upper shell.

The upper shell 11 is molded using engineering plastics and includes a rectangular top plate 13 which constitutes an upper face of the cartridge main body 10, a rear block 14 which is attached to the top plate 13 and constitutes the back face of the cartridge main body 10, a front wall 15 which is attached to the top plate 13 and constitutes the front face of the cartridge main body 10, and a support shaft 16 which is provided in an erect manner at the approximate center of the top plate 13, as shown in FIG. 6.

Figure 7:
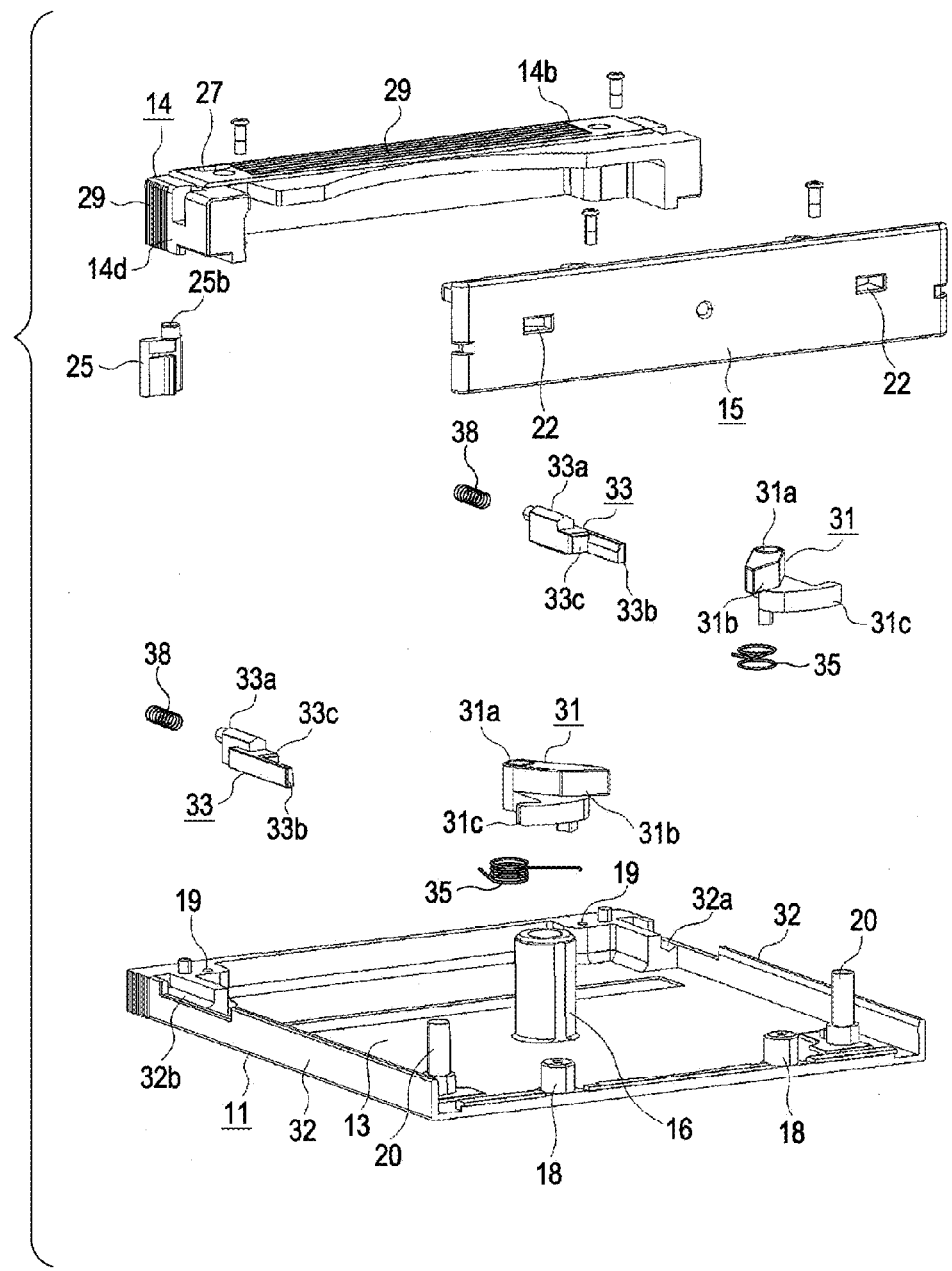
FIG. 7 is an exploded perspective view of the upper shell.

As shown in FIG. 7, at the top plate 13, screw holes 18 for fixing the front wall 15 by screws are formed at one end side in a longitudinal direction and screw holes 19 for fixing the rear block 14 by screws are formed at the other end side in the longitudinal direction. Also, at the top plate 13, turning support shafts 20 which pivotally support front-side locking pieces 31 of a lock mechanism 30 which will be described later are provided in an erect manner on both sides of an avoided projection face of the optical disc 2 at one end side in the longitudinal direction. Also, at the top plate 13, concave portions 21 are formed which are engaged with a cartridge holder 80, which will be described later, when the disc cartridge 1 is inserted into the selection loader 5 of the disc changer apparatus 3.

The front wall 15 is fixed by screws to one end side in the longitudinal direction of the top plate 13, thereby constituting the front face of the cartridge main body 10. At the front wall 15, unlocking holes 22, into which unlocking pieces 99 which turn the front-side locking pieces 31 of the lock mechanism 30 enters when the disc cartridge 1 is inserted into the disc changer apparatus 3, are formed at both sides in a longitudinal direction. Also, at the front wall 15, support pieces 24 which support the front-side locking pieces 31 along with the turning support shafts 20 are provided at the inner face side of the cartridge main body 10.

The rear block 14 is fixed by screws to the other end side in the longitudinal direction of the top plate 13, thereby constituting the back face of the cartridge main body 10. At the rear block 14, the concave surface portion 23 for label adhesion is formed in an outer surface 14a constituting the back face of the cartridge main body 10. Also, at the outer surface 14a of the rear block 14, an operation hole 26 which makes a knob portion 25a, which is formed at an erroneous erasure prevention switch 25 and operated by a user, facing outside is formed adjacent to the concave surface portion 23. Also, at the rear block 14, a contact hole 27 which makes a contact piece 25b, which is formed at the erroneous erasure prevention switch 25 and brought into contact with an identification switch 110 of the selection loader 5, facing outside is formed in a lower surface portion 14b which constitutes a portion of the lower surface of the cartridge main body 10 along with the lower shell 12.

Also, at both side surface portions 14c and 14d of the rear block 14, gripping holes 28 for gripping the cartridge main body 10 are formed. The gripping holes 28 are used as holes which are gripped by a robot arm in a case where a process which takes out the disc cartridge 1 from a library and then inserts the disc cartridge into the disc changer apparatus 3 is automated by using the robot arm, or the like.

Also, nonslip embossments 29 are formed in the top plate 13, the lower surface portion 14b of the rear block 14, and both side surface portions 14c and 14d each constituting a portion of each of the side faces of the cartridge main body 10. Also, the embossments 29 are formed such that by making patterns different from each other at the top plate 13 and the lower surface portion 14b, when a user grips the cartridge main body, an up-and-down direction can be identified according to a difference in pattern. Also, the disc cartridge 1 is made such that by forming the embossments 29 only in the back face 10b side of the cartridge main body 10, when a user grips the disc cartridge, an insertion direction can be identified.

The support shaft 16 provided in an erect manner approximately at the central portion of the top plate 13 is for securing rigidity of the cartridge main body 10 and also attaining the positioning of the optical disc 2 which is stored in the cartridge main body 10. The support shaft 16 has a circular cylindrical shape having a diameter slightly smaller than the diameter of a central hole 2a of the optical disc 2. Also, the support shaft 16 has a height equal to the thickness of the disc cartridge 1, so that by making the upper and lower shells 11 and 12 be confronted with each other, a leading end surface of the support shaft comes into contact with and is supported by a bearing portion 46 formed at the lower shell 12, If the upper and lower shells 11 and 12 are confronted with each other, the support shaft 16 is inserted into the central holes 2a of the optical discs 2 stored in the lower shell 12, thereby coming into contact with the bearing portion 46. Consequently, the support shaft 16 can prevent the rocking of the optical disc 2 in the cartridge main body 10 and also increase the rigidity of the cartridge main body 10.

That is, the disc cartridge 1 is for storing the optical discs 2 without using a disc tray and performs the insertion and ejection of the optical disc 2 by sliding the optical disc 2 in the direction parallel to the upper and lower surfaces of the cartridge main body 10, as will be described later. Here, in a case where an optical disc insertion/ejection opening is provided at a cartridge main body, in such a disc cartridge, since it is not allowed to erect a support shaft on a transport region of the optical disc, it becomes hard to secure the rigidity of the central portions of the upper and lower surfaces of the cartridge main body 10.

In this regard, since the disc cartridge 1 performs the insertion and ejection of the optical disc 2 by dividing the upper and lower shells 11 and 12 without providing an insertion/ejection opening for the optical disc 2 at the cartridge main body 10, the support shaft 16 does not interfere with the insertion and ejection of the optical disc 2. Also, since the disc cartridge 1 is provided with the support shaft 16, if the upper and lower shells 11 and 12 are confronted with each other, the central portions of the upper and lower surfaces of the cartridge main body 10 are supported by the support shaft, so that rigidity can be increased, and further, the support shaft is inserted into the central hole 2a of the optical disc 2, so that it is possible to prevent the rocking of the optical disc 2 in the cartridge main body 10.

Also, in the disc cartridge 1, in a case where the optical disc 2 is ejected from the cartridge main body 10 and transported to the inside of the disc changer apparatus 3, the upper and lower shells 11 and 12 are divided and a given optical disc 2 selected in advance is extruded by an extrusion lever 167 provided at the selection loader 5. At this time, the support shaft 16 is inserted into the central hole 2a of another optical disc 2 stored above the given optical disc 2 selected in advance, so that the rocking of another optical disc 2 is restricted and it is possible to prevent accompanying ejection in which another optical disc is ejected along with the given optical disc 2 (refer to FIG. 43).

In the top plate 13, the lock mechanism 30 which combines the upper and lower shells 11 and 12 is disposed at corner portions taken out from the projection face of the optical disc 2 stored in the lower shell 12 when the upper and lower shells 11 and 12 are combined with each other. The lock mechanism 30 includes the front-side locking pieces 31 which are supported by the turning support shafts 20 provided at one end side in a longitudinal direction and rear-side locking pieces 33 supported so as to be able to slide on an extension lines of dividing walls 32 provided in an erect manner on both sides in a short side direction of the top plate 13.

Each front-side locking piece 31 has an axial hole 31a, into which the turning support shaft 20 provided in an erect manner at the top plate 13 and a support shaft provided at the support piece 24 provided at the front wall 15 are inserted, a pressing surface portion 31b which faces outside from the unlocking hole 22 of the front wall 15, thereby being pressed by the unlocking piece 99, and an engaging portion 31c which is engaged with an engaged concave portion 56 of the lower shell 12. Also, by a coil spring 35 which is locked at one end to the front-side locking piece 31, the engaging portion 31c is engaged with the lower shell 12 and the pressing surface portion 31b is biased to turn in the direction of an arrow R in FIG. 6, which faces the unlocking hole 22.

The coil spring 35 is locked at one end to the front-side locking piece 31 and at the other end to a spring engaging portion 36 provided at the top plate 13.

The rear-side locking pieces 33 are supported on the other end side in the longitudinal direction of the top plate 13. Each rear-side locking piece 33 is slidably supported on a slide staged portion 32a provided on the extension line of the dividing wall 32 of the top plate 13, thereby being located on the extension line of the dividing groove 47 which is provided between the upper shell 11 and the lower shell 12, as shown in FIGS. 4A and 4B.

Each rear-side locking piece 33 has a support piece portion 33a which is supported so as to be able to slide between the dividing wall 32 and the rear block 14, a pressing piece portion 33b which is located on the extension line of the dividing groove 47, and an engaging portion 33c which is provided at one end of the support piece portion 33a and engaged with an engaged concave portion 57 of the lower shell 12. A coil spring 38 is locked to one end of the support piece portion 33a of each rear-side locking piece 33, so that the engaging portion 33c is engaged with the lower shell 12 and also the pressing piece portion 33b is biased to slide in the direction of an arrow S in FIG. 6, in which the pressing piece portion slides to the front face side of the cartridge main body 10, thereby being located on the extension line of the dividing groove 47.

In such a lock mechanism 30, the front-side locking piece 31 and the rear-side locking piece 33 are respectively biased in the direction of the arrow R and the direction of the arrow S in FIG. 6, so that each of the engaging portions 31c and 33c is engaged with the lower shell 12, thereby combining the upper and lower shells 11 and 12. Then, in the lock mechanism 30, if the disc cartridge 1 is mounted on the cartridge holder 80 of the selection loader 5, the pressing surface portion 31b is pressed by the unlocking piece 99 entered from the unlocking hole 22, so that the front-side locking piece 31 is turned in the counter direction to the arrow R direction against a biasing force of the coil spring 35, and the pressing piece portion 33b is pressed by an upper shell dividing piece 103 inserted into the dividing groove 47, so that the rear-side locking piece 33 is slid in the counter direction to the arrow S direction against a biasing force of the coil spring 38.

In this way, in the lock mechanism 30, the engagement of each of the engaging portions 31c and 33c of the front-side locking piece 31 and the rear-side locking piece 33 with the lower shell 12 is released, thereby allowing the upper and lower shells 11 and 12 to be divided. Also, when the disc cartridge 1 is ejected from the disc changer apparatus 3, since the pressing of the lock mechanism 30 by the unlocking piece 99 and the upper shell dividing piece 103 is released, the front-side locking piece 31 and the rear-side locking piece 33 are respectively biased in the direction of the arrow R and the direction of the arrow S under the biasing forces of the coil springs 35 and 38, so that each of the engaging portions 31c and 33c is engaged with the lower shell 12, thereby combining the upper and lower shells 11 and 12.

1-2. Lower Shell

Figure 9:
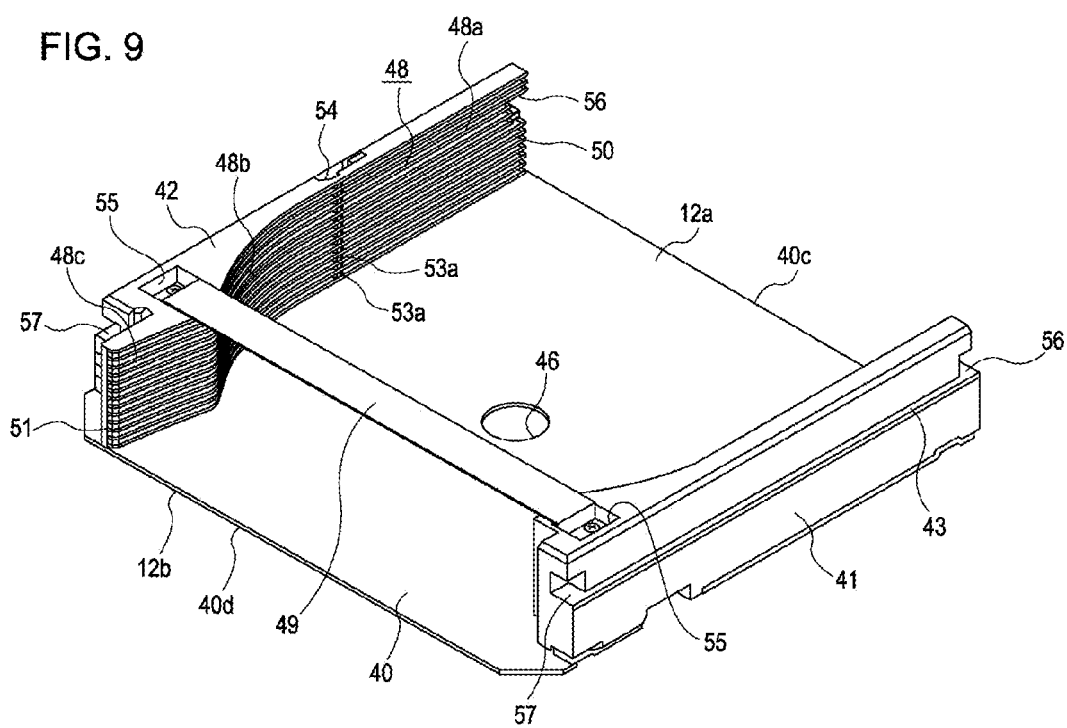
FIG. 9 is an exterior perspective view showing the lower shell.

Next, the lower shell 12 which stores the optical discs 2 will be described. As shown in FIGS. 5 and 9, the lower shell 12 includes a rectangular bottom plate 40 constituting the lower face of the cartridge main body 10, left and right disc holders 41 and 42 each constituting a portion of each side face of the cartridge main body 10 and also storing the optical disc 2, and a holder plate 49 which supports the left and right disc holders 41 and 42.

Figure 8:
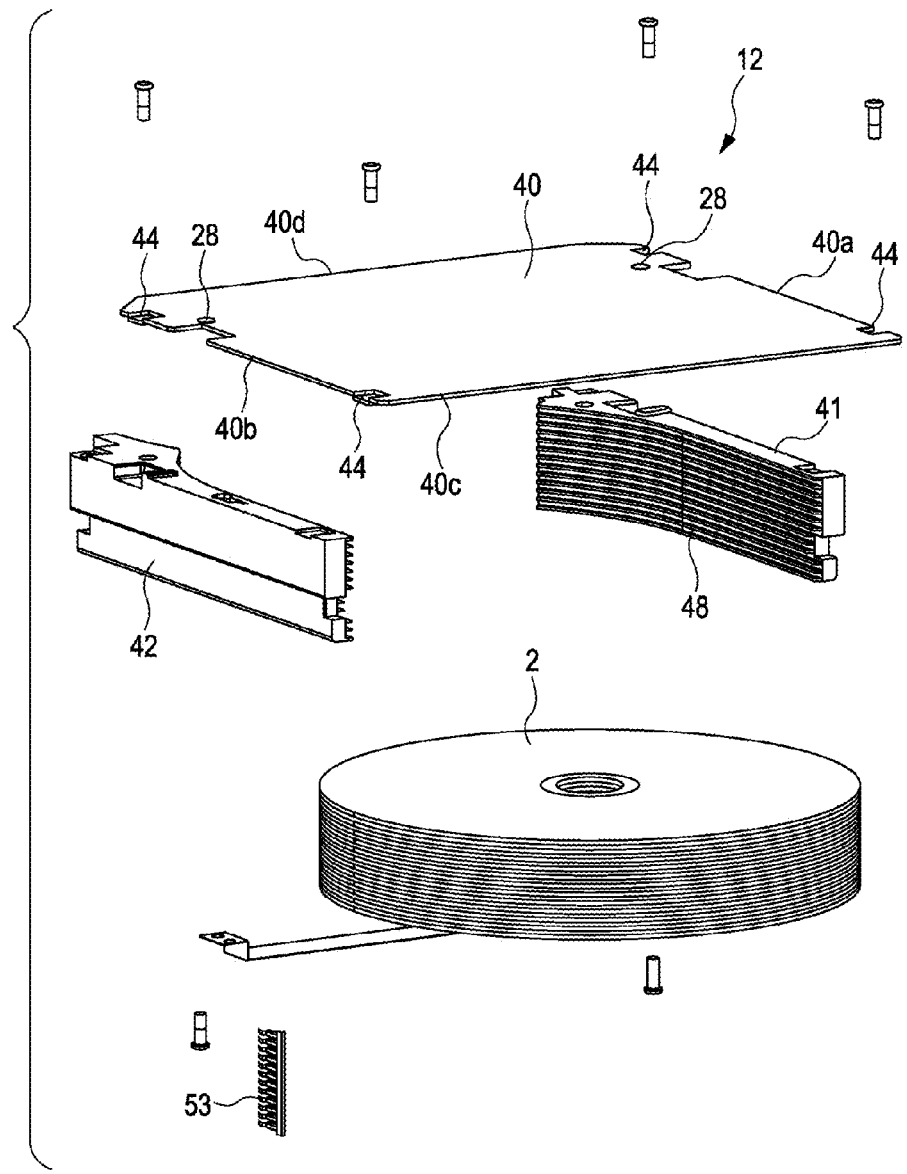
FIG. 8 is an exploded perspective view of the lower shell.

The bottom plate 40 is formed of metal or resin such as engineering plastics, and as shown in FIG. 8, screw holes 44 are formed in opposite side edges 40a and 40b in a short side direction perpendicular to a longitudinal direction and the left and right disc holders 41 and 42 are fixed thereto by screws. Also, in the bottom plate 40, opposite side edges 40c and 40d approximately perpendicular to the side edges 40a and 40b, to which the left and right disc holders 41 and 42 are attached, are opened, thereby forming a disc insertion/ejection opening 50 and a disc extrusion opening 51 for the optical disc 2, as will be described later.

Figure 10:
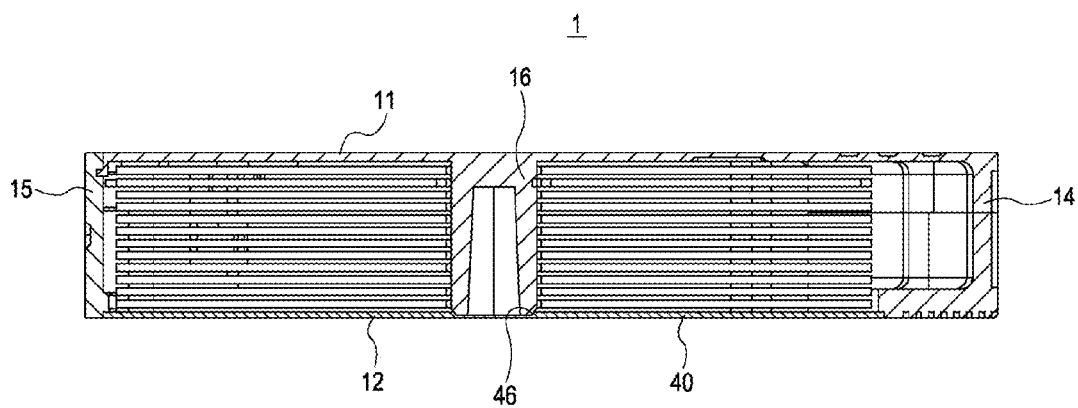
FIG. 10 is a cross-sectional view showing a state where the upper and lower shells are confronted with each other.

Also, at the approximately central portion of the bottom plate 40, the bearing portion 46 is formed in contact with the leading end of the support shaft 16 provided in a protruding state at the upper shell 11. The bearing portion 46 is made of a concave surface portion of a circular shape, and as shown in FIG. 10, when the upper and lower shells 11 and 12 are combined being confronted with each other, the leading end of the support shaft 16 comes into contact with the bearing portion. Therefore, in the cartridge main body 10, the support shaft 16 is inserted into the central hole 2a of the optical disc 2 stored at the storage position of the lower shell 12, so that it is possible to prevent the rocking of the optical disc 2. Also, in the cartridge main body 10, since the approximate centers of the upper and lower shells 11 and 12 are supported by the support shaft 16, the rigidity of the cartridge main body can be increased and deformation of the upper and lower shells 11 and 12 or damage of the optical disc 2 due to the deformation can be prevented.

Also, in the bottom plate 40, positioning holes 45 are formed which attain the positioning of the lower shell 12 in a lower holder 91 of the cartridge holder 80, which will be described later, when the disc cartridge 1 is inserted into the selection loader 5 of the disc changer apparatus 3.

The left and right disc holders 41 and 42 are for supporting a plurality of optical discs 2 and are fixed by screws to both side edges 40a and 40b in the short side direction of the bottom plate 40. These left and right disc holders 41 and 42 each constitute a portion of each of the left and right side faces of the cartridge main body 10 when the upper and lower shells 11 and 12 are confronted with each other, and in the outer surfaces thereof, entry grooves 43 are formed into which dividing pieces 103 and 115 provided at the cartridge holder 80, which will be described later, enter.

Then, in the left and right disc holders 41 and 42, an upper side above the entry groove 43 is retreated to the inside, so that by making the upper and lower shells 11 and 12 be confronted with each other, the dividing wall 32 of the upper shell 11 can cover the upper side above the entry groove 43 from the outside. Therefore, the lower sides below the entry grooves 43 of the left and right disc holders 41 and 42 constitute the left and right side faces 10*c* and 10*d* of the cartridge main body 10 along with the dividing walls 32 of the upper shell 11. At this time, in the left and right disc holders 41 and 42, the dividing grooves 47 are formed by the lower end surfaces of the dividing walls 32 and the upper end surfaces of the entry grooves 43.

Also, on the inner surface side of each of the left and right disc holders 41 and 42, a plurality of support grooves 48 is formed. Each support groove 48 has a groove height slightly larger than the thickness of the optical disc 2. Also, the same number of support grooves 48 is formed in the left and right disc holders 41 and 42, so that a pair of left and right support grooves supports an outer edge which is a signal non-recording region of the optical disc 2 and also the optical disc 2 can slide in the surface direction thereof. Also, the support grooves 48 are formed parallel to the bottom plate 40, thereby making the optical disc 2 slide in the longitudinal direction of the lower shell 12.

The support grooves 48 are formed to extend from one end face up to the other end face of each of the left and right disc holders 41 and 42. Also, each support groove 48 is formed to have a straight portion 48*a* which is formed at one end 12*a* side of the lower shell 12 and is parallel to a side edge of the bottom plate 40, and a circular arc portion 48*b* which is continued from the straight portion 48*a* and adjacent to the other end 12*b* side of the lower shell 12. Further, each support groove 48 of the right disc holder 42 is formed to further have a guide portion 48*c* which further extends from the circular arc portion 48*b* to the other end 12*b* side of the lower shell 12 and guides the extrusion lever 167 of the selection loader 5, which will be described later.

Figure 11:
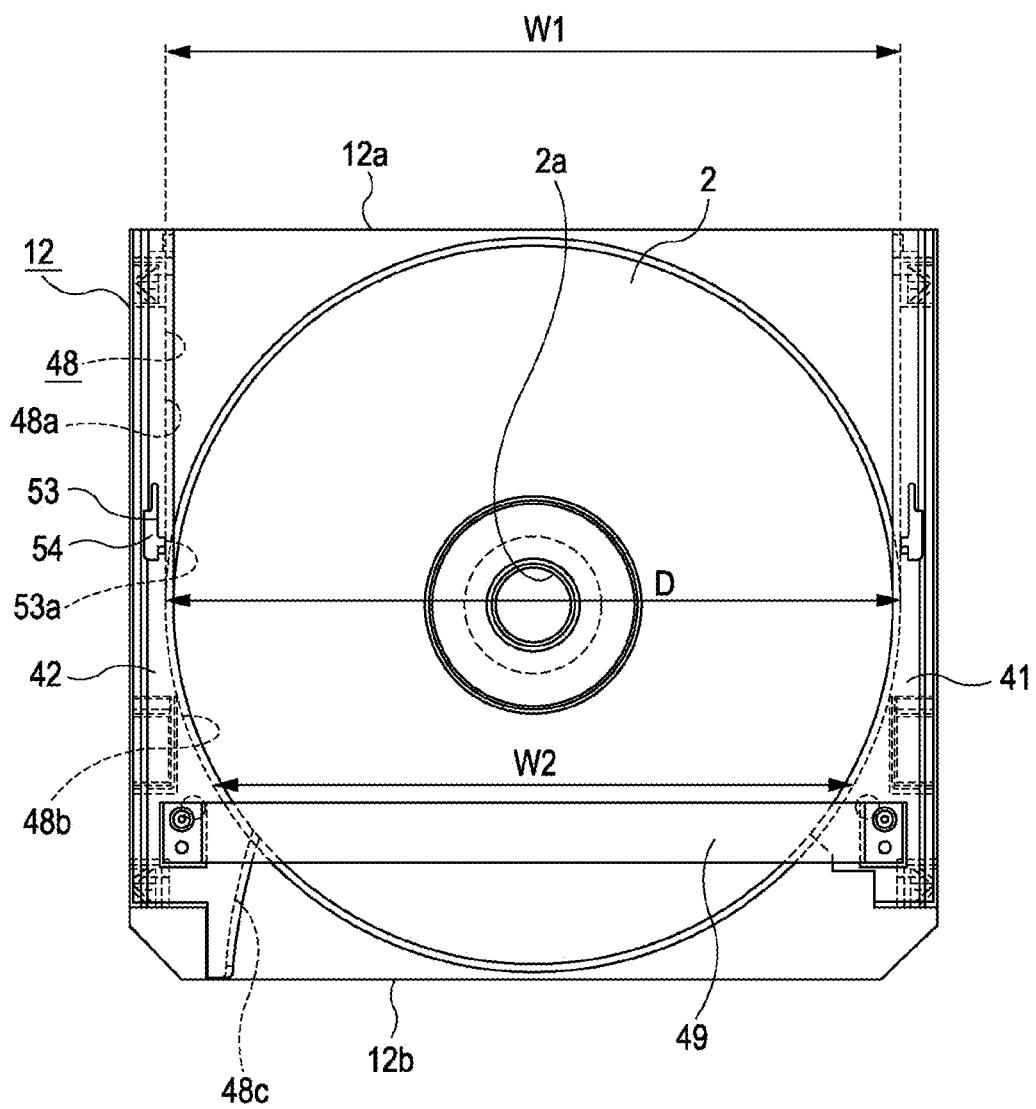
FIG. 11 is a plan view showing a state where an optical disc is stored at a storage position of a cartridge main body.

As shown in FIG. 11, in the left and right disc holders 41 and 42, a width W1 between the straight portions 48*a* formed at one end 12*a* side of the lower shell 12 is slightly wider than the maximum width D of the optical disc 2. Also, the straight portion 48*a* of the support groove 48 faces one end face of each of the left and right disc holders 41 and 42, and therefore, on one end 12*a* side of the lower shell 12, the disc insertion/ejection opening 50 for performing the insertion and ejection of the optical disc 2 is formed, and the straight portion 48*a* can slidably support the optical disc 2.

Also, in the left and right disc holders 41 and 42, a width W2 between the circular arc portions 48*b* which are continued from the straight portions 48*a* toward the other end 12*b* side of the lower shell 12 is narrower than the maximum width D of the optical disc 2. Also, the circular arc portion 48*b* is formed to have curvature approximately equal to the curvature of the optical disc 2. Consequently, in the lower shell 12, it is possible to stop the optical disc 2 sliding on the straight portion 48*a* at the circular arc portion 48*b*, thereby regulating the optical disc 2 at the storage position in the cartridge main body 10. Also, since the circular arc portion 48*b* is formed to have curvature approximately equal to the curvature of the optical disc 2, it is possible to support an outer circumferential portion of the optical disc 2 in a circular arc pattern, thereby reliably holding the optical disc at the storage position in the cartridge main body 10.

In addition, the storage position of the optical disc 2, in which the optical disc 2 is supported on the circular arc portion 48*b*, is provided being somewhat biased to one end side in the longitudinal direction of the cartridge main body 10 formed into a rectangular shape, that is, the front face 10*a* side where the disc insertion/ejection opening 50 is formed.

Figure 25:
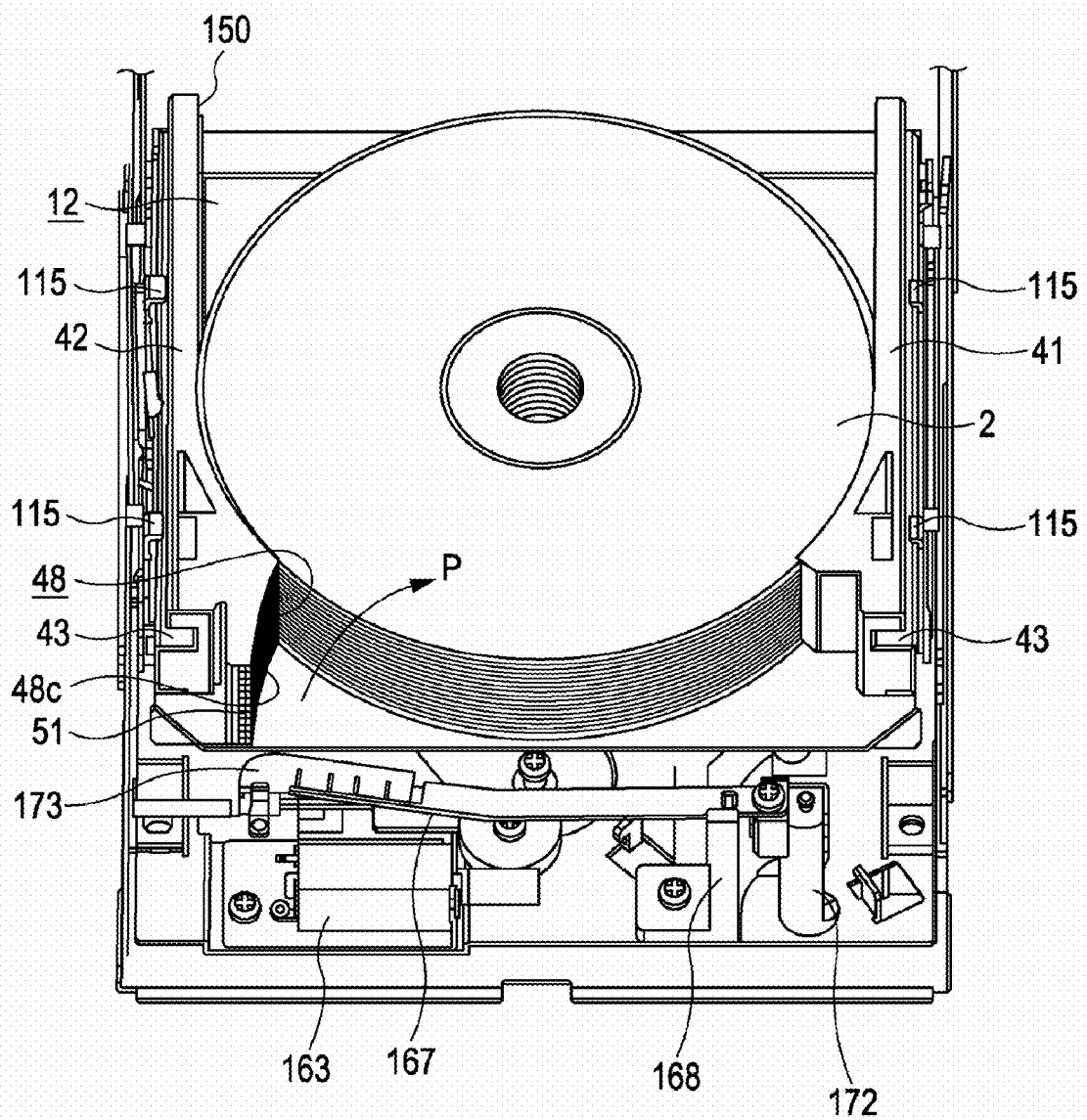
FIG. 25 is a perspective view showing an extrusion mechanism.

Also, in the right disc holder 42, the guide portion 48*c* is formed to extend from the circular arc portion 48*b* to the other end 12*b* side of the lower shell 12. The guide portion 48*c* faces the other end face of the right disc holder 42, so that the extrusion lever 167 can advance or retreat from the other end face. Also, the guide portion 48*c* is formed into a circular arc shape according to a turning locus of the extrusion lever 167. Therefore, the disc extrusion opening 51, in which the extrusion lever 167 which extrudes the optical disc 2 to the disc insertion/ejection opening 50 side advances or retreats, is formed at the other end 12*b* side of the lower shell 12, and in the guide groove 48*c*, the leading end of the extrusion lever 167 is supported and can be stably turned. Also, the guide portion 48*c* guides the extrusion lever 167 to the support groove 48, in which a given optical disc 2 which is ejected to the selection loader 5 side, as will be described later, is stored, so that the given optical disc 2 can be reliably extruded to the disc insertion/ejection opening 50 side (FIG. 25).

Also, the support grooves 48 are formed in a plurality, in this example, by twelve, in the thickness direction of the cartridge main body 10, which is perpendicular to the bottom plate 40, so that up to twelve optical discs 2 can be stacked and stored.

Also, the right disc holder 42 is provided with a self-locking spring 53 which restricts the optical disc 2 at the storage position of the cartridge main body 10. The self-locking spring 53 has elastic pieces 53*a* which protrude into the support grooves 48 so as to be able to advance or retreat, and is for regulating the optical discs at the storage position by biasing the optical discs 2 to the circular arc portions 48*b* side by using the elastic pieces 53*a*.

Figure 12:
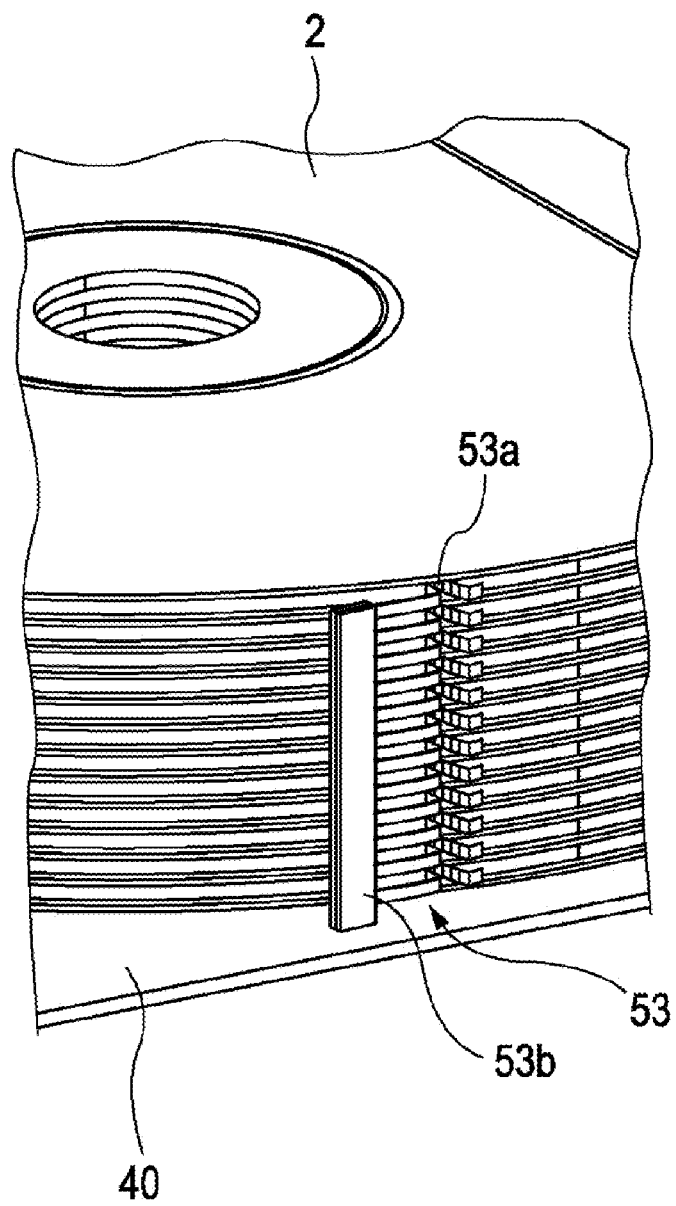
FIG. 12 is a perspective view showing a self-locking spring.

The self-locking spring 53 has the same number of elastic pieces 53*a* as the number of support grooves 48 and a support body 53*b* at which the elastic pieces 53*a* are provided, as shown in FIG. 12. The self-locking spring 53 as a whole is formed of a material having flexibility, such as a metal spring, and a plurality of elastic pieces 53*a* extends laterally in the longitudinal direction of the approximately rectangular plate-like support body 53*b*. Also, if the self-locking spring 53 is disposed in a disposing opening 54 provided approximately at the middle in the longitudinal direction of the right disc holder 42, the elastic pieces 53*a* protrude into the support grooves 48 from opening portions opened to the side faces of the support grooves 48. Since the elastic pieces 53*a* of the self-locking spring 53 have flexibility, the elastic pieces protrude so as to be able to advance or retreat from the opening portions. Also, a leading end portion of each elastic piece 53*a*, which protrudes into the support groove 48, is curved, so that even in a case where the outer circumferential surface of the optical disc 2 is in sliding-contact therewith, the elastic piece does not damage the outer circumferential surface of the optical disc 2.

If the optical disc 2 is inserted from the disc insertion/ejection opening 50 of the lower shell 12, the self-locking spring 53 is pressed by the outer circumferential surface of the optical disc 2 which slides in the support groove 48, so that the elastic piece 53*a* retreats into the disposing opening 54 of the right disc holder 42. Then, if the optical disc 2 is inserted up to the storage position where the optical disc comes into contact with the circular arc portion 48*b*, the elastic piece 53*a* comes into contact with the portion of the optical disc further on one end 12*a* side of the lower shell 12 than the central hole 2*a* of the optical disc 2, as shown in FIG. 11. Consequently, the self-locking spring 53 presses the optical disc 2 to the circular arc portion 48b side, thereby regulating the optical disc at the storage position in the cartridge main body 10. Therefore, the self-locking spring 53 can prevent the rocking of the optical disc 2 due to its own weight or oscillation of the cartridge main body 10, so that it is possible to stably perform the insertion and ejection of the optical disc 2 in the disc changer apparatus 3.

If the optical disc 2 is slid to the disc insertion/ejection opening 50 side by the extrusion lever 167, the elastic piece 53a of the self-locking spring 53 is pressed by the outer circumferential surface of the optical disc 2, thereby retreating into the right disc holder 42. Therefore, the self-locking spring 53 does not impede the insertion and ejection of the optical disc 2.

The holder plate 49 spans the left and right disc holders 41 and 42. The holder plate 49 is for preventing the rocking of the left and right disc holders 41 and 42 and in particular, to prevent the optical disc 2 from dropping out of the support groove 48 due to the rocking of the disc holders in a direction in which the left and right disc holders 41 and 42 are separated from each other.

The holder plate 49 is made using a metal plate formed into a rectangular plate shape, and fixed by screws to engaging holes 55 and 55 provided on the upper surfaces of the left and right disc holders 41 and 42. Since the holder plate 49 is locked to the other end 12b side of the lower shell 12, which is the storage position of the optical disc 2, even in a case where a shock due to movement, falling, or the like of the cartridge main body 10 is added, the rocking of the left and right disc holders 41 and 42 is prevented, so that falling of the optical disc 2 supported between the support grooves 48 can be prevented. In particular, the holder plate 49 is disposed extending above the circular arc portions 48b which support the optical disc 2 in a circular arc pattern, as shown in FIG. 9, so that it is possible to reliably support the outer circumference of the optical disc 2 by the circular arc portions 48b.

Also, in each of the left and right disc holders 41 and 42, there are formed the engaged concave portion 56, with which the engaging portion 31c of the front-side locking piece 31 of the lock mechanism 30 is engaged, and the engaged concave portion 57, with which the engaging portion 33c of the rear-side locking piece 33 is engaged. The engaged concave portion 56 is formed by cutting out one end surface of each of the left and right disc holders 41 and 42, where the disc insertion/ejection opening 50 is provided, into a concave shape. Also, the engaged concave portion 57 is formed by cutting out the other end surface of each of the left and right disc holders 41 and 42, where the disc extrusion opening 51 is provided, into a concave shape.

By turning of the front-side locking piece 31 in the direction of the arrow R under the biasing force of the coil spring 35, the engaged concave portion 56 is engaged with the engaging portion 31c. Also, by sliding of the rear-side locking piece 33 in the direction of the arrow S under the biasing force of the coil spring 38, the engaged concave portion 57 is engaged with the engaging portion 33c.

Also, by turning of the front-side locking piece 31 in the counter direction to the arrow R direction by the unlocking piece 99, the engagement of the engaged concave portion 56 with the engaging portion 31c is released. Also, the engaged concave portion 57 is continued from the dividing groove 47 of the cartridge main body 10, and the pressing piece portion 33b of the rear-side locking piece 33 is pressed by the upper shell dividing piece 103 entered into the dividing groove 47, whereby the engagement of the engaged concave portion with the engaging portion 33c is released.

According to such a disc cartridge 1, if the upper and lower shells 11 and 12 are combined by the lock mechanism 30, the support shaft 16 provided in a protruding state at the top plate 13 of the upper shell 11 is brought into contact with the bearing portion 46 formed at the bottom plate 40 of the lower shell 12. Therefore, in the disc cartridge 1, the strength of the cartridge main body 10 can be secured without using a disc tray and it is possible to prevent deformation of the cartridge main body 10 and also prevent the optical disc 2 from being damaged due to deformation of the cartridge main body 10.

Also, in the disc cartridge 1, the entire surface of the cartridge main body 10 is constituted by the top plate 13, the front wall 15, the rear block 14, and a pair of left and right dividing walls 32 of the upper shell 11, and the bottom plate 40 and the left and right disc holders 41 and 42 of the lower shell 12. That is, the cartridge main body 10 is not provided with an opening portion for inserting and discharging the optical disc 2 and a door for opening and closing the opening portion. Therefore, in the disc cartridge 1, the cartridge main body 10 can be robustly formed. Also, in the disc cartridge 1, since the support shaft 16 of the upper shell 11 comes into contact with the bearing portion 46 of the lower shell 12, the strength of the approximate centers of the upper face and the lower face is also improved. Therefore, resistance properties to falling, oscillation, or the like of the disc cartridge 1 can be improved.

Also, in the disc cartridge 1, the support shaft 16 is inserted into the central hole 2a of the optical disc 2, thereby attaining the positioning of the optical disc 2 in the cartridge main body 10 and preventing the optical disc 2 from rocking due to falling, oscillation, or the like of the cartridge main body 10. Therefore, in the disc cartridge 1, even when the upper and lower shells 11 and 12 are divided, since the optical disc 2 is stored at a given storage position, the insertion and ejection of the optical disc 2 can be smoothly performed.

Further, in the disc cartridge 1, since the entire surface thereof is blocked by the upper and lower shells 11 and 12 and an opening portion for disc insertion and ejection and a door for opening and closing the opening portion are not provided, it is possible to increase sealing of the cartridge main body 10, thereby preventing entry of dust or the like. Also, since the disc cartridge 1 is not provided with an opening portion for disc insertion and ejection and a door for opening and closing the opening portion, it is possible to prevent a situation where the door is carelessly opened by a user and a finger or foreign material touches the optical disc 2.

Also, in the disc cartridge 1, the insertion and ejection of the optical disc 2 which is stored in the lower shell 12 is performed by dividing the upper and lower shells 11 and 12 into upper and lower by the selection loader 5, which will be described later, and sliding the optical disc in a surface direction of the disc. Therefore, in the disc cartridge 1, it is possible to perform the insertion and ejection of the optical disc 2 with a simple configuration without using a disc tray.

Also, at this time, in the disc cartridge 1, since the support shaft 16 is inserted into the optical discs 2 stored above a given optical disc 2 which is inserted or ejected, among a plurality of optical discs 2 stacked and stored, it is possible to prevent accompanying ejection in which the optical disc 2 other than the given optical disc 2 is ejected together.

In addition, provided that the upper and lower shells 11 and 12 are formed so as to be able to come into contact with and be separated from each other in the up-and-down direction, the entire surface of the cartridge main body 10 is blocked by combination of the upper and lower shells 11 and 12, and the optical disc 2 can be inserted and ejected in a surface direction by separating the upper and lower shells 11 and 12 from each other, the disc cartridge 1 is not to be limited to a cartridge of a rectangular shape. Also, in the disc cartridge 1, the bottom plate 40 and the left and right disc holders 41 and 42 of the lower shell 12 may also be integrally molded. Further, in the disc cartridge 1, by the left and right disc holders 41 and 42 of the lower shell 12, the optical discs 2 are held and also the side walls of the cartridge main body 10 are constituted. However, the left and right disc holders for storing and holding the optical discs 2 and side wall members constituting the side walls of the cartridge main body 10, may also be provided separately.

2. Disc Changer Apparatus

Next, the disc changer apparatus 3 will be described which selects and takes out the optical disc 2 stored in the disc cartridge 1 and performs writing and/or reading of an information signal. The disc changer apparatus 3 includes the selection loader 5 which divides the cartridge main body 10 of the disc cartridge 1 and ejects the optical disc 2 and the carrying loader 6 which draws in the optical disc 2 ejected from the selection loader 5 and transports the optical disc to the recording and reproducing apparatus 7.

The selection loader 5 has a cartridge insertion/removal position where the disc cartridge 1 is inserted into and removed from the disc changer apparatus 3 and a disc insertion/ejection position where the ejection and insertion of the optical disc 2 from and into the lower shell 12 is performed. If the disc cartridge 1 is mounted at the cartridge insertion/removal position, the selection loader 5 releases the locking of the lock mechanism 30 and transports only the lower shell 12 to the disc insertion/ejection position. At this time, the selection loader 5 controls an ascent and descent height of the lower shell 12 according to the optical disc 2 which is ejected. Then, the selection loader 5 extrudes the optical disc 2 located at a given height to the carrying loader 6 side.

The carrying loader 6 draws in the optical disc 2 extruded from the lower shell 12 up to a position where the optical disc can be chucked to the recording and reproducing apparatus 7, and after recording and/or reproducing with respect to the optical disc 2 is finished, the carrying loader pushes the optical disc 2 back to the storage position of the lower shell 12.

2-1. Apparatus Main Body

As shown in FIGS. 1 and 2, the disc changer apparatus 3 has an apparatus main body 60 which is made into a rectangular box shape as a whole. The apparatus main body 60 includes the rectangular top cover 61, a bottom cover 62 which is covered by the top cover 61, and a front panel 63 which is an insertion/removal face for the disc cartridge 1. In the disc changer apparatus 3, the selection loader 5 and the carrying loader 6 are mounted in the inside of the apparatus main body 60. In addition, in the apparatus main body 60, in FIG. 1, a face at which the front panel 63 is provided is set to be a front face 60*a*, a face on the opposite side to the front face 60*a* is set to be a back face 60*b*, a principal face which is constituted by the top cover 61 is set to be an upper face 60*c*, and both side faces which are constituted by the top cover 61 is set to be left and right side faces 60*d* and 60*e*.

Figure 13:
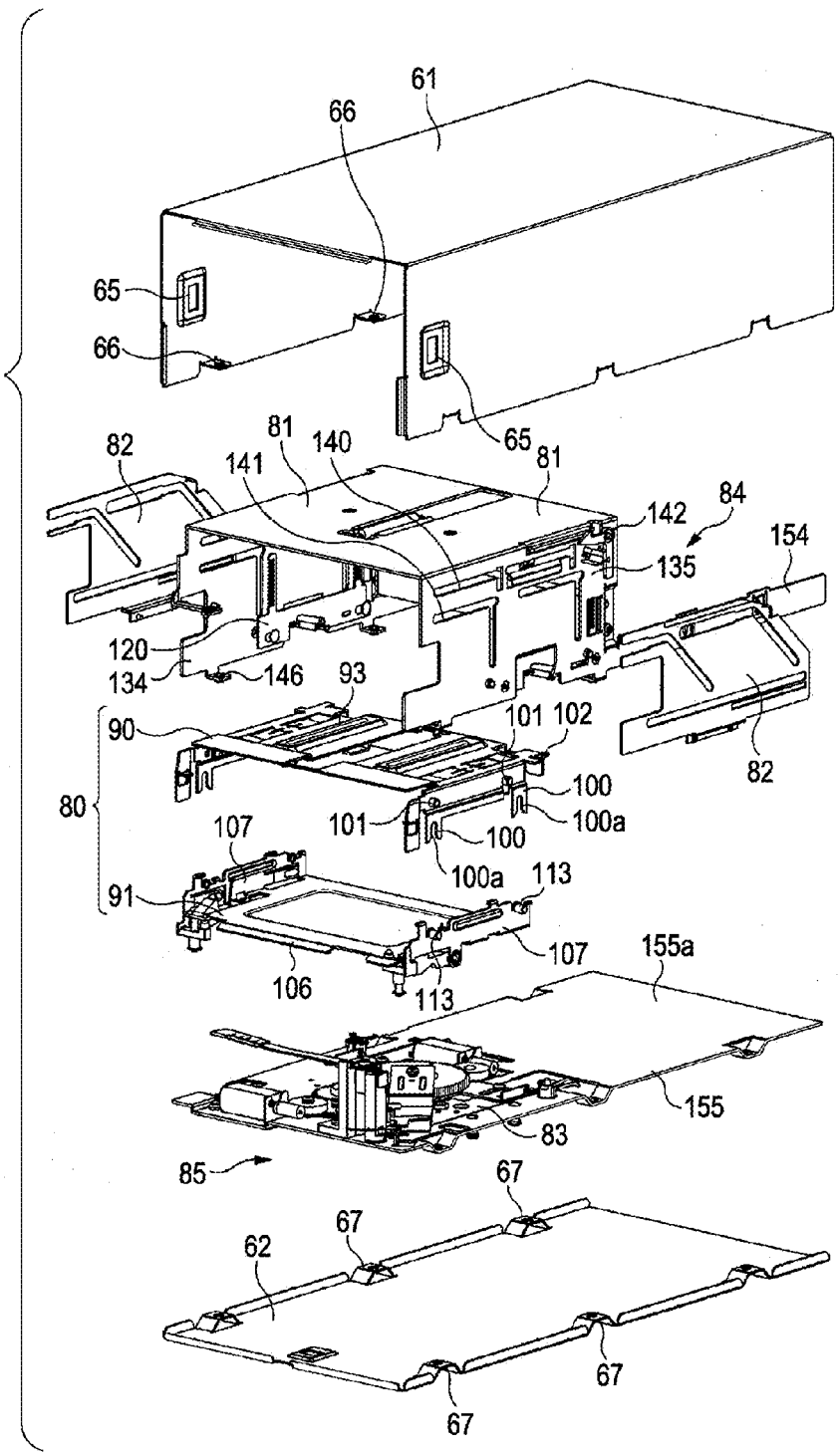
FIG. 13 is an exploded perspective view showing a selection loader.

As shown in FIG. 13, the top cover 61 constitutes the back face 60*b*, the upper face 60*c*, the left side face 60*d*, and the right side face 60*e* of the apparatus main body 60. At the left and right side faces 60*d* and 60*e*, panel engaging openings 65 which are engaged with the front panel 63 are opened, and at the inner surface sides of the left and right side faces, cover connection pieces 66 which are connected to the bottom cover 62 are provided in a protruding state.

The bottom cover 62 is made into a rectangular plate shape of a size approximately equal to that of the upper face 60*c* of the apparatus main body 60, and at both side edge portions in the short side direction perpendicular to a longitudinal direction, a plurality of cover connection portions 67, to which the cover connection pieces 66 of the top cover 61 are fastened by screws, is formed. Screw holes are formed in the cover connection pieces 66 and the cover connection portions 67, and the cover connection pieces and the cover connection portions are co-fastened along with a holder cover 81 which will be described later.

Figure 14:
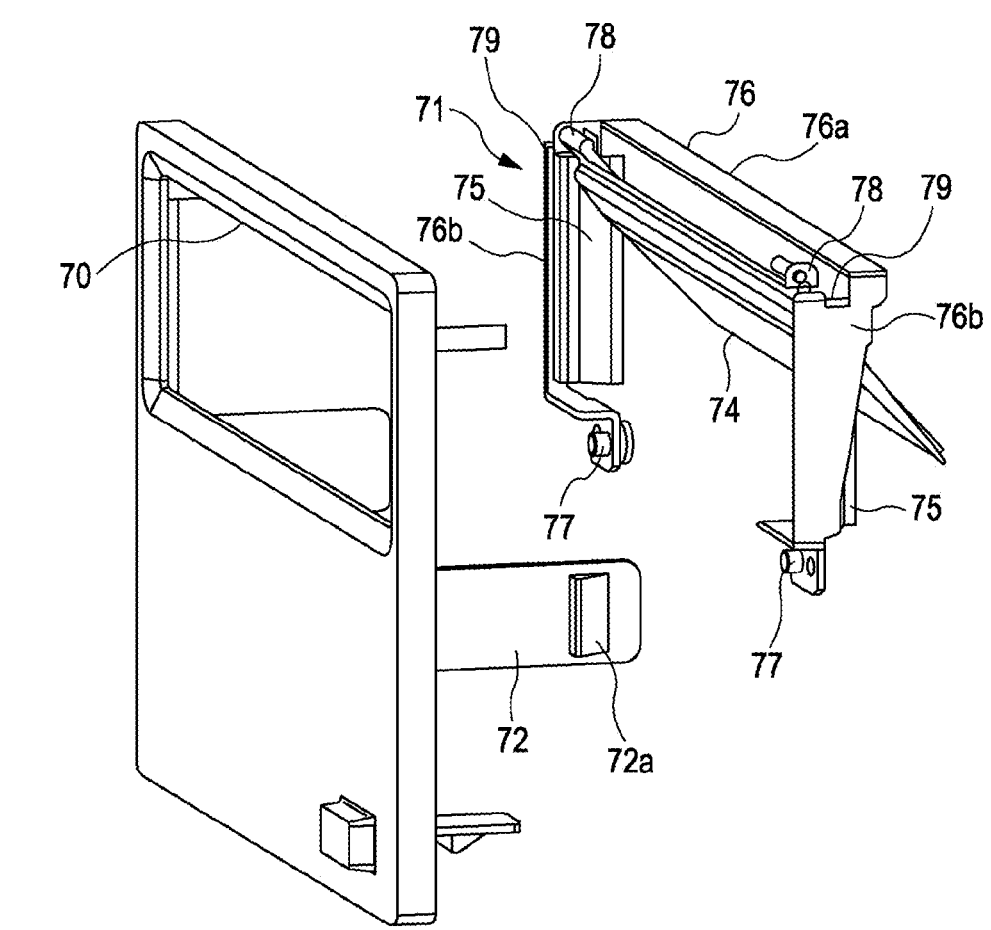
FIG. 14 is an exploded perspective view showing a front panel.

As shown in FIG. 14, the front panel 63 is made into a rectangular plate shape and has a cartridge insertion/removal opening 70 where the disc cartridge 1 is inserted and removed, a bezel 71 which blocks the cartridge insertion/removal opening 70, and cover engaging pieces 72 which are engaged with the panel engaging openings 65 of the top cover 61. The cartridge insertion/removal opening 70 is an opening portion of a rectangular shape slightly larger than the front face 10*a* of the cartridge main body 10, is opened at the upper side of the apparatus main body 60, and located at a height approximately equal to the cartridge holder 80 transported to the cartridge insertion/removal position which will be described later.

The bezel 71 includes a center bezel 74 which opens and closes the almost entire face except both sides in the longitudinal direction of the cartridge insertion/removal opening 70, a pair of side bezels 75 and 75 which opens and closes both sides in the longitudinal direction of the cartridge insertion/removal opening 70, and a support frame 76 which is mounted on the back face of the front panel 63 and supports the center bezel 74 and the side bezels 75 and 75 so as to be able to turn.

The support frame 76 includes a center arm portion 76*a* having a length approximately equal to the length in the longitudinal direction of the cartridge insertion/removal opening 70, and a pair of side arm portions 76*b* and 76*b* which extends from both ends of the center arm portion 76*a* and supports the center bezel 74 and the side bezels 75 and 75 so as to be able to turn. At the leading end of each side arm portion 76*b*, a connection portion 77 which is connected to the front panel 63 is provided. The support frame 76 is mounted by screw-fastening of the connection portions 77 to the back face of the front panel 63.

Also, at the upper end of each of the side arm portions 76*b* and 76*b*, there are provided a first support portion 78 which supports the center bezel 74 so as to be able to turn and a second support portion 79 which supports the side bezel 75 in a longitudinal direction so as to be able to turn.

The center bezel 74 is made so as to be able to turn from an upper edge in the short side direction perpendicular to the longitudinal direction of the cartridge insertion/removal opening 70 to the back face 60*b* side of the apparatus main body 60 by being supported on the first support portion 78 of each of the side arm portions 76*b* and 76*b*. Also, the side bezels 75 and 75 are made so as to be able to turn from both side edges in the longitudinal direction of the cartridge insertion/removal opening 70 to the back face 60*b* side of the apparatus main body 60 by being supported on the second support portions 79 of the side arm portions 76*b* and 76*b*.

Also, the center bezel 74 and the side bezels 75 and 75 are biased by coil springs (not shown) so as to turn to the front face 60*a* side which usually blocks the cartridge insertion/removal opening 70. At this time, the side bezels 75 and 75 are overlapped with both end portions in the longitudinal direction of the center bezel 74 from the back face 60*b* side.

In such a bezel 71, in the state of waiting for the mounting of the disc cartridge 1 in the inside of the apparatus main body 60, the center bezel 74 and the side bezels 75 and 75 are biased to turn to the front face 60*a* side, thereby blocking the cartridge insertion/removal opening 70. Then, in the bezel 71, if the disc cartridge 1 is inserted into the cartridge insertion/removal opening 70, the center bezel 74 is pressed by the front face 10a of the cartridge main body 10, thereby being turned to the back face 60b side, and the side bezels 75 and 75 are also turned to the back face 60b side by means of being pressed by the center bezel 74. Then, while the cartridge main body 10 is mounted in the inside of the apparatus main body 60, the center bezel 74 of the bezel 71 comes into contact with the cartridge main body 10, so that the turning thereof to the front face 60a side is restricted, and also at the side bezels 75 and 75, the turning thereof to the front face 60a side is restricted by the center bezel 74.

Also, since the bezel 71 includes the side bezels 75, it is possible to avoid the interference with the upper shell dividing piece 103 or the lower shell dividing piece 115 provided at the cartridge holder 80, as will be described later, and also provide the cartridge insertion/removal position of the cartridge main body 10 at the front face 60a side of the apparatus main body 60, thereby allowing a reduction in size of the apparatus main body 60 to be attained.

In addition, at each cover engaging piece 72, an engaging protrusion portion 72a which is engaged with the panel engaging opening 65 of the top cover 61 is provided in a protruding state.

2-2. Selection Loader

Figure 15:
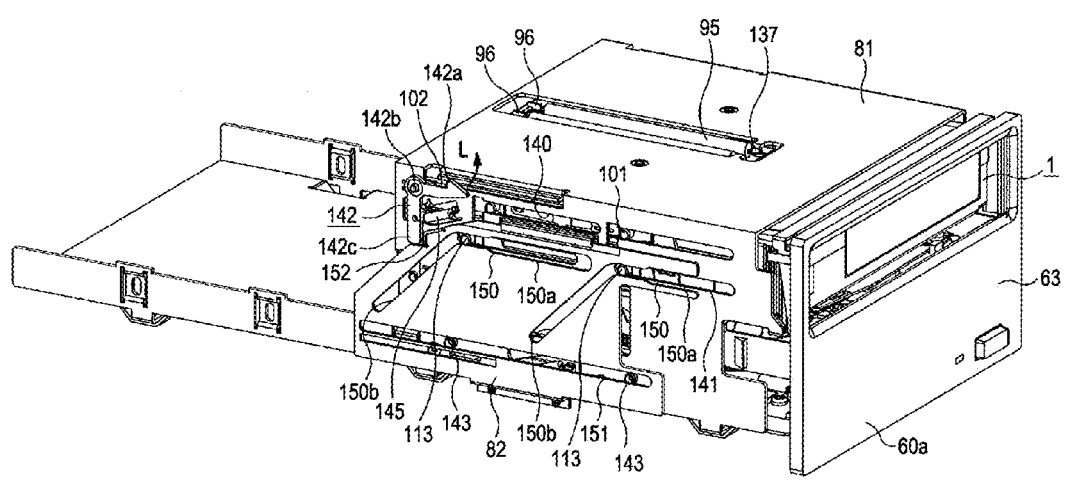
FIG. 15 is an exterior perspective view showing the selection loader.
Figure 16:
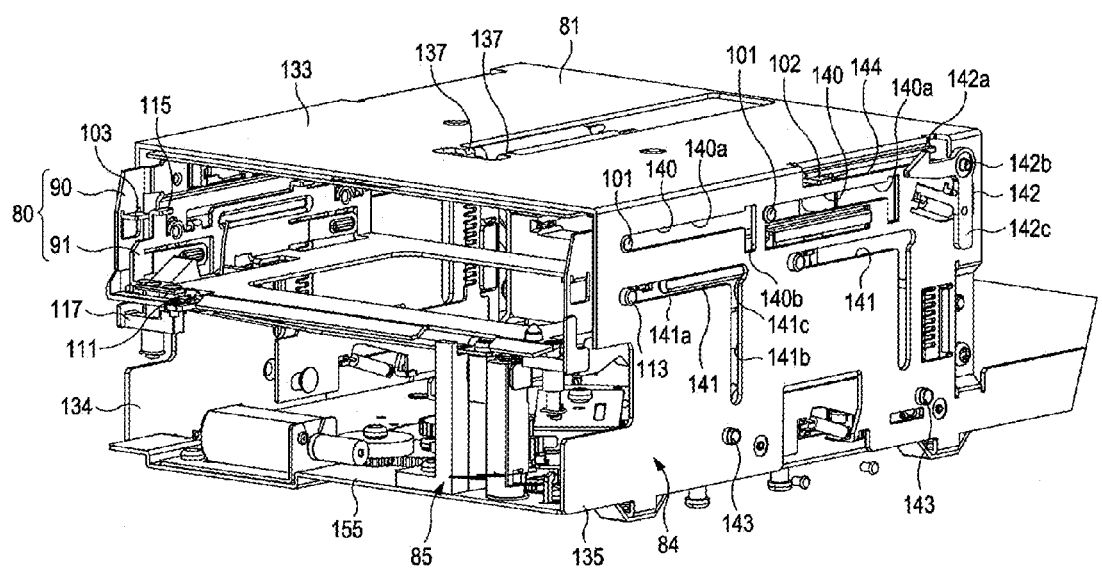
FIG. 16 is an exterior perspective view showing the selection loader.

Next, the selection loader 5 which divides the cartridge main body 10 of the disc cartridge 1 and ejects the optical disc 2 will be described. As shown in FIGS. 13, 15, and 16, the selection loader 5 includes the cartridge holder 80, in which the disc cartridge 1 is mounted, a holder lifting and lowering mechanism 84 which divides the cartridge holder 80 into the upper and lower shells 11 and 12 and transports the lower shell 12 to the disc insertion/ejection position, and a disc extruding mechanism 85 which extrudes the optical disc 2 from the lower shell 12 transported to the disc insertion/ejection position, to the carrying loader 6 side. The holder lifting and lowering mechanism 84 includes the holder cover 81 which slidably supports the cartridge holder 80, cam plates 82 which transport the cartridge holder 80, and a driving mechanism 83 which slides the cam plates 82.

The cartridge holder 80 includes an upper holder 90 which holds the upper shell 11 and a lower holder 91 which holds the lower shell 12, and the upper holder and the lower holder are combined so as to be able to be separated from each other. The cartridge holder 80 is moved by the holder lifting and lowering mechanism 84, which will be described later, among the cartridge insertion/removal position where the cartridge holder is slid to the front face 60a side of the apparatus main body 60, an insertion position where the cartridge holder is slid from the cartridge insertion/removal position to the back face 60b side of the apparatus main body 60, and the disc insertion/ejection position where the cartridge holder is moved down from the insertion position and the insertion and ejection of the optical disc 2 is performed. Then, at the cartridge insertion/removal position and the insertion position, the upper holder 90 and the lower holder 91 of the cartridge holder 80 are combined with each other and the cartridge main body 10 is inserted or removed. Also, by descent of the lower holder 91 of the cartridge holder 80 to the disc insertion/ejection position, the upper and lower holders 90 and 91 are separated from each other, whereby the insertion and ejection of the optical disc 2 becomes possible.

The upper holder 90 is supported so as to be able to slide in the front-and-back direction of the apparatus main body 60 by the holder cover 81, thereby being held at the cartridge insertion/removal position where the cartridge main body 10 is inserted into and removed from the apparatus main body 60 and the insertion position where the cartridge main body 10 is slid to the back face 60b side of the apparatus main body 60. The upper holder 90 includes a support surface portion 93 of an approximately rectangular shape, which supports the top plate 13 of the upper shell 11, and a pair of left and right upper side surface portions 94 and 94 provided to erect from both side edges of the support surface portion 93, and at the support surface portion 93 and the upper side surface portions 94 and 94, unlock mechanisms 92 which release the locking of the lock mechanism 30 are provided.

At the approximate center on the back face 60b side of the support surface portion 93, spring engaging portions 96 are formed, and tension coil springs 95 are provided to extend between the spring engaging portions and the holder cover 81. The upper holder 90 is biased to the front face 60a side of the apparatus main body 60 by the tension coil springs 95. In addition, the upper holder 90 may also be made so as to be slid backward and forward by a driving mechanism using a motor, in place of using the tension coil springs 95.

Figure 17:
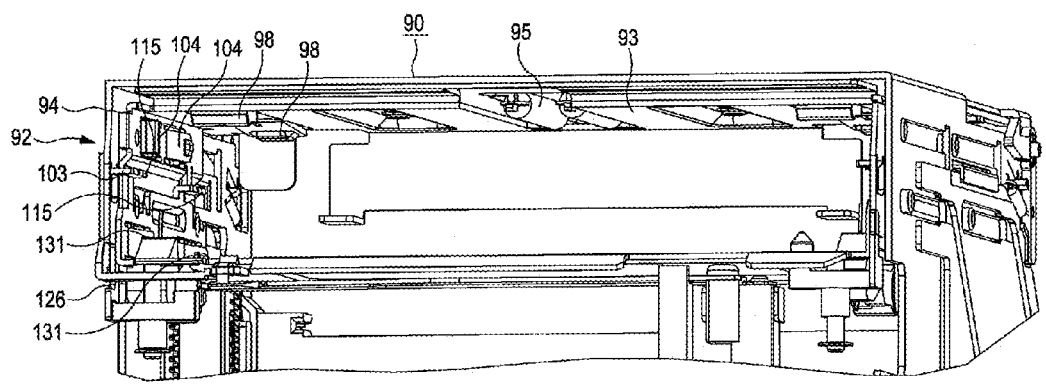
FIG. 17 is a perspective view showing a cartridge holder.

Also, as shown in FIG. 17, at the inner surface of the support surface portion 93, which faces the top plate 13 of the upper shell 11, upper shell holding convex portions 98 are formed which are engaged with the concave portions 21 formed in the top plate 13. The upper shell holding convex portions 98 are each made of a rectangular elastic piece having flexibility, which extends from the support surface portion 93 to the inner surface side. The upper shell holding convex portions 98 are formed at the front face 60a side and the back face 60b side of the apparatus main body 60. Also, a resin part such as POM is fitted into the leading end portion of the upper shell holding convex portion 98 formed at the front face 60a side, and the upper shell holding convex portions 98 which is formed at the back face 60b side and engaged with the concave portions 21 is formed by embossing sheet metal.

A pair of left and right upper side surface portions 94 and 94 is provided with holder engaging pieces 100 which are engaged with the lower holder 91, cam pins 101 which are slidably engaged with the holder cover 81, holder holding pieces 102 which hold the cartridge holder 80 at the back face 60b side of the apparatus main body 60 against the biasing forces of the tension coil springs 95, and the upper shell dividing pieces 103 which enter into the dividing grooves 47 of the cartridge main body 10 hold the upper shell 11 at the upper holder 90.

The holder engaging pieces 100 are engaged with engaging cam pins 113, which are provided in a protruding state at the lower holder 91, from above, thereby combining the upper and lower holders 90 and 91 so as to be able to integrally slide in the front-and-back direction of the apparatus main body 60. The holder engaging pieces 100 are provided being spaced from each other in the front-and-back direction of the upper side surface portion 94 corresponding to the engaging cam pins 113 of the lower holder 91. In each holder engaging piece 100, a slit 100a having a lower end opened is formed. The slit 100a is formed in the up-and-down direction approximately perpendicular to the insertion and removal direction of the cartridge main body 10, so that according to ascent and descent of the lower holder 91, the engaging cam pin 113 provided in a protruding state at the lower holder 91 enters into the slit from the lower end, which is an opened end, and is retreated from the slit. In the cartridge holder 80, the upper holder 90 and the lower holder 91 are engaged with each other by engagement of the holder engaging pieces 100 with the engaging cam pins 113 and can integrally slide in the front-and-back direction of the apparatus main body 60.

The cam pins 101 are to be inserted into upper cam slits 140 formed in the holder cover 81, thereby supporting the upper holder 90 so as to be able to slide in the front-and-back direction of the apparatus main body 60 along the upper cam slits 140. The cam pins 101 are provided in a protruding state at the outer surfaces of the upper side surface portions 94 and 94 so as to be spaced from each other in the front-and-back direction.

The holder holding pieces 102 are provided to protrude outward at the back face 60b sides of the upper portion side surface portions 94 and 94. The holder holding pieces 102 are to be engaged with holder latches 142 supported to turn on the holder cover 81, thereby holding the cartridge holder 80 biased to the front face 60a side of the apparatus main body 60 by the tension coil springs 95, at the back face 60b side of the apparatus main body 60. The holder holding pieces 102 protrude from insertion grooves 144 formed in the font-and-back direction of the holder cover 81 to the outer surface side of the holder cover 81, and if the cartridge main body 10 is mounted and the cartridge holder 80 is slid to the back face 60b side of the apparatus main body 60, the holder holding pieces 102 are locked to the holder latches 142 provided at the outer surfaces of the holder cover 81.

Also, at the upper side surface portion 94, pressing pieces 104 are formed which press the dividing walls 32 of the upper shell 11. The pressing pieces 104 are each made of a plate-like body having flexibility, which protrudes from the upper side surface portion 94 to the inside of the upper holder 90. A resin part such as POM is fitted into the pressing piece 104 provided at the front face 60a side of the apparatus main body 60, and the pressing piece 104 provided at the back face 60b side is formed by embossing sheet metal. The pressing pieces 104 press the upper shell 11, whereby rattling of the upper holder 90 is prevented, thereby allowing stable engagement and separation of the upper holder and the lower shell 12.

At the support surface portion 93 and the upper side surface portion 94, the unlock mechanisms 92 which release the locking of the lock mechanism 30 are formed. The unlock mechanism 92 includes the unlocking piece 99 provided at the support surface portion 93, and the upper shell dividing piece 103 provided at the upper side surface portion 94.

Figure 18:
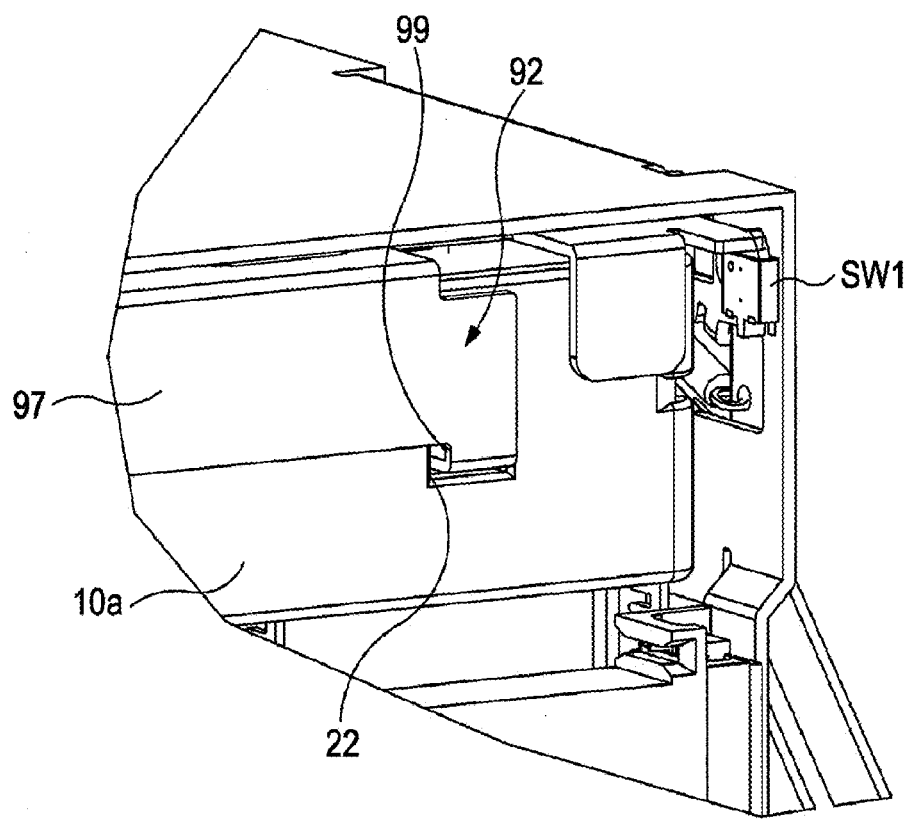
FIG. 18 is a perspective view showing an unlocking piece.

The unlocking piece 99 is for entering into the unlocking hole 22 formed in the front wall 15 of the upper shell 11 and turning the front-side locking piece 31. As shown in FIG. 18, at the side edge of the support surface portion 93 on the back face 60b side of the apparatus main body 60, a rear side surface 97 is formed being bent downward. Then, the unlocking piece 99 is formed by bending a lower end of the rear side surface 97 to the front face 60a side and formed to enter into or retreat from the unlocking hole 22 according to mounting and separation of the cartridge main body 10 on and from the cartridge holder 80.

In this way, if the cartridge main body 10 is mounted on the cartridge holder 80, the unlocking piece 99 enters into the unlocking hole 22, thereby pressing the pressing surface portion 31b, thereby turning the front-side locking piece 31 in the counter direction to the arrow R direction against the biasing force of the coil spring 35. By turning of the front-side locking piece 31 in the counter direction to the arrow R direction, the engaging portion 31c is retreated from the engaged concave portion 56, so that engagement of the front-side locking piece with the lower shell 12 is released. Also, if the cartridge main body 10 is pulled out of the cartridge holder 80, the unlocking piece 99 is withdrawn from the unlocking hole 22, thereby allowing the front-side locking piece 31 to be turned in the direction of the arrow R by the biasing force of the coil spring 35. By turning of the front-side locking piece 31 in the direction of the arrow R, the engaging portion 31c is engaged with the engaged concave portion 56.

The upper shell dividing pieces 103 enter into the dividing grooves 47 formed in the left and right side faces 10c and 10d of the cartridge main body 10, thereby releasing the locking of the rear-side locking pieces 33, and also support the lower end surfaces of the dividing walls 32 of the upper shell 11, thereby holding the upper shell 11 in the upper holder 90 which is located at the cartridge insertion/removal position. The upper shell dividing pieces 103 are each formed into the form of a flat plate capable of supporting the lower end surface of the dividing wall 32 and formed in a protruding state on the inner surfaces of the upper side surface portions 94 and 94. Also, when the upper and lower holders 90 and 91 are combined with each other, the upper shell dividing pieces 103 are arranged parallel to the lower shell dividing pieces 115 formed at the lower holder 91.

Then, if the cartridge main body 10 is inserted into the cartridge holder 80, the upper shell dividing pieces 103 enter into the dividing grooves 47, thereby pressing the pressing piece portions 33b of the rear-side locking pieces 33, thereby sliding the pressing piece portions in the counter direction to the arrow S direction, and also support the dividing walls 32 of the upper shell 11 from below. In this way, the upper shell dividing pieces 103 release the locking of the upper and lower shells 11 and 12, thereby allowing the upper and lower shells to be divided, and also support the upper shell 11 at the cartridge insertion/removal position, and then by descent of the lower shell 12, the upper and lower shells 11 and 12 are divided.

The lower holder 91 is for transporting the lower shell 12 among the cartridge insertion/removal position, the insertion position, and the disc insertion/ejection position by the ascent and descent operations thereof by the holder cover 81. The lower holder 91 includes a placement surface portion 106, on which the bottom plate 40 of the lower shell 12 is placed, and a pair of left and right lower side surface portions 107 and 107 which are erected from both side edges of the placement surface portion 106.

At the placement surface portion 106, a switch piece 111 of the identification switch 110 which comes into contact with the contact piece 25b of the erroneous erasure prevention switch 25 disposed in the cartridge main body 10 protrudes. The switch piece 111 is provided at the identification switch 110 so as to have flexibility, thereby allowing contact and separation. Also, the switch piece 111 is formed at a position where, if the cartridge main body 10 is mounted on the cartridge holder 80, the switch piece can enter into the contact hole 27 which is provided in the lower surface of the cartridge main body 10 and faces the contact piece 25b of the erroneous erasure prevention switch 25.

As described above, by an operation of the knob portion 25a in a direction which prohibits writing to the optical disc 2, the contact piece 25b is moved to the side which faces the switch piece 111 through the contact hole 27 formed in the lower surface portion 14b of the rear block 14, which constitutes a portion of the lower surface of the cartridge main body 10 along with the lower shell 12. Also, by an operation of the knob portion 25a in a direction which allows writing to the optical disc 2, the contact piece 25b is moved to the side which does not face the switch piece 111 through the contact hole 27.

Figure 19A:
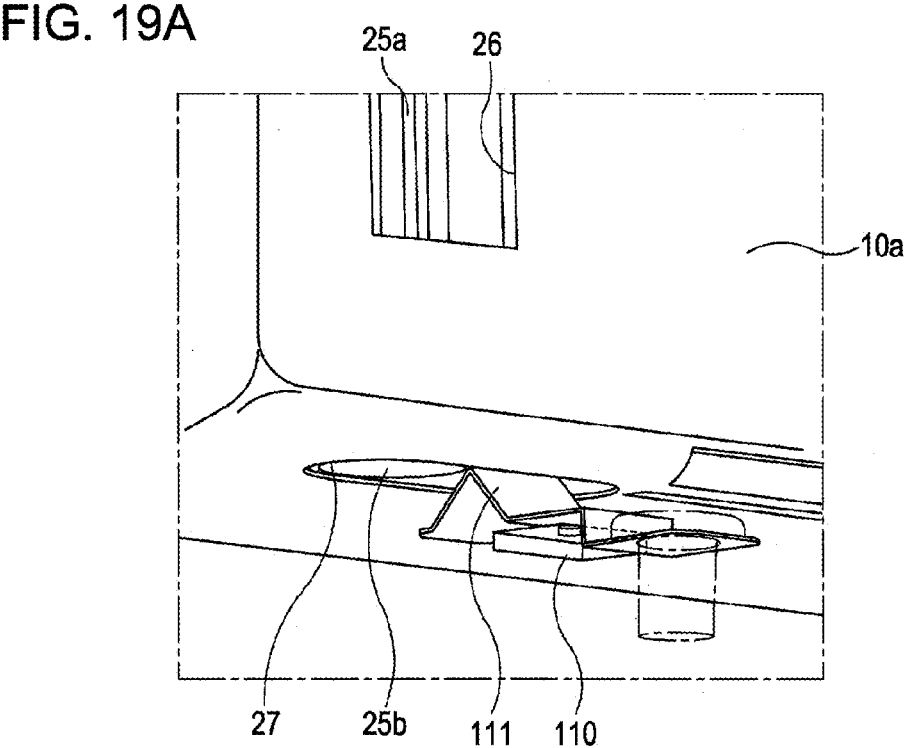
FIG. 19A is a perspective view showing a contact switch piece which is separated from an erroneous erasure prevention switch and FIG. 19B is a perspective view showing the contact switch piece which comes into contact with the erroneous erasure prevention switch.
Figure 19B:
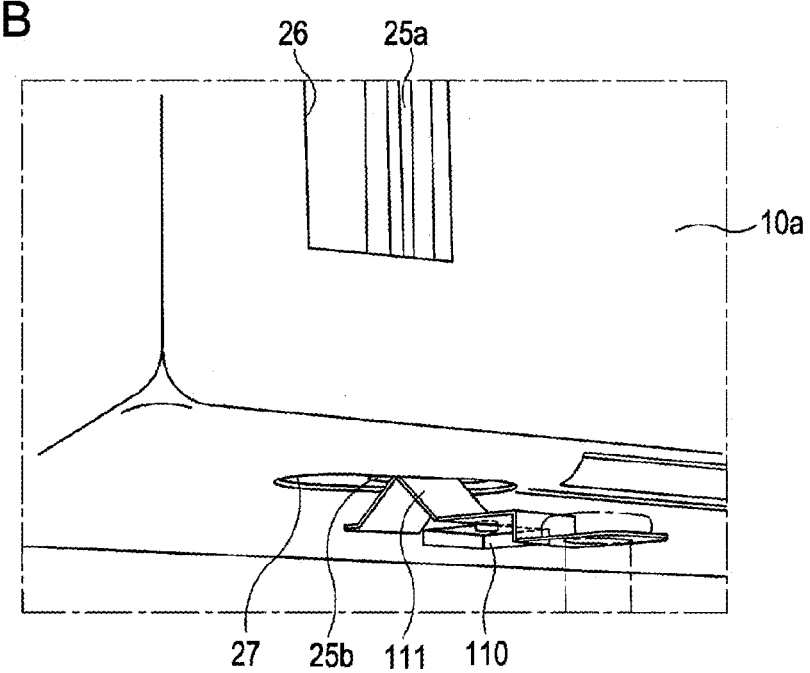

Then, as shown in FIG. 19A, when the switch piece 111 enters into the contact hole 27 and does not come into contact with the contact piece 25b of the erroneous erasure prevention switch 25, since the contact piece does not come into contact with the identification switch 110, the identification switch 110 remains off (writing is possible). On the other hand, as shown in FIG. 19B, if the switch piece 111 enters into the contact hole 27, thereby coming into contact with the contact piece 25b of the erroneous erasure prevention switch 25, the contact piece is deflected below the placement surface portion 106 and comes into contact with the identification switch 110, thereby turning on the identification switch 110 (writing is not allowed).

Figure 20:
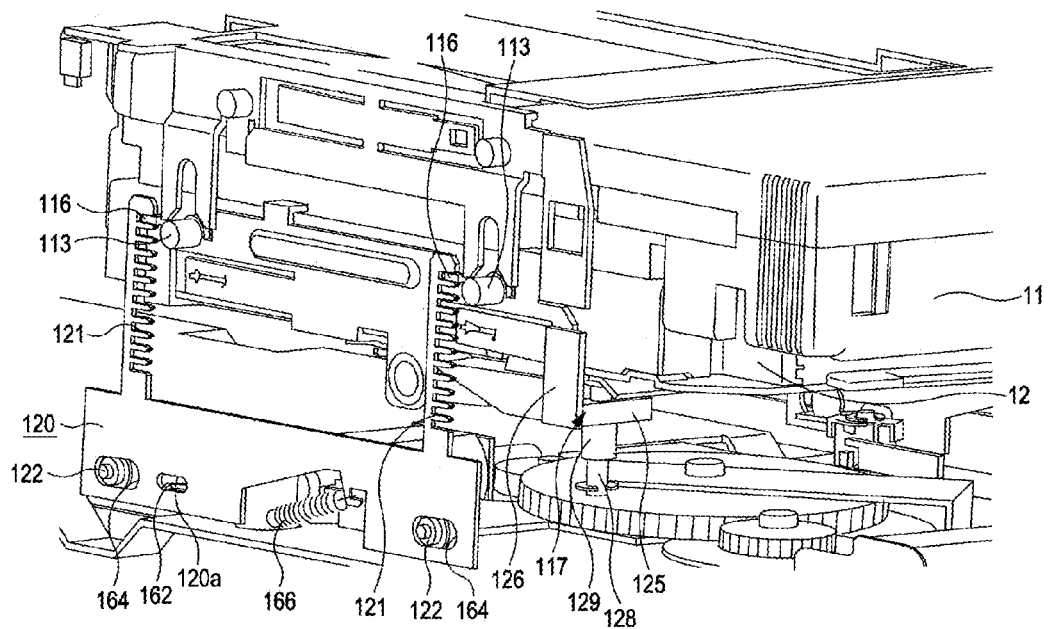
FIG. 20 is a perspective view of the selection loader.
Figure 21:
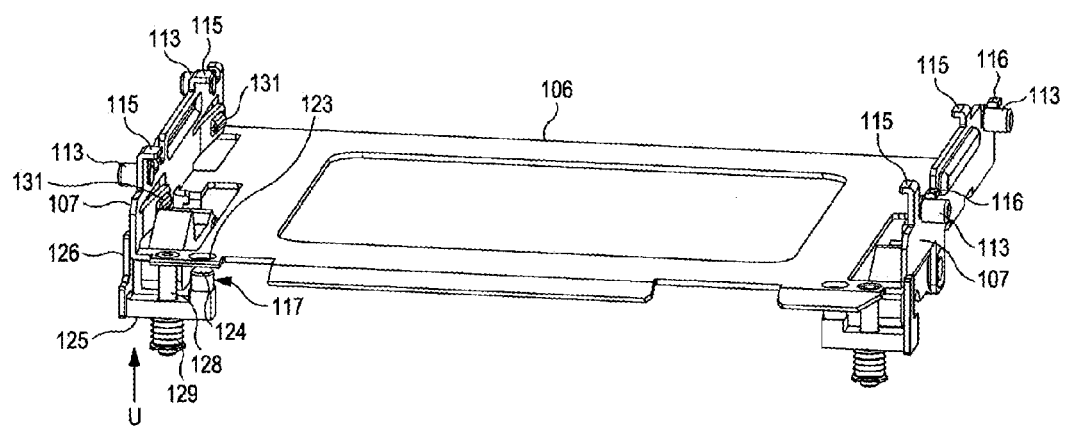
FIG. 21 is a perspective view showing a lower holder.

As shown in FIGS. 17, 20, and 21, a pair of left and right lower side surface portions 107 and 107 includes the engaging cam pins 113 which are engaged with the upper holder 90 and also slidably engaged with the holder cover 81, the lower shell dividing pieces 115 which enter into the dividing grooves 47 of the cartridge main body 10 and hold the lower shell 12 at the lower holder 91, height regulating pieces 116 which precisely restrict the height of the lower shell 12 which is located at the disc insertion/ejection position, and shell positioning pins 117 which attain the positioning of the lower shell 12 placed on the placement surface portion 106.

The engaging cam pins 113 are to be engaged with the holder engaging pieces 100 of the upper holder 90, thereby combining the upper and lower holders 90 and 91 so as to be able to slide in the front-and-back direction of the apparatus main body 60. The engaging cam pins 113 are formed to protrude outward and be spaced from each other in the front-and-back direction of the lower side surface portion 107. Then, when the upper and lower holders 90 and 91 are combined with each other at the cartridge insertion/removal position, the engaging cam pins 113 enter into the slits 100a of the holder engaging pieces 100 of the upper holder 90. As a result, the lower holder 91 is integrated with the upper holder 90 in the front-and-back direction of the apparatus main body 60 and slid in the front-and-back direction integrally with the upper holder 90.

Also, the engaging cam pins 113 are inserted into lower cam slits 141 formed in the holder cover 81, thereby supporting the lower holder 91 so as to be able to slide in the front-and-back direction and the up-and-down direction of the apparatus main body 60 along the lower cam slits 141.

The lower shell dividing pieces 115 are for entering into the dividing grooves 47 formed in the left and right side faces 10c and 10d of the cartridge main body 10, thereby supporting the upper end surfaces of the entry grooves 43 formed in the left and right disc holder 41 and 42 of the lower shell 12, thereby holding the lower shell 12 in the lower holder 91. The lower shell dividing pieces 115 are each formed into the form of a flat plate capable of supporting the upper end surface of the entry groove 43 and formed in a protruding state at the inner surfaces of the lower side surface portions 107 and 107. Also, by combination of the upper and lower holders 90 and 91 with each other, the lower shell dividing pieces 115 are disposed adjacent to the upper shell dividing pieces 103 formed at the upper holder 90.

Then, if the cartridge main body 10 is inserted into the cartridge holder 80, the lower shell dividing pieces 115 enter into the dividing grooves 47, thereby supporting the upper end surfaces of the entry grooves 43 of the lower shell 12 from above. In this way, the lower shell dividing pieces 115 hold the lower shell 12 in the lower holder 91, and then, if the lower shell 12 is moved down from the cartridge insertion/removal position to the disc insertion/ejection position by the cam plates 82 which will be described later, the lower shell dividing pieces divide the lower shell 12 from the upper shell 11.

The height regulating pieces 116 are for attaining the positioning of the lower holder 91 moved down to the disc insertion/ejection position, thereby positioning a given optical disc 2 among a plurality of optical discs 2 stacked and stored in the cartridge main body 10, on the turning locus of the extrusion lever 167. As shown in FIG. 20, the height regulating pieces 116 are formed to protrude outward and be spaced from each other in the front-and-back direction of the lower side surface portions 107 and 107 and are engaged with a height adjusting plate 120.

As shown in FIG. 20, the height adjusting plate 120 is supported on support protrusion portions 122 provided at the inner surface of each of the support side surface portions 134 and 135 of the holder cover 81, so as to be able to slide in the front-and-back direction of the apparatus main body 60, and is slid by the driving mechanism 83 which will be described later. In the height adjusting plate 120, a plurality of adjusting slits 121 which is formed at the same intervals as support intervals of the optical disc 2 stored in the cartridge main body 10 is formed. Each adjusting slit 121 is to be engaged with the height regulating piece 116, thereby attaining the positioning of the lower holder 91 at the disc insertion/ejection position where a corresponding optical disc 2 among a plurality of optical discs 2 supported by the support grooves 48 is located on the turning locus of the extrusion lever 167. The adjusting slit 121 is opened toward the height regulating piece 116 of the lower holder 91 moved down to the disc insertion/ejection position, and made so as to be able to be engaged with or separated from the height regulating piece 116 by the sliding of the height adjusting plate 120. In addition, the adjusting slit 121 is made such that the leading end of each opening portion thereof is widened, whereby the height regulating piece 116 is easily drawn in.

If the lower holder 91 is moved down by the cam plates 82 up to the disc insertion/ejection position where a given optical discs 2, in which recording and/or reproducing of an information signal are performed, is located on the turning locus of the extrusion lever 167, the height adjusting plate 120 slides, thereby being engaged with the height regulating piece 116. As a result, the lower holder 91 is restricted at the disc insertion/ejection position of the given optical discs 2, and erroneous insertion and ejection in which other optical discs 2 stacked up and down are located at the disc insertion/ejection position can be prevented.

The shell positioning pins 117 are to be inserted into the positioning holes 45 perforated in the bottom plate 40 of the lower shell 12, thereby attaining the positioning of the lower shell 12 in the lower holder 91. As shown in FIG. 21, the shell positioning pins 117 are provided at both sides in the width direction of a front edge which becomes an insertion end of the cartridge main body 10. Each shell positioning pin 117 includes an insertion pin 124 which is inserted into the positioning hole 45 through a pin hole 123 provided at the lower holder 91, an ascent and descent block 125, at which the insertion pin 124 is provided in a protruding state, and a pushed piece 126 which is pushed down by the upper holder 90. Also, in each shell positioning pin 117, an ascent and descent shaft 128 mounted on the lower holder 91 passes through the ascent and descent block 125 so as to be able to move up and down, and by sliding of the ascent and descent block on the ascent and descent shaft 128, the insertion pin 124 can advance above or retreat below the placement surface portion 106 farther than the pin hole 123.

The ascent and descent shaft 128 is provided below the placement surface portion 106, and a coil spring 129 which presses upward the ascent and descent block 125 is provided around a leading end portion of the ascent and descent shaft. The coil spring 129 is locked to an engaging member such as an E-ring provided at the leading end of the ascent and descent shaft 128 and biases the ascent and descent block 125 in the direction of an arrow U in FIG. 21, in which the insertion pin 124 protrudes above the placement surface portion 106.

The pushed piece 126 extends further on the outside of the lower side surface portion 107 than the ascent and descent block 125 and is pushed down by the upper holder 90, thereby pushing down the ascent and descent block 125 in the counter direction to the arrow U direction against the biasing force of the coil spring 129, thereby making the insertion pin 124 be retreated from the upper side of the placement surface portion 106.

Figure 22:
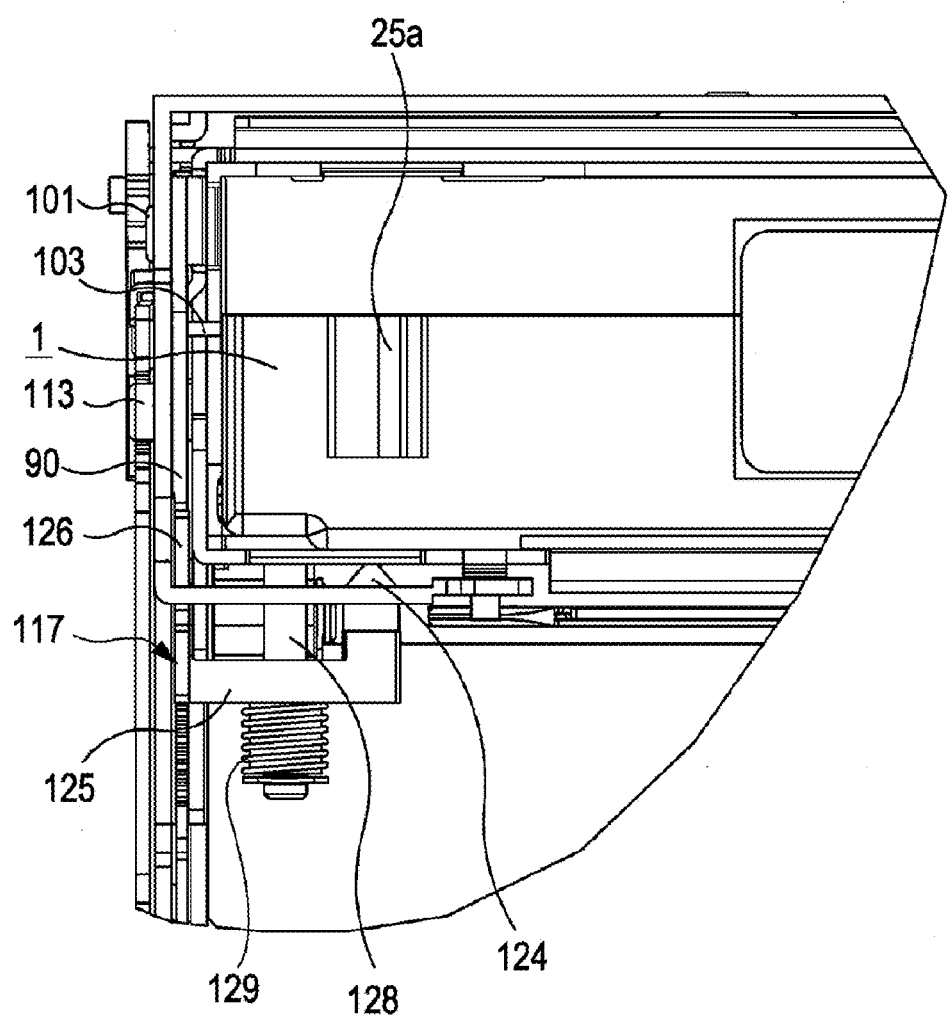
FIG. 22 is a perspective view showing a shell positioning pin in a state where upper and lower holders are confronted with each other.

When the upper and lower holders 90 and 91 are confronted with each other, the pushed pieces 126 are pushed down by the upper holder 90, as shown in FIG. 22. Therefore, the shell positioning pins 117 allow the cartridge main body 10 to be mounted in or separated from the cartridge holder 80. Also, if the cartridge main body 10 is mounted and the lower holder 91 is moved down to the disc insertion/ejection position, since the pressing of the pushed pieces 126 by the upper holder 90 is released, the ascent and descent blocks 125 of the shell positioning pins 117 are moved up by the coil springs 129. In this way, the insertion pins 124 are inserted into the positioning holes 45 of the lower shell 12 through the pin holes 123, so that the shell positioning pins 117 can attain the positioning of the lower shell 12 in the lower holder 91.

In addition, at the lower side surface portions 107, pressing pieces 131 are formed which press the left and right disc holder 41 and 42 of the lower shell 12. Each pressing piece 131 is made of a plate-like body having flexibility, which protrudes from the lower side surface portion 107 to the inside of the lower holder 91. A resin part such as POM is fitted into the pressing piece 131 provided at the front face 60a side of the apparatus main body 60, and the pressing piece 131 provided at the back face 60b side is formed by embossing sheet metal. By pressing of the lower shell 12 by the pressing pieces 131, rattling of the lower holder 91 is prevented, thereby allowing insertion and ejection of the optical disc 2 or engagement and separation of the lower holder with and from the upper shell 11 to be stably performed.

Next, the holder lifting and lowering mechanism 84 which moves the cartridge holder 80 up and down will be described. As described above, the holder lifting and lowering mechanism 84 includes the holder cover 81 which slidably supports the cartridge holder 80, the cam plates 82 which transport the cartridge holder 80, and the driving mechanism 83 which slides the cam plates 82.

The holder cover 81 is for slidably supporting the cartridge holder 80 and is integrally fixed to the apparatus main body 60 by being co-fastened to the cover connection portions 67 of the bottom cover 62 along with the top cover 61 of the apparatus main body 60, as shown in FIGS. 13 and 16. Also, the holder cover 81 includes a top surface portion 133 which is parallel to the upper face 60c of the apparatus main body 60, and a pair of left and right support side surface portions 134 and 135 which is formed being bent from both side edges of the top surface portion 133 and supports the cartridge holder 80.

At the top surface portion 133, on the front face 60a side of the apparatus main body 60, spring engaging portions 137 are formed with which one end of each of the tension coil springs 95 provided to extend between the upper surface portion and the upper holder 90 is engaged. The tension coil springs 95 are locked to the spring engaging portions 137, thereby usually biasing the cartridge holder 80 to slide the cartridge holder to the front face 60a side of the apparatus main body 60.

The support side surface portions 134 and 135 include upper cam slits 140 which guide the upper holder 90 of the cartridge holder 80, lower cam slits 141 which guide the lower holder 91, the holder latches 142 which hold the upper holder 90 at the back face 60b side of the apparatus main body 60, slide guide pins 143 which guide sliding of the cam plates 82, which will be described later, and the insertion grooves 144, into which the holder holding pieces 102 formed at the upper holder 90 are inserted.

The upper cam slit 140 and the lower cam slit 141 are for guiding movement of the cartridge holder 80. When the disc changer apparatus 3 waits for insertion of the disc cartridge 1 or ejected the disc cartridge 1, the cartridge holder 80 remains slid to the cartridge insertion/removal position which is on the front face 60a side of the apparatus main body 60. Also, in the disc changer apparatus 3, if the disc cartridge 1 is inserted from the cartridge insertion/removal opening 70, the cartridge holder 80 is pressed by the cartridge main body 10, thereby being slid to the insertion position which is on the back face 60b side. Also, when the disc changer apparatus 3 ejects the disc cartridge 1, the cartridge holder 80 is slid to the cartridge insertion and ejection position on the front face 60a side by the tension coil springs 95. At this time, the sliding of the cartridge holder 80 in the front-and-back direction is guided by the upper cam slits 140 and the lower cam slits 141. Also, when the lower holder 91 is moved up and down between the insertion position and the disc insertion/ejection position by the cam plates 82, the lower holder is guided by the lower cam slits 141.

The upper cam slits 140 are for guiding the sliding in the front-and-back direction of the cartridge holder 80 through the cam pins 101 provided in a protruding state at the upper side surface portion 94 of the upper holder 90 and inserted into the upper cam slits. The upper cam slits 140 are formed being spaced from each other in the front-and-back direction in the upper portions of the support side surface portions 134 and 135. Each upper cam slit 140 has an upper horizontal portion 140a which guides the cartridge holder 80 in the front-and-back direction and an upper vertical portion 140b which extends downward from the end portion on the back face 60b side of the upper horizontal portion 140a.

The upper cam slits 140 guide the sliding in the front-and-back direction of the upper holder 90 by the upper horizontal portions 140a in which the cam pins 101 of the upper holder 90 are inserted. At this time, since the upper holder 90 and the lower holder 91 are combined with each other by engagement of the holder engaging pieces 100 with the engaging cam pins 113, movement in the front-and-back direction of the cartridge holder 80 is guided in a state where the upper and lower holders 90 and 91 are integrated with each other. In addition, at this time, the cartridge main body 10 is in a state where the upper and lower shells 11 and 12 are combined with each other. Also, the upper cam slit 140 moves the cartridge main body 10 in the horizontal direction by using the upper horizontal portion 140a, and in ordinary use, guiding in the upper vertical portions 140b is not performed.

The lower cam slits 141 are for guiding the sliding in the front-and-back direction of the cartridge holder 80 and the sliding in the up-and-down direction of the lower holder 91 through the engaging cam pins 113 provided in a protruding state at the lower side surface portion 107 of the lower holder 91 and inserted into the lower cam slits. The lower cam slits 141 are formed being spaced from each other in the front-and-back direction approximately at the middle in the height direction of each of the support side surface portions 134 and 135. Each lower cam slit 141 has a lower horizontal portion 141a which guides the cartridge holder 80 in the front-and-back direction and a lower vertical portion 141b which is approximately perpendicular to the lower horizontal portion 141*a* and extends downward from the end portion on the back face 60*b* side of the lower horizontal portion 141*a*. In addition, at the lower horizontal portion 141*a*, a preliminary horizontal portion 141*c* is formed further on the back face 60*b* side than the lower vertical portion 141*b*.

The lower cam slits 141 guide the sliding in the front-and-back direction of the lower holder 91 by the lower horizontal portions 141*a* in which the engaging cam pins 113 of the lower holder 91 are inserted. At this time, since the lower holder 91 and the upper holder 90 are combined with each other by engagement of the engaging cam pins 113 with the holder engaging pieces 100, the cartridge holder 80 slides in a state where the upper and lower holders 90 and 91 are integrated with each other.

Also, if the lower holder 91 is slid up to the insertion position on the back face 60*b* side of the lower horizontal portion 141*a*, the lower cam slits 141 guide the engaging cam pins 113, which are moved by the cam plates 82 up and down, in the up-and-down direction by the lower vertical portions 141*b*. In this way, the lower cam slits 141 guide ascent and descent of the lower holder 91 between the cartridge insertion/removal position and the disc insertion/ejection position.

The holder latches 142 are for holding the cartridge holder 80 slid to the insertion position, which is on the back face 60*b* side of the apparatus main body 60, at the insertion position against the biasing forces of the tension coil springs 95 and are provided at the back face 60*b* sides of the support side surface portions 134 and 135. The holder latches 142 are locked to the holder holding pieces 102 formed at the upper side surface portions 94 of the upper holder 90 from the front face 60*a* side, thereby restricting the sliding to the front face 60*a* side of the lower holder 91, which integrally combines the upper holder 90 and the lower holder 91.

Each holder latch 142 has a hook portion 142*a* which is locked to the holder holding piece 102, a turning support portion 142*b* which is supported by each of the support side surface 134 and 135 so as to be able to turn, and a spring engaging piece portion 142*c*, to which a latch spring 145 is locked. Each holder latch 142 is locked to one end of the latch spring 145 locked at the other end thereof to each of the support side surface 134 and 135, thereby usually biasing the hook portion 142*a* to turn in the direction of an arrow L in FIG. 15, in which the hook portion is locked to the holder holing piece 102. Therefore, if the cartridge holder 80 is slid to the back face 60*b* side, the hook portion 142*a* is locked to the holder holding piece 102, so that the holder latch 142 can restrict the sliding of the cartridge holder 80 to the front face 60*a* side.

In addition, the cartridge holder 80 is pushed in until the holder holding pieces 102 and the hook portions 142*a* of the holder latches 142 are locked to each other, so that in the lower cam slits 141, the engaging cam pins 113 are slid from the lower horizontal portions 141*a* up to the preliminary horizontal portions 141*c* via the top portions of the lower vertical portions 141*b*. Then, if the holder holding pieces 102 are locked to the holder latches 142, in the lower cam slits 141, the engaging cam pins 113 are located at the top portions of the lower vertical portions 141*b*. As a result, the upper and lower shells 11 and 12 are held at the insertion position.

Also, when each spring engaging piece portion 142*c* is located on a sliding locus of each cam plate 82 which will be described later and the disc cartridge 1 is ejected, each spring engaging piece portion 142*c* is pressed to the back face 60*b* side by each cam plate 82, so that each holder latch 142 is turned in the counter direction to the arrow L direction in FIG. 15. As a result, the hook portions 142*a* of the holder latches 142 are deviated from the holder holding pieces 102, thereby allowing the upper holder 90 and the lower holder 91 to slide to the front face 60*a* side, and the upper holder 90 and the lower holder 91 are slid to the front face 60*a* side by the tension coil springs 95.

Also, the slide guide pins 143 which guide the sliding of the cam plates 82 are provided in a protruding state at the lower portions of the support side surface portions 134 and 135. The slide guide pins 143 are inserted into guide slits 151 formed in the cam plates 82, thereby guiding the sliding of the cam plates 82.

The insertion grooves 144, into which the holder holding pieces 102 are inserted, are formed to extend in the front-and-back direction at the back face 60*b* sides of the support side surface portions 134 and 135. The holder holding pieces 102 protrude outward and slide in the insertion grooves 144, thereby being engaged with the hook portions 142*a* of the holder latches 142.

In addition, a plurality of cover connection pieces 146 which are connected to the cover connection pieces 67 of the bottom cover 62 are formed at the lower edges in the height direction of the support side surface portions 134 and 135. The cover connection pieces 146 are co-fastened to the cover connection pieces 67 of the bottom cover 62 along with the top cover 61. Also, at the support side surface portions 134 and 135, extending support pieces 154 and 154 are formed which extend to the back face 60*b* side of the apparatus main body 60 and on which a housing 200 of the carrying loader 6, which will be described later, is mounted.

Next, the cam plates 82 which move the lower holder 91 up and down will be described. The cam plates 82 are adjacent to the outsides of the support side surface portions 134 and 135 and supported by the holder cover 81 and the driving mechanism 83, which will be described later, as to be able to slide in the front-and-back direction. As shown in FIG. 15, each cam plate 82 includes ascent and descent guide grooves 150, into which the engaging cam pins 113 provided in a protruding state at the lower holder 91 are inserted, the guide slit 151, into which the slide guide pins 143 provided in a protruding state at the bottom cover 81 are inserted, and a latch pressing portion 152 which presses the spring engaging piece portion 142*c* of the holder latch 142.

The ascent and descent guide grooves 150 are provided being spaced from each other in the front-and-back direction of each cam plate 82 and each have a horizontal guide portion 150*a* which is formed to extend in the front-and-back direction of the apparatus main body 60, thereby guiding the sliding to the same direction of the lower holder 91, and an ascent and descent guide portion 150*b* which extends obliquely downward from the end portion on the back face 60*b* side of the horizontal guide portion 150*a* and moves the lower holder 91 up and down. By the sliding of the cam plates 82 in the front-and-back direction of the apparatus main body 60 by the driving mechanism 83, the ascent and descent guide grooves 150 make the engaging cam pins 113 slide along the horizontal guide portions 150*a* and the ascent and descent guide portions 150*b*, thereby moving the lower holder 91 up and down.

Also, the cam plates 82 are connected to the driving mechanism 83 through connection sections and slid in the front-and-back direction of the apparatus main body 60 by the driving of the driving mechanism 83. At this time, the slide guide pins 143 provided at the support side surface portions 134 and 135 of the holder cover 81 are inserted into the guide slit 151 and the cam plates 82 are guided by the slide guide pins 143. The guide slit 151 is formed to extend in the front-and-back direction of the apparatus main body 60 in the lower portion of each cam plate 82.

The latch pressing portion 152 is formed at the side edge on the back face 60b side of each cam plate 82. By the sliding of the cam plates 82 to the back face 60b side, the latch pressing portions 152 press the spring engaging piece portions 142c of the holder latches 142 and turn the hook portions 142a in the counter direction to the arrow L direction, thereby deviating the hook portions 142a from the holder holding pieces 102.

Figure 23:
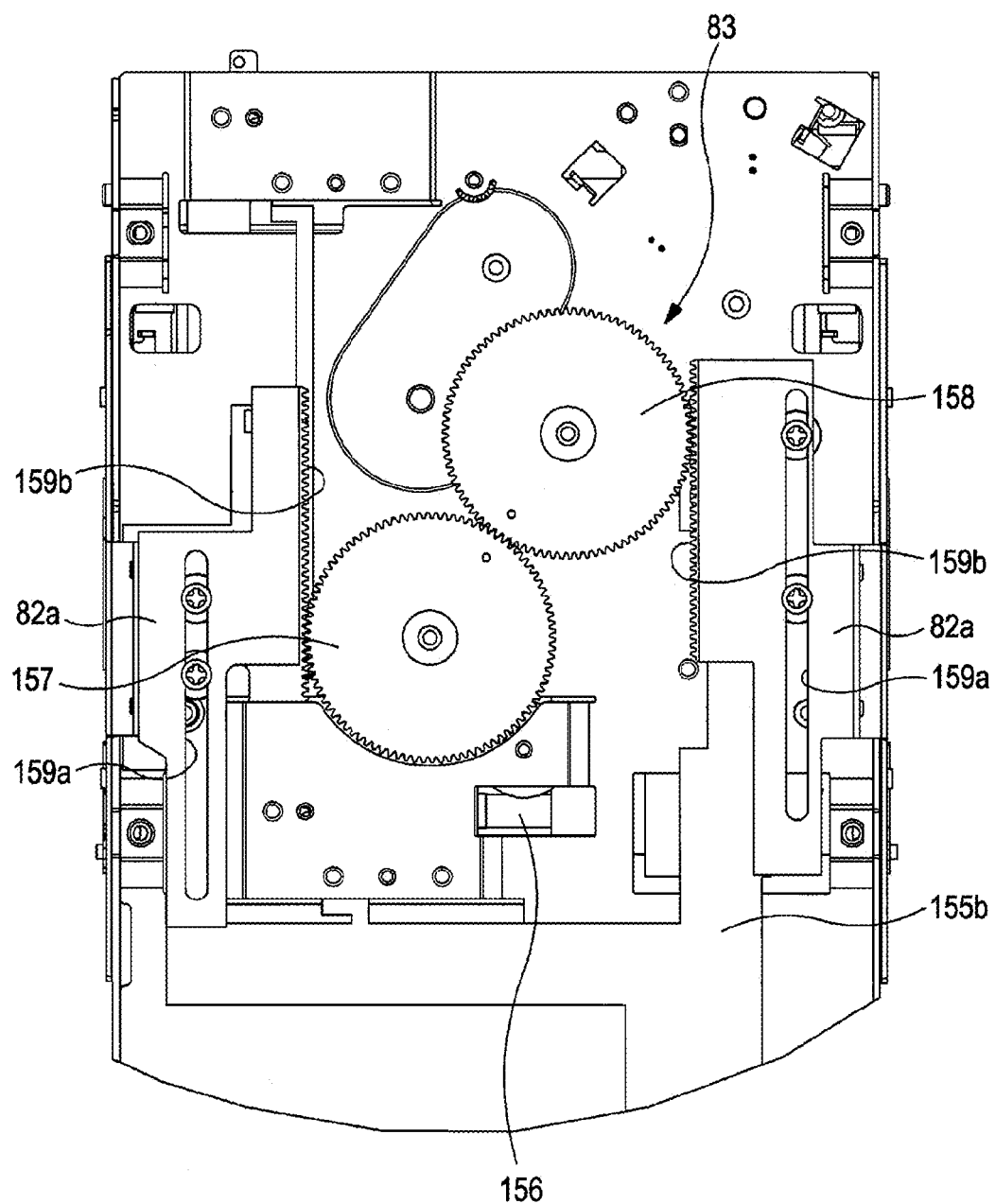
FIG. 23 is a plan view showing a driving mechanism.

As shown in FIGS. 13 and 23, the driving mechanism 83 which drives the cam plates 82 is disposed on a base plate 155, which is co-fastened to the bottom cover 62, and includes a first driving motor 156 which is a driving source, and first and second backside gears 157 and 158 which are rotationally driven by the first driving motor 156 and also respectively connected to the cam plates 82.

The base plate 155 is formed into a rectangular shape having a size approximately equal to the size of the bottom cover 62 and fixed by being co-fastened to the cover connection portions 67 of the bottom cover 62 along with the top cover 61 and the holder cover 81. On the front face 60a side of a surface 155a of the base plate 155, the disc extruding mechanism 85, which will be described later, is disposed. Also, on the back face 60b side of the surface 155a of the base plate 155, the carrying loader 6 and the recording and reproducing apparatus 7, which will be described later, are provided.

The first backside gear 157 and the second backside gear 158 are rotatably supported on a back surface 155b of the base plate 155 and also engaged with each other. Also, the first backside gear 157 is connected to the first driving motor 156 mounted on the surface 155a of the base plate 155 through a reduction gear. Also, the first backside gear 157 is meshed with a gear portion 159b of a gear connection section 82a provided to extend from the lower edge of cam plate 82 of one side to the back surface 155b side of the base plate 155. The second backside gear 158 is meshed with the first backside gear 157 and also meshed with a gear portion 159b of a gear connection section 82a provided to extend from the lower edge of the cam plate 82 of the other side to the back surface 155b side of the base plate 155.

In each of the gear connection sections 82a of the cam plates 82, there are formed a guide long-hole 159a formed to extend in the front-and-back direction of the apparatus main body 60 and the gear portion 159b which is meshed with the first backside gear 157 or the second backside gear 158.

Guide shafts provided in a protruding state at the back surface 155b of the base plate 155 are inserted into the guide long-holes 159a. Also, each gear portion 159b is formed to extend in the front-and-back direction of the apparatus main body 60.

In such a driving mechanism 83, if the first driving motor 156 is driven, the first backside gear 157 and the second backside gear 158 are rotated, thereby moving the gear connection sections 82a along the guide long-holes 159a. In this way, a pair of left and right cam plates 82 is slid in the front-and-back direction of the apparatus main body 60 in synchronization with each other.

In the state of waiting for insertion of the disc cartridge 1, the cam plates 82 remain slid to the back face 60b side of the apparatus main body 60. Also, in the cartridge holder 80, the cam pins 101 and the engaging cam pins 113 are guided in the horizontal guide portions 150a of the cam plates 82 and the upper horizontal portions 140a and the lower horizontal portions 141a of the holder cover 81, whereby the upper and lower holders 90 and 91 are combined with each other and held at the cartridge insertion/removal position.

Then, in the apparatus main body 60, if the disc cartridge 1 is inserted into the cartridge holder 80, so that the cartridge holder 80 is slid to the back face 60b side of the apparatus main body 60 against the biasing forces of the tension coil springs 95, the hook portions 142a of the holder latches 142 are locked to the holder holding pieces 102, thereby regulating the sliding to the front face 60a side of the apparatus main body 60. If the sliding of the cartridge holder 80 up to such a position is detected, the cam plates 82 are slid to the front face 60a side by the driving of the first driving motor 156. Also, the engaging cam pins 113 are slid from the horizontal guide portions 150a to the ascent and descent guide portions 150b, thereby being moved down from the lower horizontal portion 141a of the holder cover 81 along the lower vertical portion 141b, whereby the lower holder 91 is transported to the disc insertion/ejection position.

Figure 24:
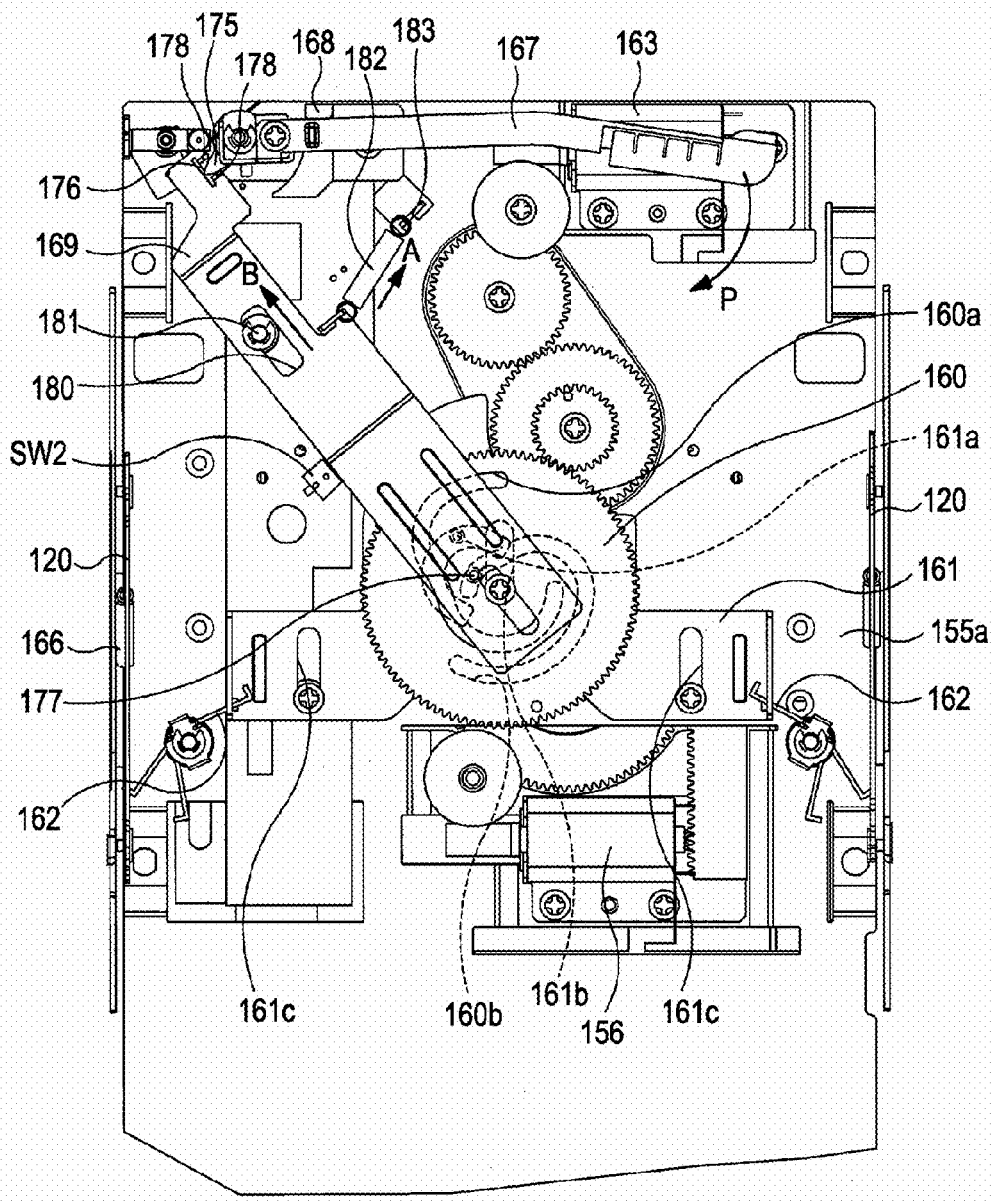
FIG. 24 is a plan view showing the driving mechanism.

Also, as shown in FIG. 24, in the driving mechanism 83, a surface cam gear 160 is rotatably supported on the surface 155a of the base plate 155. The surface cam gear 160 is connected to a second driving motor 163 provided at the base plate 155 through a reduction gear. Also, in the surface cam gear 160, a second cam groove 160a is formed which slides the height adjusting plate 120 described above. A cam pin 161a of an adjusting slide plate 161 is engaged with the second cam groove 160a. At the adjusting slide plate 161, straight-advance guide grooves 161b and 161c are provided to extend in the front-and-back direction of the apparatus main body 60, and a guide shaft provided in an erect manner at the base plate 155 and a rotary shaft of the surface cam gear 160 are inserted into these straight-advance guide grooves 161b and 161c, so that the adjusting slide plate is supported so as to be able to slide in the front-and-back direction.

Also, adjusting springs 162 are locked to the adjusting slide plate 161. Each adjusting spring 162 is supported so as to be able to turn on a support shaft provided in a protruding state at the base plate 155 and also is at one end to the adjusting slide plate 161 and at the other end locked to the spring engaging hole 120a opened at each height adjusting plate 120 (FIG. 20).

At each height adjusting plate 120, long holes 164 extending in the front-and-back direction of the apparatus main body 60 are provided. Also, as described above, at the inner surfaces of the support side surface portions 134 and 135 of the holder cover 81, the support protrusion portions 122, which are inserted into the long holes 164, thereby guiding the sliding of the height adjusting plate 120, are provided in a protruding state. The support protrusion portions 122 are inserted into the long holes 164, whereby the height adjusting plate 120 is supported on the support protrusion portions 122 so as to be able to slide in the front-and-back direction of the apparatus main body 60. Also, a spring 166 is provided to extend between the support side surface portions 134 and 135 of the holder cover 81, whereby the height adjusting plate 120 is usually biased to slide to the back face 60b side of the apparatus main body 60.

Then, in the height adjusting plate 120, if the surface cam gear 160 is rotated, the cam pin 161a moves in contact with the second cam groove 160a, whereby the adjusting slide plate 161 is slid to the back face 60b side of the apparatus main body 60. As a result, the other ends of the adjusting springs 162 are turned to the front face 60a side, whereby it is possible to slide the height adjusting plate 120 to the front face 60a side of the apparatus main body 60 along the long hole 164.

Next, the disc extruding mechanism 85 which extrudes the optical disc 2 to the carrying loader 6 side will be described. The disc extruding mechanism 85 is provided at the front face 60a side of the surface 155a of the base plate 155 and is for pushing the optical disc 2 from the disc extrusion opening 51 of the lower shell 12 transported to the disc insertion/ejection position, thereby discharging the optical disc from disc insertion/ejection opening 50. As shown in FIGS. 24 and 25, the disc extruding mechanism 85 includes the extrusion lever 167 which extrudes the optical disc 2, a lever support wall 168 which supports the extrusion lever 167, a lever slider 169 which turns the extrusion lever 167, and the second driving motor 163 which provides a driving force for turning the extrusion lever 167.

As shown in FIG. 25, the extrusion lever 167 is formed into a long and flat plate shape and has a thickness which can enter into the support groove 48 which is formed in the inner surface side of each of the left and right disc holders 41 and 42 and support the optical disc 2. Also, a disc contact member 173 made of a resin member softer than the optical disc 2 is fitted into a leading end portion of the extrusion lever 167, which enters into the support groove 48.

The disc contact member 173 is for pressing the outer circumferential surface of the optical disc 2, thereby discharging the optical disc from the disc insertion/ejection opening 50, and the leading end thereof is formed into a circular arc shape and made to be able to come into contact with the optical disc 2 without damaging the optical disc.

A base end portion of the extrusion lever 167 is rotatably supported on the upper end of a lever support shaft 172 provided in a protruding state at the front face 60a side of the base plate 155. In this way, if the lever slider 169, which will be described later, is slid, the extrusion lever 167 depicts a turning locus in the direction of an arrow P in FIG. 25, in which the extrusion lever extrudes the optical disc 2 to the disc insertion/ejection opening 51, and the counter direction to the arrow P direction, in which the extrusion lever returns to the disc insertion/ejection opening 51 side, with the lever support shaft 172 as a fulcrum. The turning locus is set to be equal to a locus of the guide portion 48c formed into a circular arc shape at the support groove 48. Therefore, if the extrusion lever 167 enters into the support groove 48, since the extrusion lever is turned along the guide portion 48c, the disc contact member 173 is supported on the guide portion 48c.

Here, the extrusion lever 167 is supported by the lever support shaft 172, thereby being turned at the height of the disc insertion/ejection position. Then, the lower shell 12 is moved down such that a given optical disc 2 which is ejected to the carrying loader 6 side is located at the height of the disc insertion/ejection position, whereby the given optical disc 2 is made so as to able be pressed by the extrusion lever 167 of the disc extruding mechanism 85. In this manner, in the disc extruding mechanism 85, a height where insertion and ejection of the optical disc 2 is performed is determined. Therefore, by moving the lower holder 91 up and down, the holder lifting and lowering mechanism 84 fits the storage position of a given optical disc 2 to a height where insertion and ejection of the optical disc 2 by the disc extruding mechanism 85 is performed, that is, the disc insertion/ejection position, thereby selecting a given optical disc 2, in which recording or reproducing is performed, among a plurality of optical discs 2 stacked and stored and also enabling insertion and ejection of the given optical disc 2. In this way, the selection loader 5 can simply and easily realize a configuration in which the cartridge main body 10 is divided so as to enable insertion and ejection of the optical disc 2 and at the same time, selection of a given optical disc 2 among a plurality of optical discs 2 is performed.

Figure 26A:
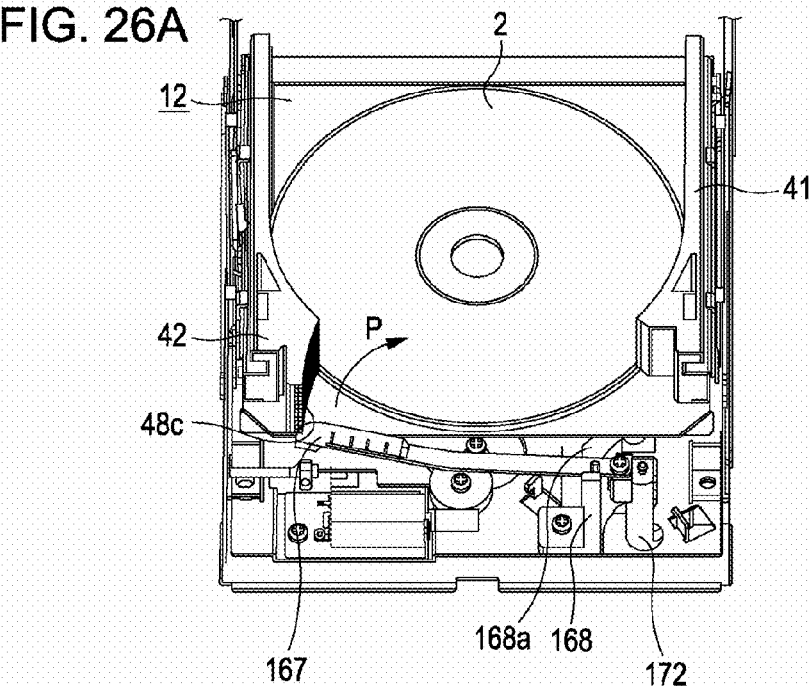

The extrusion lever 167 can eject the optical disc 2 stored at the storage position from the disc insertion/ejection opening 50 by being turned further to the front face 60a side of the apparatus main body 60 than the guide portion 48c. At this time, as shown in FIG. 26A, since the extrusion lever 167 enters in advance into the guide portion 48c of the support groove 48 which supports a given optical disc 2, it is possible to extrude the given optical disc 2 supported in the support groove 48.

Figure 30:
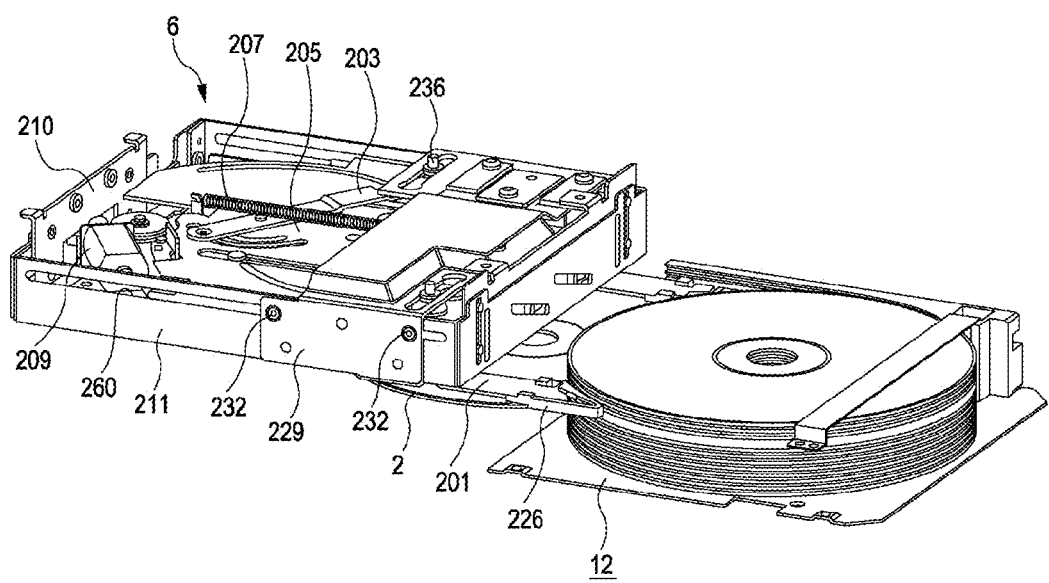
FIG. 30 is a perspective view showing the carrying loader which draws in the optical disc.

The extrusion lever 167 transports the optical disc up to a position where at least the central hole 2a of the optical disc 2 is ejected from the disc insertion/ejection opening 50, by extruding the optical disc 2. In this way, the disc extruding mechanism 85 can eject the optical disc 2 up to a position where a loading arm 201 of the carrying loader 6, which will be described later, can grip the rear end side in an ejection direction farther than the central hole 2a of the optical disc 2 (FIG. 30).

Figure 26B:
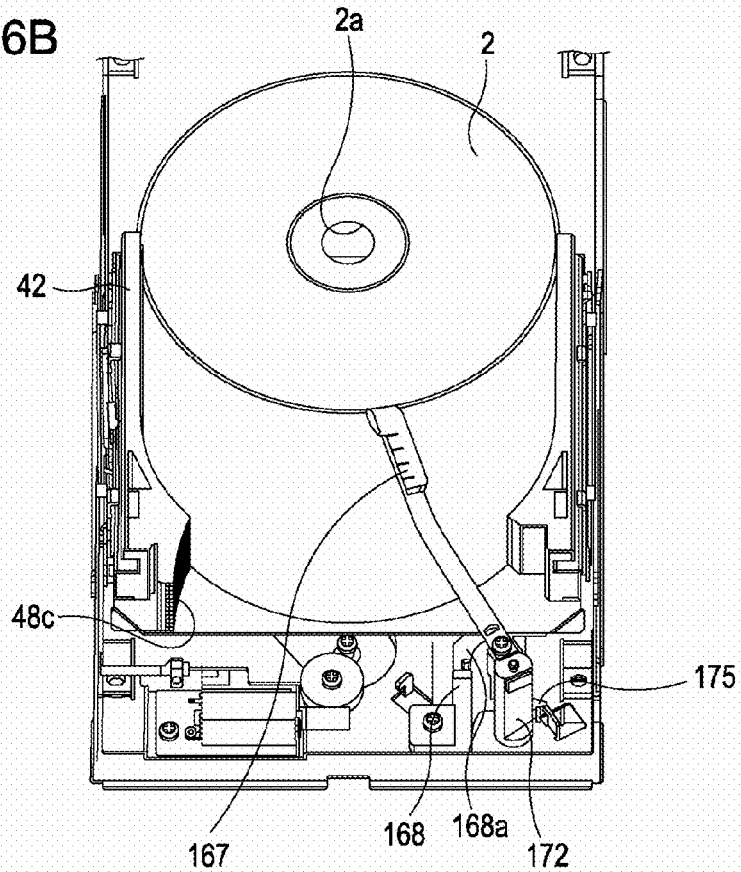

The extrusion lever 167 is supported over the entire turning region by the lever support wall 168. As shown in FIG. 26B, when the extrusion lever 167 is turned further forward than the guide portion 48c of the support groove 48, the leading end portion thereof is deviated from the support groove 48. For this reason, the lever support wall 168 prevents the elongated extrusion lever 167 from rocking, thereby being deviated from contact with a given optical disc 2 which is ejected or colliding with another optical disc 2.

The lever support wall 168 is provided in the vicinity of the lever support shaft 172 which supports the extrusion lever 167 and provided with a support surface 168a of a circular arc shape according to the turning locus of the base end side of the extrusion lever 167. Also, the support surface 168a of the lever support wall 168 is formed at a height where the extrusion lever 167 is supported by the lever support shaft 172. Also, the lever support wall 168 is provided at the base end side of the extrusion lever 167, thereby being able to support the extrusion lever over the entire turning region of the extrusion lever 167.

The lever slider 169 is for turning the extrusion lever 167 by being slid by the driving mechanism 83 and is formed into an approximately rectangular plate shape, as shown in FIG. 24. The lever slider 169 is provided at one end in a longitudinal direction with an operating concave portion 176 which is engaged with a turning operation piece 175 provided at the extrusion lever 167, and at the other end in the longitudinal direction, a cam pin 177 which is engaged with a third cam groove 160b formed in the surface cam gear 160 is provided in a protruding state.

At the operating concave portion 176, a pair of contact surfaces 178 and 178 spaced from each other in the longitudinal direction of the lever slider 169 is formed, and the turning operation piece 175 of the extrusion lever 167 is engaged between these contact surfaces 178 and 178. Then, if the lever slider 169 is slid in the direction of an arrow B in FIG. 24, which is the longitudinal direction, or the counter direction to the arrow B direction, the operating concave portion 176 presses the turning operation piece 175 by using the contact surface 178 on one side or the other side, thereby turning the extrusion lever 167 in the direction extruding the optical disc 2 or the direction returning to an initial position.

Also, in the lever slider 169, a somewhat wider long-hole 180 is formed along the longitudinal direction, and a guide shaft 181 provided in an erect manner at the base plate 155 is inserted into the long hole 180, whereby movement of the lever slider in the longitudinal direction is guided. Further, one end of a tension spring 182 is locked to the lever slider 169, so that the lever slider is usually biased in the direction of an arrow A in FIGS. 27 and 24, in which the operating concave portion 176 is locked to the turning operation piece 175. The tension spring 182 is locked at one end to the lever slider 169 and at the other end to a spring engaging piece 183 provided in a protruding state at the base plate 155.

By the sliding of the cam pin 177 in the third cam groove 160b of the surface cam gear 160, such a lever slider 169 is slid in the direction of the arrow B in FIG. 24, which is the longitudinal direction. By the sliding of the lever slider 169 in the direction of the arrow B, the contact surface 178 of the operating concave portion 176 presses the turning operation piece 175 of the extrusion lever 167 in the same direction, thereby turning the extrusion lever 167 in the direction of the arrow P. At this time, since the lever slider 169 is pulled in the direction of the arrow A by the tension spring 182, the turning operation piece 175 is engaged between the contact surfaces 178 and 178 of the operating concave portion 176, so that the extrusion lever 167 can be reliably turned.

Also, if the optical disc 2 is ejected to the carrying loader 6 side, the lever slider 169 is slid in the counter direction of the arrow B direction by reverse rotation of the surface cam gear 160. As a result, the lever slider 169 presses the turning operation piece 175 in the same direction, thereby turning the extrusion lever 167 in the counter direction to the arrow P direction.

Figure 27:
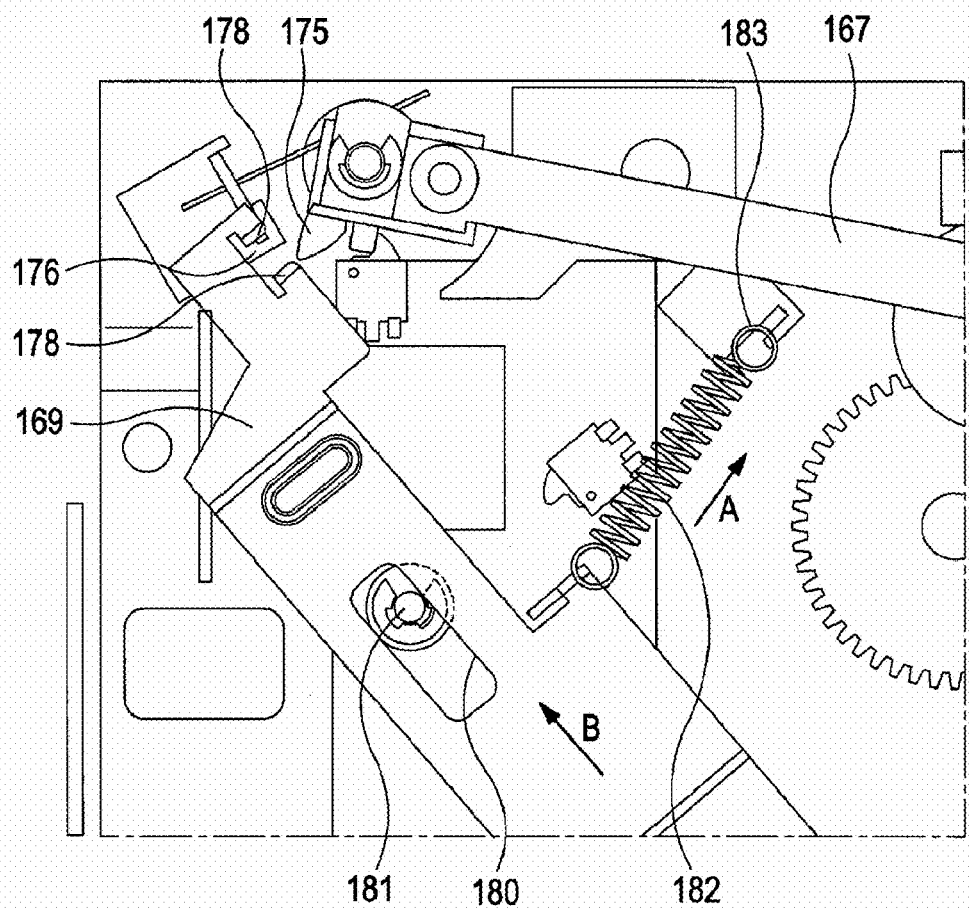
FIG. 27 is a plan view showing a state where the engagement of a lever slider with a turning operation piece is released.

Here, in the disc extruding mechanism 85, as shown in FIG. 27, in a case where the optical disc 2 is already inserted into the carrying loader 6, a case where the extrusion lever 167 rocks, whereby the lending end thereof comes into contact with an end surface between the support grooves 48, or the like, if the turning of the extrusion lever 167 in the direction of the arrow P is restricted, engagement of the lever slider 169 with the turning operation piece 175 is released.

That is, at the lever slider 169, the long hole 180 which is somewhat wider in the width direction perpendicular to a slide direction is provided. For this reason, if the turning of the extrusion lever 167 in the direction of the arrow P is restricted and the turning operation piece 175 is fixed, the lever slider 169 moves in the counter direction to the arrow A direction against the biasing force of the tension spring 182 and the operating concave portion 176 is disengaged from the turning operation piece 175. As a result, the lever slider 169 can perform slide in the direction of the arrow B according to the rotation of the surface cam gear 160 and an overload can be prevented from being applied to the driving mechanism 83, the extrusion lever 167, or the optical disc 2.

In addition, in the disc extruding mechanism 85, after the lapse of a given period of time, the surface cam gear 160 rotates in reverse, so that the lever slider 169 is slid in the counter direction to the arrow B direction. At this time, the lever slider 169 is biased in the direction of the arrow A by the tension spring 182, so that the operating concave portion 176 and the turning operation piece 175 are engaged with each other.

Here, the configuration of avoiding the interference of the bezel 71, which is provided at the front panel 63, with the upper and lower shell dividing pieces 103 and 115, which are provided at the cartridge holder 80, is described. As described above, the bezel 71 which blocks the cartridge insertion/removal opening 70 includes the center bezel 74 which opens and closes the almost entire face except both sides in the longitudinal direction of the cartridge insertion/removal opening 70, and a pair of side bezels 75 and 75 which opens and closes both sides in the longitudinal direction of the cartridge insertion/removal opening 70. Also, the cartridge holder 80 is slid to the cartridge insertion/removal position and the upper shell dividing pieces 103 are formed in a protruding state at the inner surface sides of the upper side surface portions 94 and 94 of the upper holder 90.

In a case where the bezel 71 is constituted so as to block the cartridge insertion/removal opening 70 by using only the center bezel 74, since the center bezel 74 depicts a turning locus facing the back face 60b side along the upper edge of the cartridge insertion/removal opening 70, it is necessary to make another obstacle such as the upper shell dividing piece 103 be retreated from a turning region of the center bezel 74 also at both sides in the longitudinal direction.

In the case of trying to avoid the interference of the center bezel 74 by displacing the upper shell dividing pieces 103 to the back face 60b side, it is necessary to form the upper shell dividing pieces 103 at the back face 60b side of the apparatus main body 60. However, the upper shell dividing pieces 103 are for pressing the rear-side locking pieces 33, which are disposed at the back face 10b of the cartridge main body 10, in the counter direction to the arrow S direction, which is opposite to an insertion direction, when mounting the cartridge main body 10 on the cartridge holder 80.

Therefore, as the upper shell dividing pieces 103 are formed at the back face 60b side of the apparatus main body 60, if the cartridge main body 10 is not deeply inserted to the back face 60b side of the apparatus main body 60, locking of the rear-side locking pieces 33 is not allowed. For this reason, in the case of inserting the cartridge main body 10 by using the hand of a user, it is necessary to deeply insert the hand of a user into the apparatus main body 60, thereby resulting in not only damage of usability, but also an increase in a danger that the hand will touch mechanisms in the apparatus main body 60. Further, also in a case where a mechanism automatically drawing in the cartridge main body 10 is incorporated, since a transport distance of the cartridge main body 10 is increased, the size in the depth direction of the apparatus main body 60 becomes longer, so that space-saving of the apparatus main body 60 is negatively affected.

Therefore, in the disc changer apparatus 3, the bezel 71 includes the center bezel 74 which opens and closes the almost entire face except both sides in the longitudinal direction of the cartridge insertion/removal opening 70, and a pair of side bezels 75 and 75 which opens and closes both sides in the longitudinal direction of the cartridge insertion/removal opening 70. In this way, in the bezel 71, by providing the length in the longitudinal direction of the center bezel 74 up to a region where the center bezel does not interfere with the upper shell dividing pieces 103, it is possible to avoid interference with the upper shell dividing pieces 103.

Figure 28:
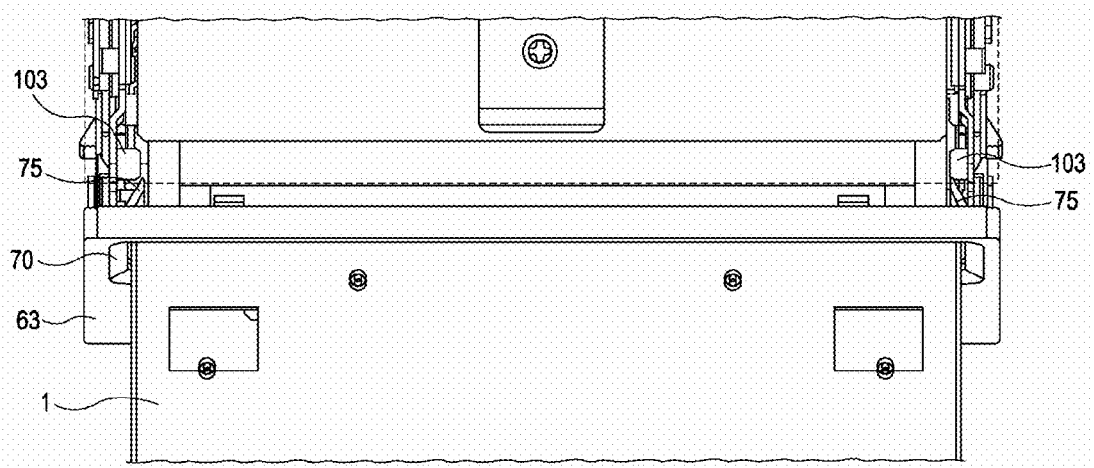
FIG. 28 is a perspective view showing a positional relationship between side bezels and an upper shell dividing pieces.

Then, both sides in the longitudinal direction of the cartridge insertion/removal opening 70, which are not covered by the center bezel 74, are covered by the side bezels 75 and 75. As shown in FIG. 28, since turning regions of the side bezels 75 and 75 in the insertion direction of the cartridge main body 10 are short compared to the center bezel 74, it is possible to provide the upper shell dividing pieces 103 at the front face 60a side as far as possible.

Therefore, in the disc changer apparatus 3, it is possible to shorten an insertion depth of the cartridge main body 10 necessary for releasing the locking of the lock mechanism 30 while avoiding the interference of the bezel 71 with the upper shell dividing pieces 103, and to attain an improvement in usability for a user and a reduction in size of the apparatus main body 60.

2-3. Carrying Loader

Next, the carrying loader 6 will be described. The carrying loader 6 is for drawing in the optical disc 2 ejected from the selection loader 5, transporting the optical disc to the recording and reproducing apparatus 7, and also pushing the optical disc 2 ejected from the recording and reproducing apparatus 7 back to the inside of the lower shell 12 in the selection loader 5. The carrying loader 6 is provided adjacent to the selection loader 5 at the back face 60b side of the apparatus main body 60, as shown in FIGS. 2 and 3.

The carrying loader 6 is provided along with the recording and reproducing apparatus 7 in the inside of a housing 200 which is an external enclosure. The housing 200 is fastened by screws to the extending support pieces 154 and 154 formed at the holder cover 81 of the selection loader 5.

Figure 29:
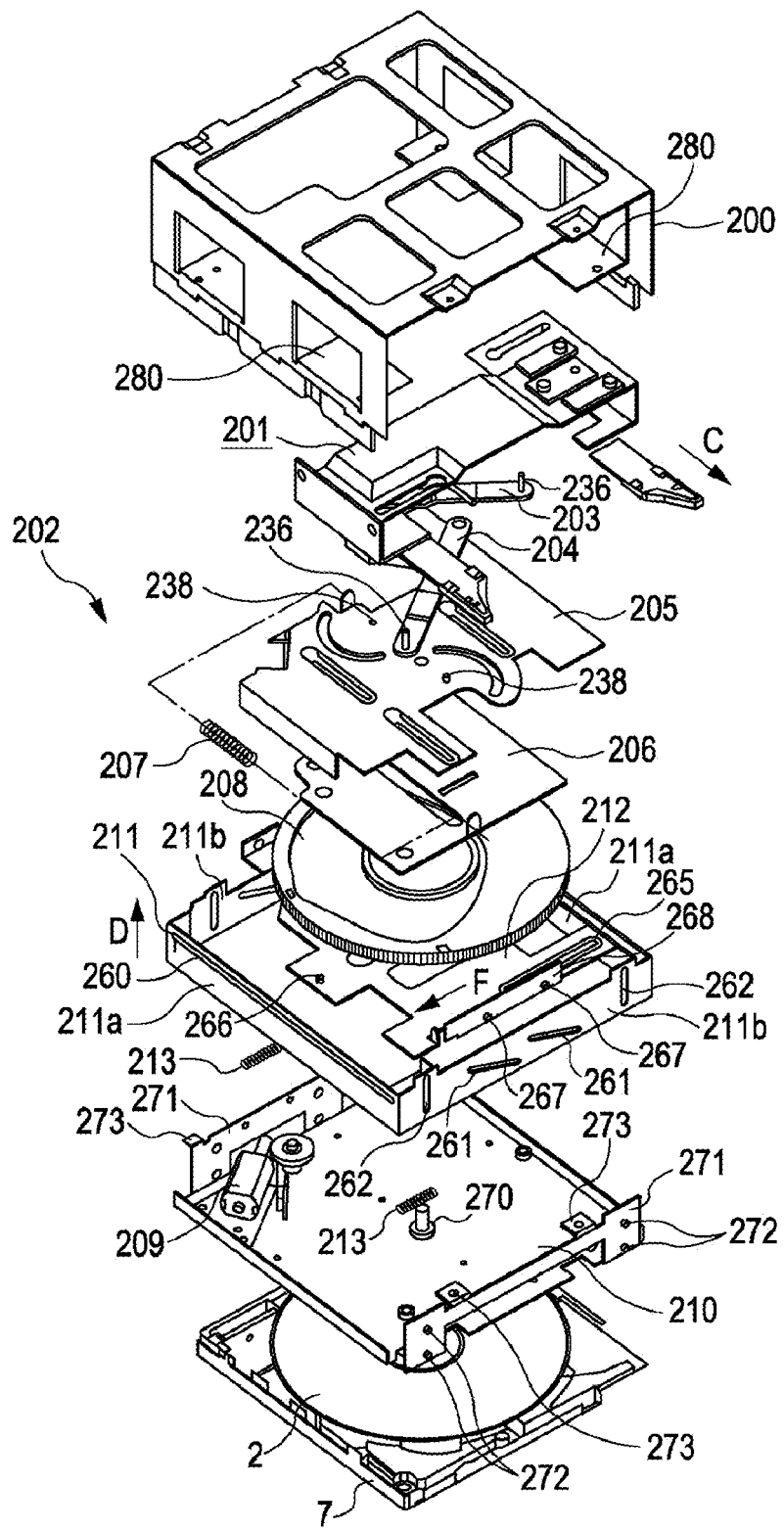
FIG. 29 is an exploded perspective view of the carrying loader.

As shown in FIG. 29, the carrying loader 6 includes the loading arm 201 which comes into contact with the outer circumference of the optical disc 2, thereby performing drawing of the optical disc into the carrying loader 6 and pushing of the optical disc back to the inside of the lower shell, and an arm driving mechanism 202 which drives the loading arm 201 in a transport direction of the optical disc 2.

The arm driving mechanism 202 includes a pair of slide arms 203 and 204 which slides the loading arm 201, a slide deck 205 which supports the slide arms 203 and 204 so as to be able to turn, a slide plate 206 which is slidably supported on the slide deck 205 and is also engaged with the slide arms 203 and 204 through the slide deck 205, a slide biasing spring 207 which is provided to extend between the slide deck 205 and the slide plate 206, thereby biasing the slide plate 206 to the slide deck 205, a cam gear 208 in which a slide cam groove 252, with which a slide cam pin 250 provided protruding from the slide plate 206 is engaged, is formed and which slides the slide plate 206 to the slide deck 205 against a biasing force of the slide biasing spring 207, and a base deck 210 which rotatably supports the cam gear 208 and is provided with a driving motor 209 which drives the cam gear 208.

Also, the arm driving mechanism 202 further includes an ascent and descent deck 211 which is connected to the loading arm 201, thereby moving the loading arm up and down 201, an ascent and descent plate 212 which is slidably engaged with ascent and descent cam holes 261 provided at the ascent and descent deck 211 and also slidably supported on the base deck 210, and an ascent and descent biasing spring 213 which is provided to extend between the ascent and descent plate 212 and the base deck 210, thereby biasing the ascent and descent plate 212 to the cam gear 208.

Figure 31:
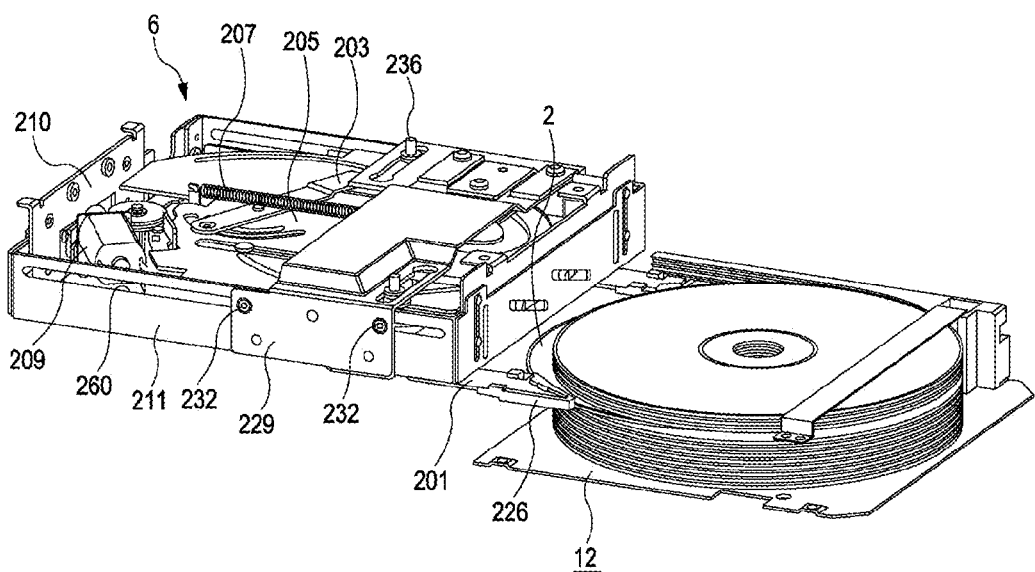
FIG. 31 is an exterior perspective view showing the carrying loader which inserts the optical disc into the lower shell.

Then, the carrying loader 6 drives the loading arm 201 by the arm driving mechanism 202, thereby drawing in a given optical disc 2 extruded from the lower shell 12 by the selection loader 5, as shown in FIG. 30. Also, the carrying loader 6 pushes the optical disc 2, in which recording and/or reproducing of an information signal has been performed by the recording and reproducing apparatus 7, back to the inside of the lower shell 12, as shown in FIG. 31.

As shown in FIG. 32, the loading arm 201 is formed by left and right arm plates 220 and 221 which are engaged with the slide arms 203 and 204 and connected to each other. The left and right arm plates 220 and 221 are provided with screw holes 222 which are fastened to each other by screws and engaging grooves 223, with which the slide arm 203 or 204 is engaged. The engaging grooves 223 are formed in the direction perpendicular to the direction of an arrow C in FIG. 32, which is a sliding direction of the loading arm 201.

Also, at the left and right arm plates 220 and 221, arm portions 224 are formed which are provided with engaging claws 226 which come into contact with the outer circumferential surface of the optical disc 2. The arm portions 224 extend in the sliding direction of the loading arm 201, and on the leading ends thereof, the engaging claws 226 are mounted.

Figure 33A:
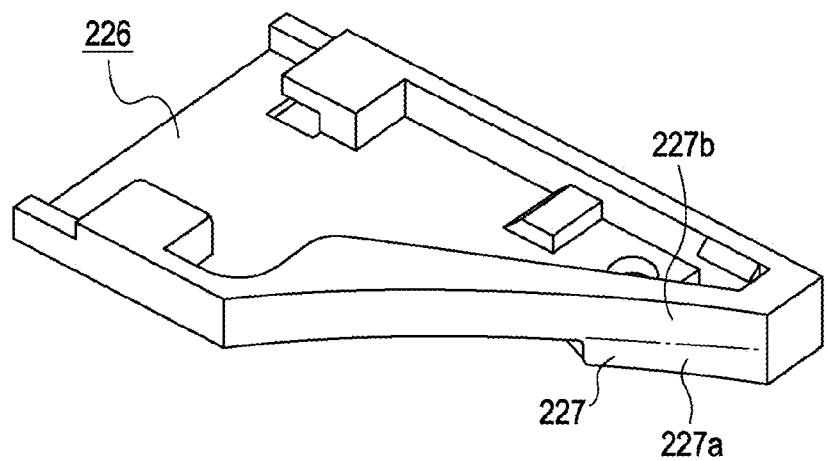
FIGS. 33A and 33B are perspective views showing an engaging claw.
Figure 33B:
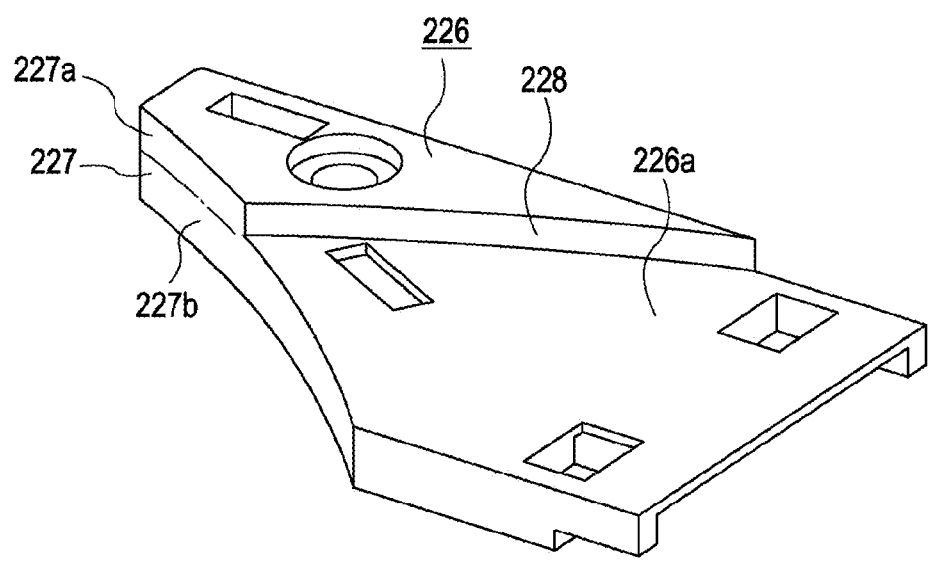

The engaging claws 226 are each made of a resin material capable of coming into contact with the optical disc 2 without damaging the optical disc and are mounted on the arm portions 224 of the left and right arm plates 220 and 221, thereby being supported so as to be able to slide parallel to each other. As shown in FIGS. 33A and 33B, at the inner surface side of each engaging claw 226, which faces the outer circumferential surface of the optical disc 2, there are formed an insertion surface portion 227, which presses the optical disc 2, thereby inserting the optical disc into the lower shell 12, and a draw-in surface portion 228 which draws the optical disc 2 into the carrying loader 6.

The insertion surface portion 227 is provided at the leading end side of the engaging claw 226 and formed into a circular arc shape having curvature approximately equal to that of the outer circumferential surface of the optical disc 2, thereby being made to be able to come into surface-contact with the outer circumference of the optical disc 2. Also, the leading end portion of the insertion surface portion 227 is formed thicker than the thickness of the optical disc 2, wherein a lower region thereof becomes a pressing portion 227a which presses a given optical disc 2 which is inserted or ejected from the lower shell 12, and an upper region thereof becomes a regulating portion 227b which presses another optical disc 2 adjacent to the given optical disc 2, thereby regulating the optical disc at the storage position.

The draw-in surface portion 228 is provided further on the base end side of the engaging claw 226 than the insertion surface portion 227 and formed at the lower surface 226a side of the engaging claw 226, which faces an upper surface of the optical disc 2, which is a signal non-recording surface. The draw-in surface portion 228 is formed into a circular arc shape having curvature approximately equal to that of the outer circumferential surface of the optical disc 2, thereby being made so as to be able to come into surface-contact with the outer circumference of the optical disc 2.

In the loading arm 201, the engaging claws 226 are mounted on the left and right arm plates 220 and 221, so that the insertion surface portions 227 face each other and the draw-in surface portions 228 face each other. Then, the loading arm 201 presses the rear end side in the insertion direction of the optical disc 2 equally in the left and the right by using a pair of insertion surface portions 227 and inserts the optical disc 2 into the lower shell 12 (FIG. 31). Also, the loading arm 201 presses the rear end side in the draw-in direction of the optical disc 2 equally in the left and the right by using a pair of draw-in surface portions 228 and draws the optical disc 2 into the carrying loader 6 (FIG. 30).

Also, in the loading arm 201, screws 232 are inserted into side walls 229 and 230 of the left and right arm plates 220 and 221, and the screws 232 are further inserted into and supported by slide guide holes 260 formed in the ascent and descent deck 211, which will be described later, so that the loading arm is supported so as to be able to slide in the direction of an arrow C in FIG. 29 and the counter direction of the arrow C direction with respect to the ascent and descent deck 211. Then, by ascent and descent of the ascent and descent deck 211, the loading arm 201 can move up and down in the direction of an arrow D in FIG. 29, which is the height direction perpendicular to the in-plane direction of the optical disc 2.

Next, the arm driving mechanism 202 which drives the loading arm 201 will be described. The arm driving mechanism 202 is for sliding the loading arm 201 in the transport direction of the optical disc 2, that is, the front-and-back direction of the apparatus main body 60 and also moving the loading arm up and down in the up-and-down direction of the apparatus main body 60.

Figure 34:
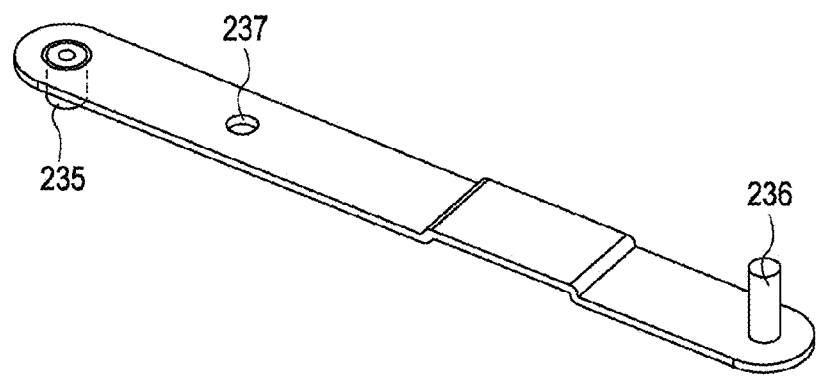
FIG. 34 is an exterior perspective view showing a slide arm.

The slide arms 203 and 204 which are engaged with the left and right arm plates 220 and 221 of the loading arm 201 are each made of a metal plate of an elongated flat plate shape, as shown in FIG. 34, and at one end in the longitudinal direction of each slide arm, a guide pin 235 which is guided by the slide deck 205 is provided in a protruding state. Also, in the slide arms 203 and 204, at the other end in the longitudinal direction of each slide arm, a guide pin 236 which is inserted into the engaging groove 223 formed in each of the left and right arm plates 220 and 221 is provided in a protruding state. Further, in the slide arms 203 and 204, at the approximate center in the longitudinal direction of each slide arm, an insertion hole 237 is formed in which a turning shaft 238 provided in a protruding state at the slide deck 205 is inserted and supported.

In each of the slide arms 203 and 204, the guide pin 235 is engaged with the slide plate 206 through the slide deck 205 and the slide pin 236 is turned with the turning shaft 238 as a fulcrum according to the sliding in the front-and-back direction of the slide plate 206. In this way, the slide pins 236 of the slide arms 203 and 204 slide in the engaging grooves 223 of the left and right arm plates 220 and 221, thereby integrally sliding the left and right arm plates 220 and 221 in the direction of the arrow C and the counter direction to the arrow C direction.

Figure 35:
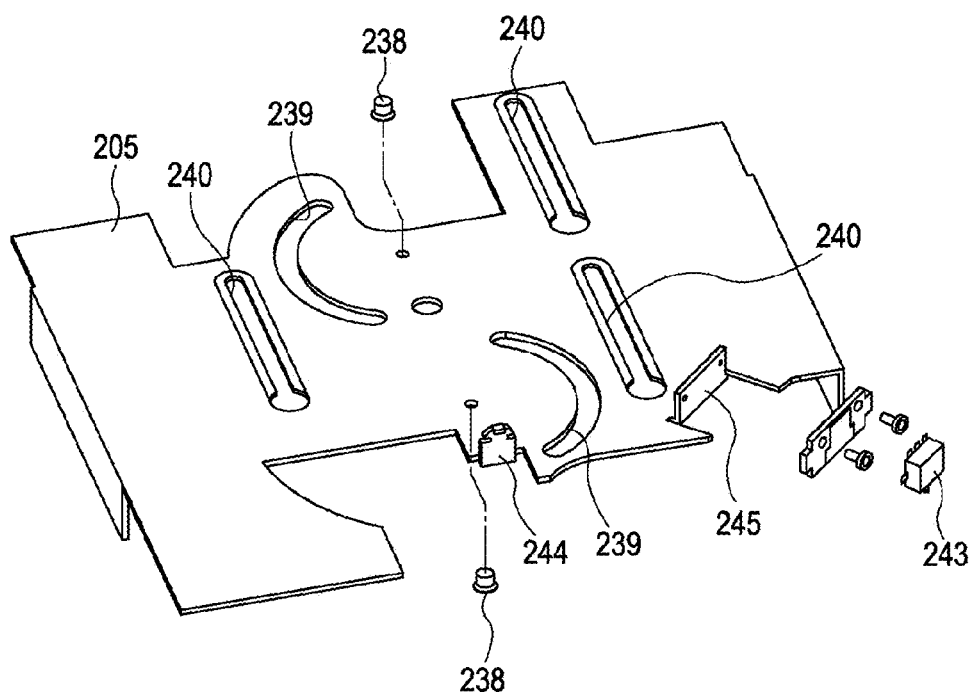
FIG. 35 is an exploded perspective view showing a slide deck.

The slide deck 205 is for supporting the slide arms 203 and 204 and the slide plate 206 and is fixed to the base deck 210, which will be described later. As shown in FIG. 35, the slide deck 205 has the turning shafts 238 which are inserted into the insertion holes 237 of the slide arms 203 and 204, guide holes 239, into which the guide pins 235 provided in a protruding state at the slide arms 203 and 204 are inserted, and straight-advance guide grooves 240 which guide straight-advance of the slide plate 206.

The turning shafts 238 are mounted in shaft holes opened at the principal surface of the deck from the back face side, thereby protruding from the principal surface of the deck, and inserted into the insertion holes 237 of the slide arms 203 and 204, thereby being rotatably supported. Also, the guide holes 239 are each formed into a circular arc shape according to a turning locus of the guide pin 235 of each of the slide arms 203 and 204. Then, the guide pins 235 of the slide arms 203 and 204 protrude downward through the guide holes 239, thereby being engaged with engaging holes 247 of the slide plate 206.

Figure 36A:
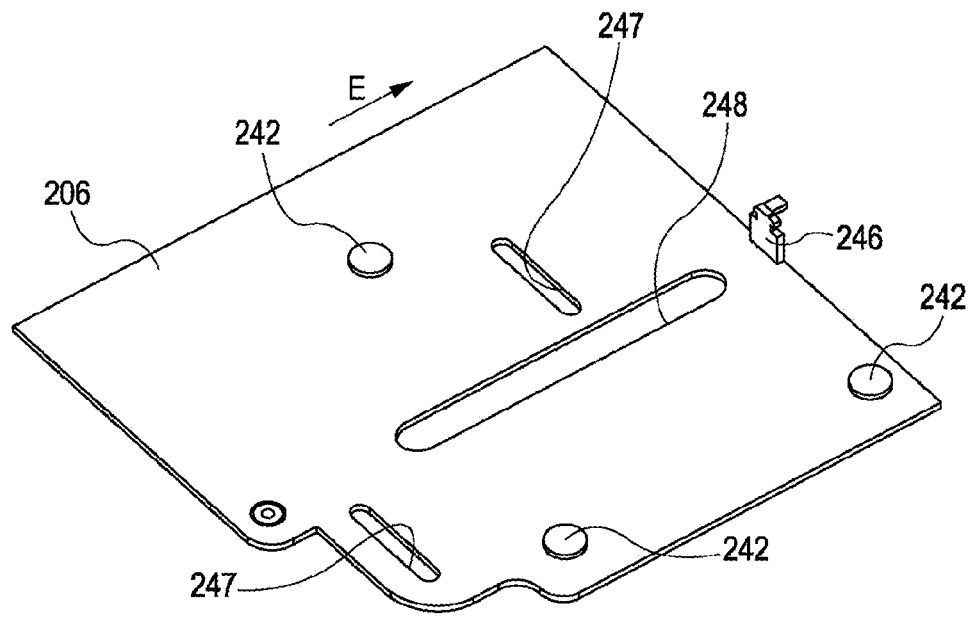
FIGS. 36A and 36B are exterior perspective views showing a slide plate.

The straight-advance guide grooves 240 are for guiding movement of the slide plate 206 and formed to extend in the front-and-back direction of the apparatus main body 60. As shown in FIG. 36A, screws 242 inserted into the straight-advance guide grooves 240 are mounted on the slide plate 206, so that the slide plate is supported on the slide deck 205 and also can slide along the straight-advance guide grooves 240.

Also, in the slide deck 205, a spring engaging piece 244, to which one end of the slide biasing spring 207 provided to extend between the slide deck and the slide plate 206 is locked, is formed in the vicinity of the side edge of the slide deck on the back face 60b side of the apparatus main body 60. Further, at the slide deck 205, a switch mounting piece 245 is formed on which a gear switch 243 which detects a rotational position of the cam gear 208 is mounted.

The slide plate 206 is to be slid according to the rotation of the cam gear 208, thereby turning the slide arms 203 and 204. As shown in FIG. 36A, at the principal surface on the slide deck 205 side of the slide plate 206, the screws 242, which are inserted into the straight-advance guide groves 240, and a spring engaging piece 246, to which the other end of the slide biasing spring 207 is locked, are formed. The screws 242 are inserted into the straight-advance guide grooves 240, so that the slide plate 206 is supported on the slide deck 205 so as to be able to slide in the direction of an arrow E in FIG. 36A, which is the front-and-back direction, and the counter direction to the arrow E direction, and also the slide plate 206 is biased to the slide deck 205 in the counter direction to the arrow E direction, which is the back face 60b side of the apparatus main body 60, by the slide biasing spring 207 provided to extend therebetween.

Also, at the slide plate 206, the engaging holes 247, with which the guide pins 235 which are provided in a protruding state at the slide arms 203 and 204 and protrude through the guide holes 239 of the slide deck 205 are engaged, and a shaft insertion hole 248, into which a gear support shaft 270, which is provided in a protruding state at the base deck 210, thereby rotatably supporting the cam gear 208, is inserted, are opened.

Two engaging holes 247 are formed depending on the slide arms 203 and 204, and both the holes are formed into a long-hole shape. If the guide pins 235 are inserted into the engaging holes 247, so that the slide plate 206 is moved straight along the straight-advance guide grooves 240, the slide plate turns the slide arms 203 and 204, thereby sliding the left and right arm plates 220 and 221 of the loading arm 201 in the direction of the arrow C and the counter direction to the arrow C direction.

Figure 36B:
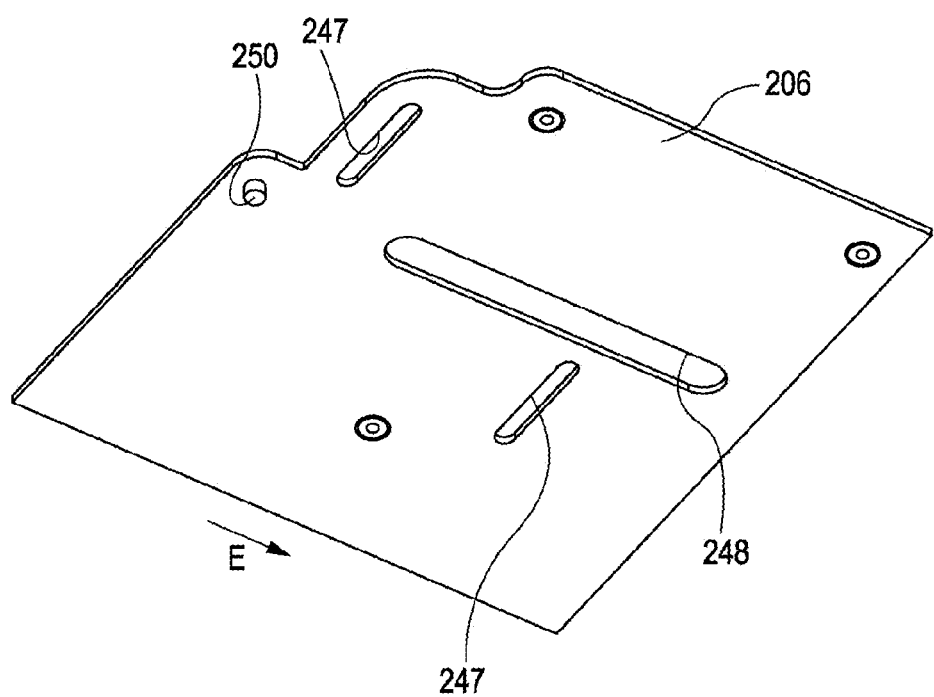

Also, as shown in FIG. 36B, at the principal surface of the slide plate 206, which faces the cam gear 208, the slide cam pin 250 which is engaged with the slide cam groove 252 formed in the cam gear 208 is provided. The slide plate 206 is biased in the counter direction to the arrow E direction, which is the back face 60b side of the apparatus main body 60, by the slide biasing spring 207, so that the slide cam pin 250 moves in contact with the slide cam groove 252 of the cam gear 208 and is slid along the straight-advance guide groove 240 according to the rotation of the cam gear 208.

Figure 37A:
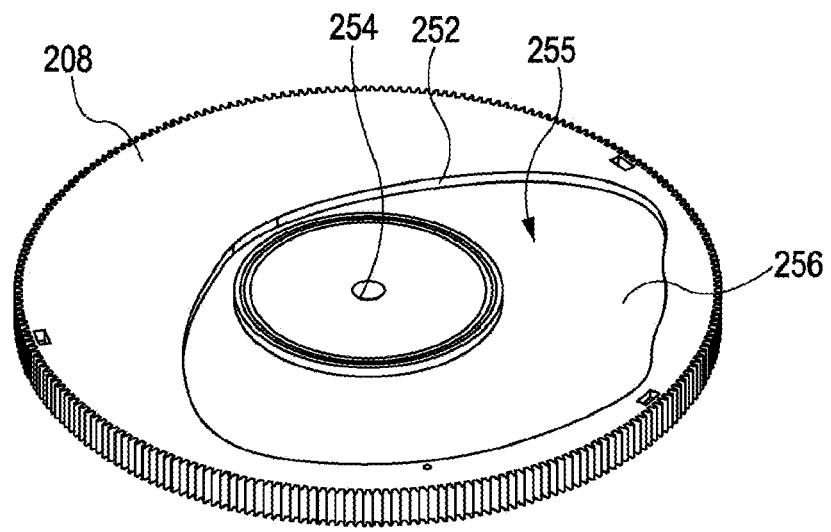
FIGS. 37A and 37B are exterior perspective views showing a cam gear.
Figure 37B:
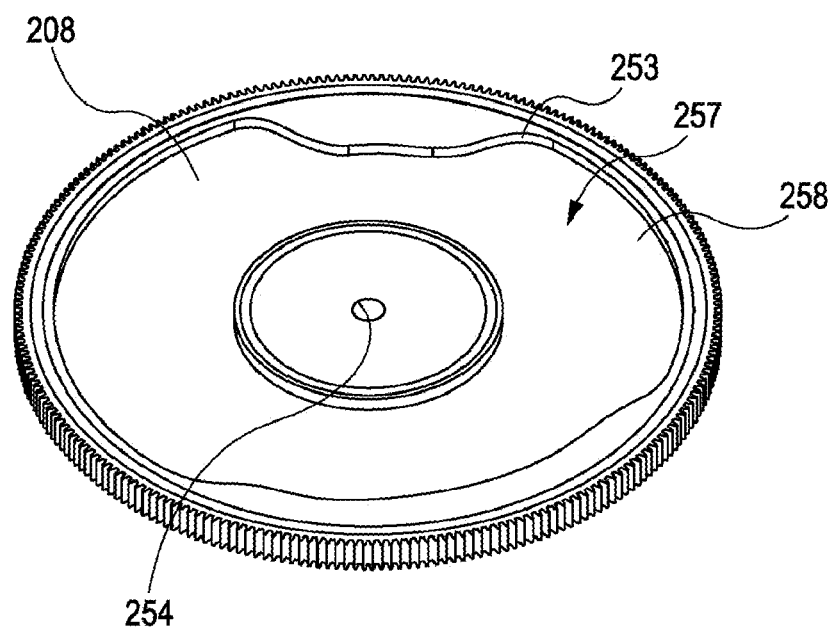

The cam gear 208 is for sliding the slide plate 206 and the ascent and descent plate 212 which will be described later, and as shown in FIGS. 37A and 37B, in the principal surface on one side, the slide cam groove 252 for sliding the slide plate 206 is formed, and in the principal surface on the other side, an ascent and descent cam groove 253 for sliding the ascent and descent plate 212 is formed.

At the center of the cam gear 208, a support shaft insertion hole 254, into which the gear support shaft 270 provided in a protruding state at the base deck 210 is inserted, is formed, and the cam gear is rotatably supported by the gear support shaft 270. Also, the cam gear 208 is connected to the driving motor 209 mounted on the base deck 210, through a reduction gear.

In the slide cam groove 252 formed in the principal surface of one side of the cam gear 208, the slide plate 206 is biased to the back face 60b side of the apparatus main body 60 by the slide biasing spring 207, so that the slide cam pin 250 usually slides along the side surface of the outer circumference side. In this way, the slide cam groove 252 slides the slide plate 206 along the straight-advance guide hole 240 through the slide cam pin 250 according to the rotation of the cam gear 208.

Also, at the slide cam groove 252, a slide limiter mechanism 255 is formed, and when the sliding of the loading arm 201 which slides in the direction of the arrow C which inserts the optical disc 2 into the lower shell 12 is interfered, so that a load in the counter direction to the slide direction is applied to the slide arms 203 and 204 and the slide plate 206, the slide limiter mechanism allows the load to escape.

The slide limiter mechanism 255 is constituted by a retreat space 256 which is provided by the slide cam groove 252 over the range from the side surface of the outer circumferential surface side, in which the slide cam pin 250 moves in contact therewith, to the support shaft insertion hole 254 side. With respect to the slide limiter mechanism 255, it will be described in detail later.

Also, in the ascent and descent cam groove 253 formed in the principal surface of the other side of the cam gear 208, the ascent and descent plate 212 is biased to the left side face 60d side of the apparatus main body 60 by the ascent and descent biasing spring 213, so that the ascent and descent cam pin 266 usually slides along the side surface of the outer circumference side. In this way, the ascent and descent cam groove 253 slides the ascent and descent plate 212 through the ascent and descent cam pin 266 according to the rotation of the cam gear 208. In addition, at the ascent and descent cam groove 253, an ascent and descent limiter mechanism 257 is formed, and when a descent operation of the loading arm 201 is restricted, so that a load in the counter direction to the descent direction is applied to the ascent and descent deck 211 and the ascent and descent plate 212, the ascent and descent limiter mechanism allows the load to escape.

The ascent and descent limiter mechanism 257 is constituted by a retreat space 258 which is provided by the ascent and descent cam groove 253 over the range from the side surface of the outer circumferential surface side, in which the ascent and descent cam pin 266 moves in contact therewith, to the support shaft insertion hole 254 side. With respect to the ascent and descent limiter mechanism 257, it will be described in detail later.

Next, the ascent and descent deck 211 will be described. The ascent and descent deck 211 is for moving the loading arm 201 up and down, is supported on the base deck 210 so as to be able to move up and down, and also engaged with the ascent and descent plate 212, thereby being moved up and down according to the sliding of the ascent and descent plate 212.

The ascent and descent deck 211 forms a frame body of an approximately rectangular shape having four side walls, and in a pair of opposing side walls 211a parallel to the front-and-back direction of the apparatus main body 60, the slide guide holes 260 are formed into which the screws 232 provided in a protruding state at the left and right arm plates 220 and 221 of the loading arm 201 are inserted. The slide guide holes 260 are formed parallel to the longitudinal direction of the side walls 211a, and the screws 232 are inserted into the slide guide holes, thereby guiding the sliding in the direction of the arrow C of the loading arm 201. Also, the screws 232 are inserted into the slide guide holes 260, so that the ascent and descent deck 211 integrally moves the loading arm 201 up and down. Also, in a pair of side walls 211b perpendicular to the side walls 211a of the ascent and descent deck 211, the ascent and descent cam holes 261 which are engaged with the ascent and descent plate 212 and ascent and descent guide holes 262 which are engaged with the base deck 210 are formed.

The ascent and descent cam holes 261 extend obliquely with respect to the longitudinal direction of the side wall 211b, and ascent and descent cam protrusion portions 267 provided in a protruding state at the ascent and descent plate 212 are inserted into the ascent and descent cam holes from the inner surface side. In this way, if the ascent and descent plate 212 is slid, the ascent and descent cam protrusion portions 267 are slid in the ascent and descent cam holes 261, so that the ascent and descent deck 211 is moved up and down in the up-and-down direction of the apparatus main body 60.

The ascent and descent guide holes 262 are formed to extend in the up-and-down direction of the apparatus main body 60, which is perpendicular to the longitudinal direction of the side wall 211b, and ascent and descent guide protrusion portions 272 provided in a protruding state at the base deck 210 are inserted into the ascent and descent guide holes from the inner surface side. In this way, if the ascent and descent deck 211 is moved up and down according to the sliding of the ascent and descent plate 212, the ascent and descent guide protrusion portions 272 are slid in the ascent and descent guide holes 262, so that the ascent and descent deck is moved up and down in the up-and-down direction of the apparatus main body 60.

The ascent and descent plate 212 which moves the ascent and descent deck 211 up and down is slidably supported on the base deck 210 and also slid by the cam gear 208, thereby moving the ascent and descent deck 211 up and down. The ascent and descent plate 212 has slide guide grooves 265 which are slidably supported on the base deck 210, the ascent and descent cam pin 266 which is engaged with the ascent and descent cam groove 253 of the cam gear 208, and the ascent and descent cam protrusion portions 267 which are inserted into the ascent and descent cam holes 261 of the ascent and descent deck 211.

The slide guide grooves 265 are each formed into a long-hole shape parallel to the side wall 211b of the ascent and descent deck 211 and respectively formed in the vicinity of the side edges on the front face 60a side and the back face 60b side of the apparatus main body 60. Screws pass through the slide guide grooves 265 and are mounted on the base deck 210, so that the ascent and descent plate 212 is supported on the base deck 210 so as to be able to slide along the slide guide grooves 265.

The ascent and descent cam pin 266 is engaged with the ascent and descent cam groove 253 of the cam gear 208, thereby sliding along the side wall of the outer circumference side of the ascent and descent cam groove 253, thereby sliding the ascent and descent plate 212. The ascent and descent plate 212 is usually biased to slide in the direction of an arrow F in FIG. 29, which is the left side surface 60d side of the apparatus main body 60, by the ascent and descent biasing spring 213 provided to extend between the ascent and descent plate 212 and the base deck 210, so that the ascent and descent cam pin 266 is brought into contact with the side wall of the ascent and descent cam groove 253.

The ascent and descent cam protrusion portions 267 are formed at the outer surfaces of cam walls 268 formed being bent upward from the side edges of the ascent and descent plate 212 on the front face 60a side and the back face 60b side of the apparatus main body 60. The ascent and descent cam protrusion portions 267 are inserted into the ascent and descent cam holes 261 formed in the side walls 211b of the ascent and descent deck 211, thereby moving the ascent and descent deck 211 up and down according to the sliding of the ascent and descent plate 212.

On the principal surface of the base deck 210 which slidably supports the ascent and descent plate 212, there are formed the gear support shaft 270 which rotatably supports the cam gear 208, a plurality of screws (not shown) which is inserted into the slide guide grooves 265, thereby slidably supporting the ascent and descent plate 212, and a spring engaging piece (not shown), to which one end of the ascent and descent biasing spring 213 which biases the ascent and descent plate 212 is locked. Also, at one corner portion of the principal surface of the base deck 210, the driving motor 209 is disposed.

Also, at the base deck 210, side walls 271 are formed in an erect state at the front face 60a side and the back face 60b side of the apparatus main body 60. At the side walls 271, the ascent and descent guide protrusion portions 272 are formed which are inserted into the ascent and descent guide holes 262 formed in the side walls 211b of the ascent and descent deck 211. Also, at the side walls 271, housing connection pieces 273 which are connected to the housing 200 are formed.

Figure 38A:
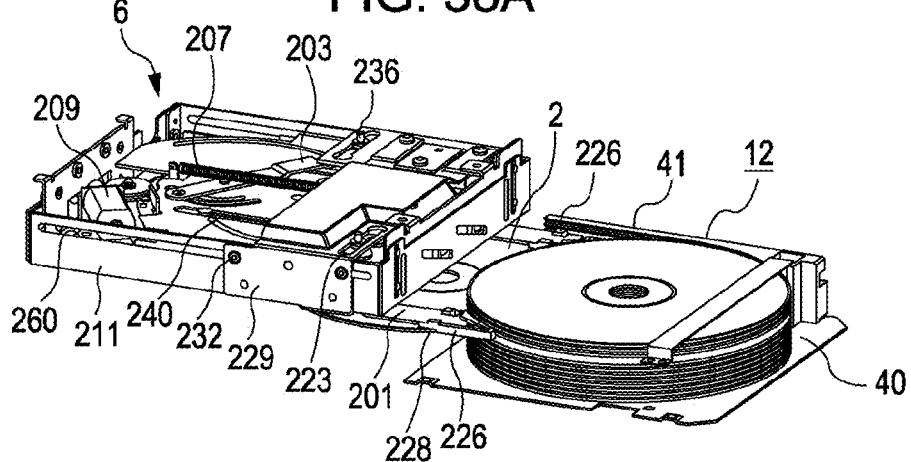
FIGS. 38A to 38C are perspective views showing a process of drawing the optical disc from the disc cartridge into the carrying loader.
Figure 38B:
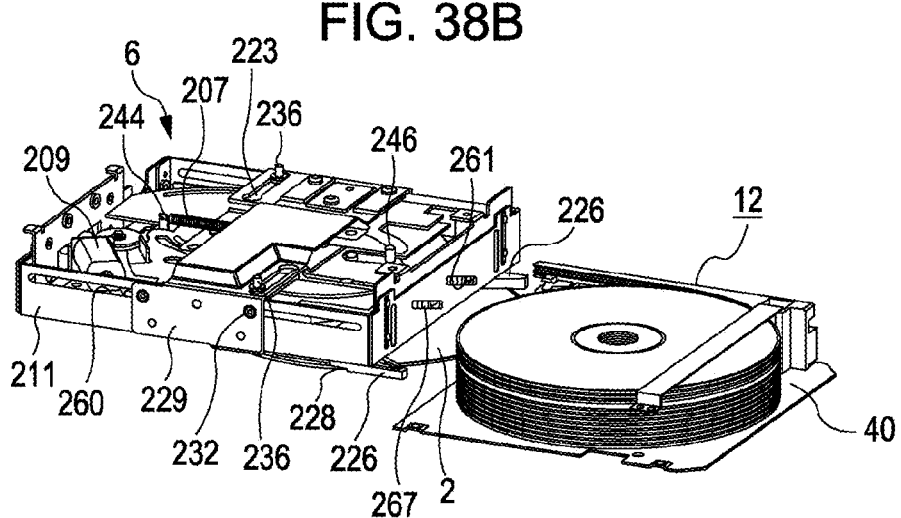
Figure 38C:
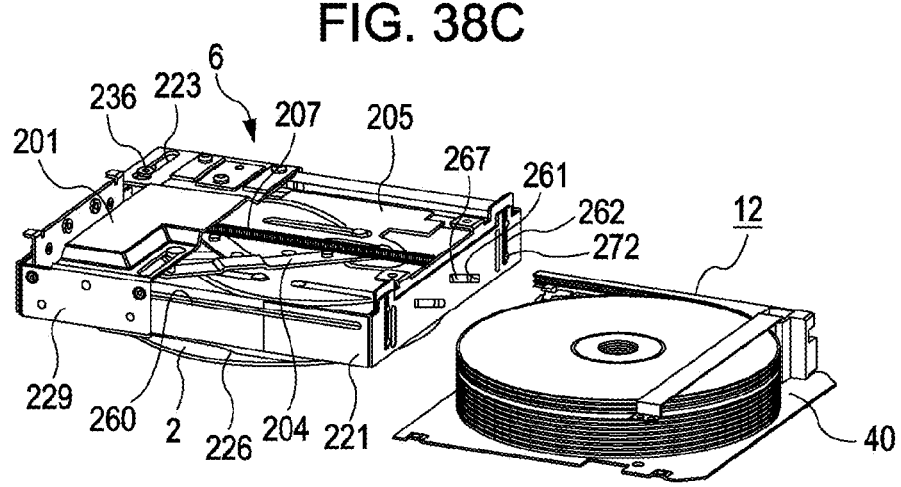
Figure 39A:
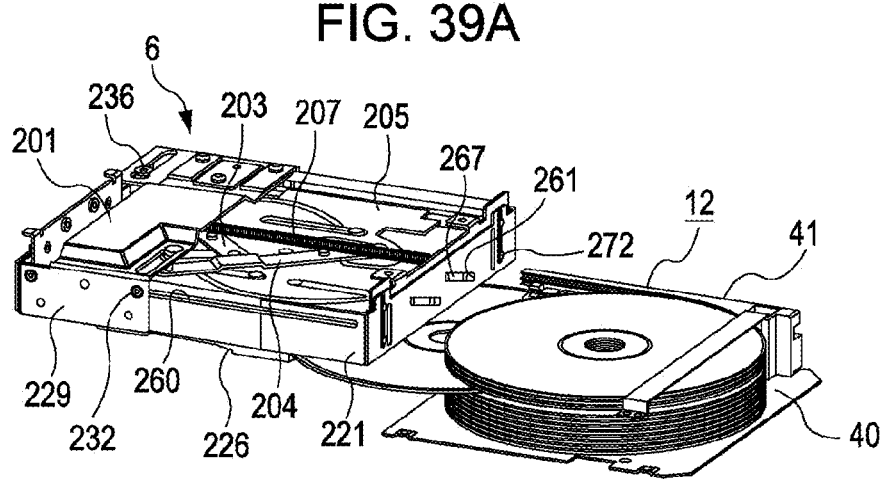
FIGS. 39A to 39C are perspective views showing a process of pushing the optical disc from the carrying loader back to the inside of the disc cartridge.
Figure 39B:
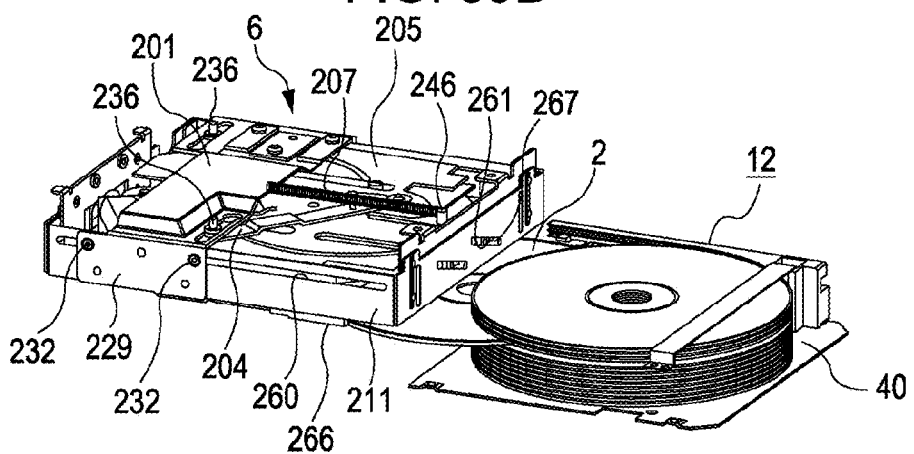
Figure 39C:
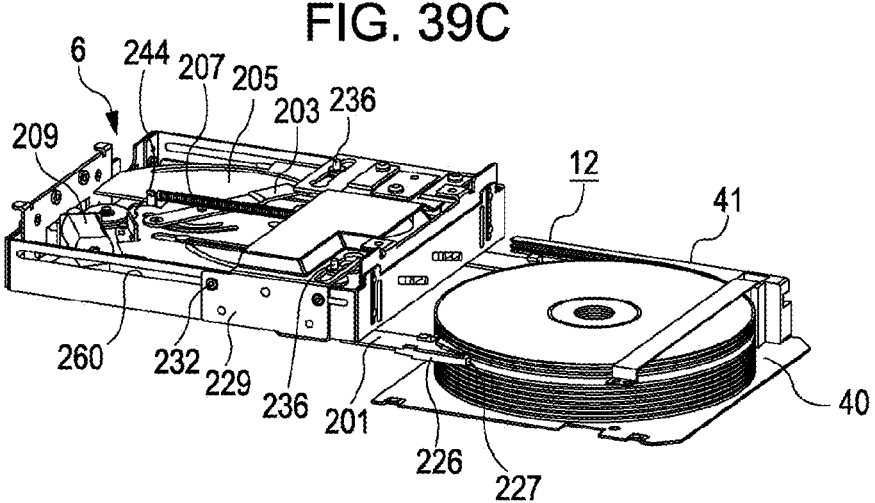

In such an arm driving mechanism 202, the slide plate 206 and the ascent and descent plate 212 are slid by the slide cam groove 252 and the ascent and descent cam groove 253 of the cam gear 208, thereby sliding the loading arm 201 in the direction of the arrow C and also moving the loading arm up and down in the direction of the arrow D. In this way, the loading arm 201 draws the optical disc 2 from the lower shell 12 into the carrying loader 6, thereby delivering the optical disc to the recording and reproducing apparatus 7, as shown in FIGS. 38A to 38C, and pushes the optical disc 2 ejected from the recording and reproducing apparatus 7 back to the inside of the lower shell 12, as shown in FIGS. 39A to 39C.

Figure 40:
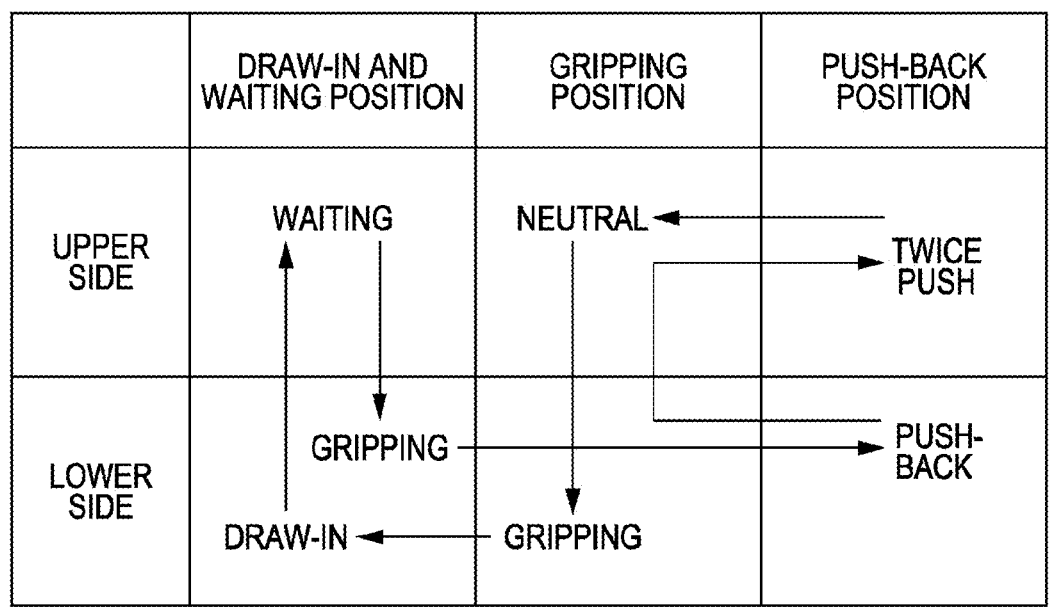
FIG. 40 is a diagram for illustrating an operation state of the loading arm.

Specifically, as shown in FIG. 40, the loading arm 201 is slid between a draw-in and waiting position where the loading arm 201 is retreated from the selection loader 5, a disc gripping position where the loading arm 201 grips the optical disc 2 extruded from the lower shell 12 by the disc extruding mechanism 85, and a disc push-back position where the loading arm 201 pushes the optical disc 2 back to the inside of the lower shell 12 and also at each position, the loading arm 201 is moved up and down between the lower side where the loading arm 201 can come into contact with the optical disc 2 which is transported and the upper side where the loading arm 201 is separated from the optical disc 2 which is transported.

The draw-in and waiting position is a position where the loading arm 201 retreats from the selection loader 5 and also performs delivery and receipt of the optical disc 2 between the selection loader 5 and the recording and reproducing apparatus 7. The disc gripping position is a position where the loading arm 201 enters into the lower shell 12 moved down to the disc insertion/ejection position and grips the optical disc 2 extruded by the disc extruding mechanism 85 by using the draw-in surface portions 228 of the engaging claws 226 and is also a position where the loading arm 201 is separated from another optical disc 2 supported at the storage position. The disc push-back position is a position where the loading arm 201 presses the optical disc 2 ejected from the recording and reproducing apparatus 7 again by using the insertion surface portion 227 of the engaging claws 226 and pushes the optical disc back to the storage position of the lower shell 12. At the disc push-back position, the optical disc 2 stacked adjacent to the optical disc 2 inserted or ejected by the loading arm 201 is also pressed.

Then, in the arm driving mechanism 202, the slide plate 206 and the ascent and descent plate 212 are slid being interlocked with the rotation of the cam gear 208. In this way, as shown in FIG. 40, the combination of each position of the draw-in and waiting position, the disc gripping position, and the disc push-back position with the upper side and the lower side of each position is uniquely determined, and the loading arm 201 depicts a given transport locus.

In the state of waiting for the insertion of the disc cartridge 1, the loading arm 201 remains stopped at the upper side of the gripping position. In an initial state where the disc changer apparatus 3 is powered on, the loading arm 201 is driven to the position and is in a neutral state which waits for the insertion of the disc cartridge 1. If the insertion of the disc cartridge 1 is detected, the loading arm 201 descends to the lower side of the gripping position and then ascends to the upper side of the draw-in and waiting position via the lower side of the draw-in and waiting position. In this way, the loading arm 201 retreats from the ascent and descent region of the lower shell 12 and waits until the lower shell 12 is moved down to the disc insertion/ejection position.

If the lower shell 12 descends to the disc insertion/ejection position, the loading arm 201 is driven again to the upper side of the gripping position via the push-back position. Then, if a given optical disc 2 is extruded from the lower shell 12, the loading arm 201 is moved down to the lower side of the gripping position, thereby gripping the outer circumferential surface of the optical disc 2 by using the draw-in surface portions 228 of the engaging claws 226.

The loading arm 201 is slid to the lower side of the draw-in and waiting position, thereby drawing the optical disc 2 into the carrying loader 6 and delivering the optical disc to a transport mechanism of the recording and reproducing apparatus 7. Thereafter, the loading arm 201 is moved up to the upper side of the draw-in and waiting position and separated from the optical disc 2.

If recording or reproducing of the optical disc 2 by the recording and reproducing apparatus 7 is finished and the optical disc 2 is ejected by the transport mechanism, the loading arm 201 descends to the lower side of the draw-in and waiting position, thereby gripping the outer circumferential surface of the optical disc 2 by using the insertion surface portions 227. Next, the loading arm 201 is slid up to the lower side of the push-back position, thereby pushing the optical disc 2 back to the storage position of the lower shell 12.

Thereafter, the loading arm 201 slides to the lower side of the gripping position, then, is moved up to the upper side of the gripping position, and thereafter, is slid to the upper side of the push-back position. In this way, the loading arm 201 can press another optical disc 2 stored adjacent to the transported optical disc 2, thereby returning another optical disc 2 rocked in the insertion/ejection process of the optical disc 2 to the storage position. Therefore, when the upper and lower shells 11 and 12 are confronted with each other again, it is possible to prevent the interference of the central hole 2a of another optical disc 2 with the support shaft 16 due to position displacement of another optical disc 2. In addition, the twice-push process of such a loading arm 201 may also be configured so as to be performed more than two times by controlling the shapes of the slide cam groove 252 and the ascent and descent cam groove 253 of the cam gear 208 or the reverse rotation and the normal rotation of the cam gear 208.

After the twice-push of the optical disc 2, the loading arm 201 is slid to the upper side of the gripping position, thereby being kept in the neutral state, and prepares for the subsequent transport operation.

Here, the recording and reproducing apparatus 7 will be described. As the recording and reproducing apparatus 7 which is disposed below the base deck 210, a recording and reproducing apparatus of a so-called slot-in type in the related art may also be used, and the recording and reproducing apparatus is positioned on placement protrusion pieces 280 of the housing 200. The recording and reproducing apparatus 7 is for performing writing and/or reading of an information signal with respect to the optical disc 2 and includes a transport mechanism which transports the optical disc 2 drawn in by the loading arm 201 to the inside of a receiving apparatus main body and delivers the optical disc 2 to the loading arm 201, a chucking mechanism which rotatably chucks the optical disc 2 transported to the inside of an apparatus main body, and an optical pickup mechanism which performs writing and/or reading of an information signal with respect to the optical disc 2.

The transport mechanism is provided with a plurality of transport arms which transports the optical disc 2 and turned at a height where the recording and reproducing apparatus 7 and the carrying loader 6 are aligned in position with each other, so that the receipt and delivery of the optical disc 2 can be performed between the transport mechanism and the loading arm 201. In addition, the transport mechanism may also be made to have a configuration using a transport roller, besides the configuration using the transport arms.

The chucking mechanism includes a disc table which supports the optical disc 2 drawn in by the transport mechanism, and a spindle motor which rotationally drives the disc table. At the disc table, an engaging protrusion portion which is inserted into the central hole 2a of the optical disc 2 is formed. Also, the disc table is supported so as to be able to move up and down, and if the optical disc 2 is transported thereto, the engaging protrusion portion is inserted into the central hole 2a, thereby holding the optical disc 2. In addition, the chucking mechanism may also be made to have a configuration using a chucking plate which rotatably sandwiches and supports the optical disc 2 between the chucking plate and the disc table.

The optical pickup mechanism includes a pickup base having an optical block which irradiates a signal recording surface of the optical disc 2 with an optical beam emitted from a semiconductor laser which is a light source and condensed by an object lens and detects a return optical beam reflected by the signal recording surface of the optical disc 2 by a light detector constituted by a light sensing element and the like, and is made so as to perform writing or reading of a signal with respect to the optical disc 2.

Also, the optical pickup mechanism is configured such that the pickup base is supported by a pickup moving mechanism, thereby being able to move in the radial direction of the optical disc 2. The pickup moving mechanism includes a pair of guide shafts which supports the pickup base so as to be able to slide in the radial direction of the optical disc 2, and a pickup moving mechanism using a stepping motor provided with a lead screw which moves the pickup base supported by a pair of these guide shafts in the radial direction of the optical disc 2.

In addition, as the recording and reproducing apparatus 7, besides the recording and reproducing apparatus having the configuration described above, all recording and reproducing apparatuses which perform recording and reproducing with respect to the optical disc 2 may also be used.

2-4. Operation of the Disc Changer Apparatus 3

Next, an operation of the disc changer apparatus 3 will be described. First, a state of each section of the disc changer apparatus 3 which is in the state of waiting for the insertion of the disc cartridge 1 is described, next, a process in which the disc cartridge 1 is inserted and the optical disc 2 is ejected from the cartridge main body 10 and transported to the inside of the recording and reproducing apparatus 7 is described, and next a process in which the optical disc 2 is ejected from the recording and reproducing apparatus 7 and transported to the inside of the cartridge main body 10 and the disc cartridge 1 is ejected is described.

In the state of waiting for the insertion of the disc cartridge 1, the cartridge insertion/removal opening 70 of the front panel 63 remains blocked by the bezel 71. Also, in the selection loader 5, initial position detection switches (not shown) disposed at the base plate 155 are inserted into initial position detection holes (not shown) provided at the first backside gear 157 and the second backside gear 158, so that an initial position which waits for the insertion of the disc cartridge 1 is detected, whereby the selection loader remains stopped at the initial position. At this time, the cam plates 82 remain slid to the back face 60b side of the apparatus main body 60 through the gear connection portions 82a meshed with the first backside gear 157 and the second backside gear 158.

In this way, in the cartridge holder 80, the lower holder 91 is moved up and the engaging cam pins 113 are inserted into the holder engaging pieces 100 of the upper holder 90, so that the upper and lower holders 90 and 91 are engaged with each other. Also, in the cartridge holder 80, the upper holder 90 is biased by the tension coil springs 95 provided to extend between the cartridge holder and the holder cover 81, so that the upper and lower holders 90 and 91 are integrally slid to the front face 60a side of the apparatus main body 60 and held at the cartridge insertion/removal position.

In addition, in the cartridge holder 80, the lower holder 91 ascends and the upper and lower holders 90 and 91 are engaged with each other, so that the pushed pieces 126 of the shell positioning pins 117 provided at the lower holder 91 is pushed down by the upper holder 90. In this way, the ascent and descent blocks 125 of the shell positioning pins 117 are pushed down against the biasing forces of the coil springs 129, so that the insertion pins 124 are retreated from the pin holes 123 of the lower holder 91.

Also, in the holder cover 81, the holder latches 142 are turned in the direction of the arrow L by the latch springs 145, so that the hook portions 142a are located above the slide regions of the holder holding pieces 102 of the upper holder 90. Also, the height adjusting plates 120 are biased to the back face 60b side by the spring 166 locked to an erect wall 165 provided in an erect manner at the base plate 155, the cam pin 161a of the adjusting slide plate 161 is guided by the second cam groove 160a of the surface cam gear 160, thereby being slid to the front face 60a side of the apparatus main body 60, and the adjusting springs 162 are turned to the back face 60b side, whereby the height adjusting plates are slid to the back face 60b side of the apparatus main body 60.

Also, in the disc extruding mechanism 85, the cam pin 177 is guided by the third cam groove 160b of the surface cam gear 160, whereby the lever slider 169 is slid in the counter direction to the arrow B direction. In this way, the turning operation piece 175 is pressed to the contact surface 178 of the operating concave portion 176, so that the extrusion lever 167 is turned to the counter direction to the arrow P direction, in which the extrusion lever retreats from the ascent and descent region of the lower shell 12.

Also, in the carrying loader 6, in the state of waiting for the insertion of the disc cartridge 1, initial position detection switches (not shown) disposed at the base deck 210 are inserted into initial position detection holes (not shown) provided at the cam gear 208, so that an initial position which waits for the insertion of the disc cartridge 1 is detected, and the carrying loader remains stopped at the initial position. At this time, the slide plate 206 is biased by the slide biasing spring 207 which is provided to extend between the slide plate and the slide deck 205 and also the slide cam pin 250 is guided by the slide cam groove 252 of the cam gear 208, thereby being slid in the counter direction to the arrow E direction. In this way, in the loading arm 201, the slide arms 203 and 204 are turned by the slide plate 206, whereby the loading arm 201 is slid to the direction of the arrow C in FIG. 32, which is the front face 60a side of the apparatus main body 60.

Also, in the ascent and descent plate 212, the ascent and descent cam pin 266 is guided by the ascent and descent cam groove 253 of the cam gear 208, whereby the ascent and descent plate is slid in the counter direction to the arrow F direction in FIG. 29 against the biasing force of the ascent and descent biasing spring 213 which is provided to extend between the ascent and descent plate and the base deck 210. Then, the ascent and descent cam protrusion portions 267 of the ascent and descent plate 212 is slid in the ascent and descent cam holes 261 in the counter direction to the arrow F direction, so that the ascent and descent guide holes 262 are guided by the ascent and descent guide protrusion portion 272 of the base deck 210, whereby the ascent and descent deck 211 is moved up. By the ascent of the ascent and descent deck 211, the loading arm 201 is moved up in the direction of the arrow D in FIG. 29.

In this way, the loading arm 201 is driven to the upper side of the gripping position which is shown in FIG. 40, and waits for the insertion of the disc cartridge 1. The loading arm 201 is in a neutral state.

Next, a process in which the disc cartridge 1 is inserted into the disc changer apparatus 3 and the optical disc 2 is transported to the recording and reproducing apparatus 7 will be described. The disc cartridge 1 is inserted into the cartridge insertion/removal opening 70 from the front face 10a side of the cartridge main body 10 by the hand of a user or a robot arm. The disc cartridge 1 presses the center bezel 74, thereby turning the center bezel to the back face 60b side of the apparatus main body 60 and also turning the side bezels 75 to the back face 60b side through the center bezel 74.

At this time, in the disc changer apparatus 3, since the turning length of the side bezel 75 to the back face 60b side is short, it is possible to provide the cartridge insertion/removal position on the front face 60a side as far as possible without interfering with the upper shell dividing pieces 103 formed at the upper holder 90 of the cartridge holder 80 held at the cartridge insertion/removal position.

By the insertion of the disc cartridge 1 to the back face 60b side of the apparatus main body 60, in the cartridge holder 80, the upper shell dividing pieces 103 and the lower shell dividing pieces 115 parallel and adjacent to the upper shell dividing pieces 103 enter into the dividing grooves 47 of the cartridge main body 10. Also, if the front face 10a of the cartridge main body 10 comes into contact with the rear side surface 97 of the upper holder 90, the upper and lower holders 90 and 91 of the cartridge holder 80 are integrally slid to the insertion position on the back face 60b side of the apparatus main body 60 against the biasing forces of the tension coil springs 95. At this time, in the cartridge holder 80, the cam pins 101 of the upper holder 90 are guided to the upper cam slits 140 of the holder cover 81 and also the engaging cam pins 113 of the lower holder 91 are guided to the lower cam slits 141 of the holder cover 81 and the horizontal guide portions 150a of the ascent and descent guide grooves 150 formed in the cam plates 82.

In the cartridge holder 80, if the front face 10a of the cartridge main body 10 comes into contact with the rear side surface 97 of the upper holder 90, the unlocking pieces 99 bent and formed at the rear side surface 97 enter into the unlocking holes 22, thereby pressing the pressing surface portions 31b of the front-side locking pieces 31. As a result, the front-side locking pieces 31 are turned in the counter direction to the arrow R direction in FIG. 6 against the biasing forces of the coil springs 35, so that the engaging portions 31c are deviated from the engaged concave portions 56 of the lower shell 12.

Also, in the cartridge holder 80, if the cartridge main body 10 is inserted to the back face 60b side of the apparatus main body 60, the upper shell dividing pieces 103 press the pressing piece portions 33b of the rear-side locking pieces 33 slid to the extension lines of the dividing grooves 47. As a result, the rear-side locking pieces 33 are slid in the counter direction of the arrow S direction in FIG. 6 against the biasing forces of the coil springs 38, so that the engaging portions 33c are deviated from the engaged concave portions 57 of the lower shell 12. Consequently, the cartridge main body 10 can be divided into the upper and lower shells 11 and 12.

Also, the holder holding pieces 102 of the upper holder 90 are locked to the hook portions 142a of the holder latches 142, so that the cartridge holder 80 is held at the insertion position on the back face 60b side of the apparatus main body 60 against the biasing forces of the tension coil springs 95. In addition, at this time, in the cartridge holder 80, the engaging cam pins 113 of the lower holder 91 pass through the preliminary horizontal portions 141c from the lower horizontal portions 141a and are located at the lower vertical portions 141b. Also, at this time, the cartridge holder 80 pushes a cartridge insertion detecting switch SW1 (FIG. 18) provided at the support side surface portion 134 of one side of the holder cover 81, so that the insertion of the disc cartridge 1 is detected.

In addition, in the cartridge holder 80, the upper shell holding convex portions 98 provided at the support surface portion 93 of the upper holder 90 are engaged with the concave portions 21 of the upper shell 11 and also the pressing pieces 104 provided at the upper side surface portions 94 and 94 presses the dividing walls 32 of the upper shell 11. Also, the cartridge holder 80 presses the left and right disc holders 41 and 42 of the lower shell 12 by using the pressing pieces 131 provided at the lower side surface portions 107 of the lower holder 91. As a result, the cartridge holder 80 prevents the rattling of the upper and lower shells 11 and 12.

If the insertion of the disc cartridge 1 is detected by the cartridge insertion detecting switch SW1, the first driving motor 156 is driven, so that the first backside gear 157 and the second backside gear 158 are rotated. If the first backside gear 157 and the second backside gear 158 rotate, the gear connection portions 82a are slid along the guide long-holes 159a. Consequently, a pair of left and right cam plates 82 is slid to the front face 60a side of the apparatus main body 60 in synchronization with each other.

If the cam plates 82 are slid to the front face 60a, the engaging cam pins 113 are slid from the horizontal guide portions 150a of the ascent and descent guide grooves 150 along the ascent and descent guide portions 150b, so that the lower holder 91 is moved down. At this time, the engaging cam pins 113 of the lower holder 91 are guided by the lower vertical portions 141b formed at the lower cam slits 141 of the holder cover 81. As a result, the engaging cam pins 113 are deviated from the slits 100a of the holder engaging pieces 100 of the upper holder 90, so that the lower holder 91 is divided from the upper holder 90. Also, the upper holder 90 is held at the insertion position.

In the upper shell 11, the lower end surfaces of the dividing walls 32 are supported by the upper shell dividing pieces 103 of the upper holder 90 entered into the dividing grooves 47 of the cartridge main body 10. Also, in the lower shell 12, the upper end surfaces of the entry grooves 43 formed in the left and right disc holders 41 and 42 are supported by the lower shell dividing pieces 115 of the lower holder 91 entered into the dividing grooves 47. As a result, the upper shell 11 is supported on the upper holder 90, thereby being held at the insertion position, whereas the lower shell 12 is supported on the lower holder 91. Therefore, if the lower holder 91 is moved down, the lower shell is moved to the disc insertion/ejection position, so that the upper and lower shells 11 and 12 are divided.

In the lower holder 91, a given optical disc 2 designated by a user in advance is moved down up to the disc insertion/ejection position located on the turning locus of the extrusion lever 167. Due to this, in the lower shell 12, the selection and the insertion/ejection of the given optical disc 2 become possible. Then, if the lower holder 91 is moved down to the disc insertion/ejection position, the second driving motor 163 is driven, so that the surface cam gear 160 is rotated. As a result, the adjusting slide plate 161 is slid to the back face 60b side by sliding of the cam pin 161a in the second cam groove 160a of the surface cam gear 160, thereby sliding the height adjusting plate 120 to the front face 60a through the adjusting springs 162. The height adjusting plate 120 makes the adjusting slit 121 formed corresponding to the disc insertion/ejection position be engaged with the height regulating piece 116 of the lower holder 91, thereby precisely regulating the height of the lower holder 91 such that the given optical disc 2 is located at the disc insertion/ejection position (FIG. 20).

In addition, if the lower holder 91 is moved down to the disc insertion/ejection position by the cam plates 82, thereby being separated from the upper holder 90, since the upper holder 90 is separated from the pushed pieces 126 of the shell positioning pins 117, the ascent and descent blocks 125 are slid in the direction of the arrow U by the coil springs 129 (FIG. 24). Due to this, in the lower holder 91, the insertion pins 124 protrude from the pin holes 123, thereby being inserted into the positioning holes 45 of the lower shell 12. Therefore, the lower holder 91 can attain the positioning of the lower shell 12.

Also, if the insertion of the disc cartridge 1 is detected by the cartridge insertion detecting switch SW1, in the carrying loader 6, the cam gear 208 is rotated by the driving motor 209, so that the slide plate 206 and the ascent and descent plate 212 are slid, thereby moving down the loading arm 201 from the upper side of the gripping position and then moving the loading arm to the upper side of the draw-in and waiting position. Due to this, in the carrying loader 6, the loading arm 201 is retreated from the ascent and descent region of the lower holder 91, so that it becomes possible to transport the lower holder 91 to the disc insertion/ejection position.

After the position regulation of the lower holder 91 by the height regulating plate 120, the loading arm 201 moves down from the upper side of the draw-in and waiting position and is then moved to the upper side of the gripping position via the push-back position.

After the loading arm 201 is moved to the upper side of the gripping position, the surface cam gear 160 is further rotated by the second driving motor 163, so that the cam pin 177 which is engaged with the third cam groove 160b slides, whereby the lever slider 169 is slid in the direction of the arrow B in FIG. 24. As a result, the turning operation piece 175 is pressed by the contact surface 178 of one side, which is formed at the operating concave portion 176 of the lever slider 169, so that the extrusion lever 167 is turned in the direction of the arrow P in FIGS. 24 and 25.

The extrusion lever 167 enters from the disc extrusion opening 51 of the lower shell 12 supported on the lower holder 91 into the guide portion 48c of the support groove 48 which supports a given optical disc 2 located at the disc insertion/ejection position, thereby extruding the given optical disc 2. At this time, since the guide portion 48c is formed into a circular arc shape having a locus equal to the turning locus of the extrusion lever 167, as shown in FIG. 26A, the extrusion lever 167 is turned while being supported on the guide portion 48c. Therefore, the extrusion lever 167 is not deviated from the support groove 48 during the turning.

As shown in FIG. 26B, the extrusion lever 167 is slid until the lever slider 169 pushes a lever position detecting switch SW2 mounted on the base plate 155, thereby extruding the optical disc 2 until the central opening 2a is ejected from the disc insertion/ejection opening 50 of the lower shell 12. In this way, the optical disc 2 is ejected up to a position where the optical disc can be gripped by the loading arm 201.

Here, in the disc cartridge 1, the lower shell 12 remains moved down until a given optical disc 2 arrives at the disc insertion/ejection position. Therefore, for example, in the case of discharging the optical disc 2 stored in the uppermost support groove 48, the lower shell 12 is moved down up to a position where the support shaft 16 of the upper shell 11 is retreated from the central hole 2a of the optical disc 2 stored at the top. On the other hand, for example, in the case of discharging the optical disc 2 stored in the support groove 48 of a middle stage or a lower stage, the lower shell 12 is moved down up to a position where the support shaft 16 is retreated from the central hole 2a of the optical disc 2 of the middle stage or the lower stage.

Therefore, into the central hole 2a of another optical disc 2 stored above the given optical disc 2, the support shaft 16 remains inserted. As a result, the support shaft 16 can prevent accompanying ejection in which another optical disc 2 is ejected with the ejection of a given optical disc 2 by the extrusion lever 167, also restrict the rocking of another optical disc 2 during the storage in the selection loader 5, and prevent collision of the support shaft 16 with the peripheral portion of the central hole 2a of another optical disc 2 when the upper and lower shells 11 and 12 are confronted with each other again.

In addition, in this example, in order to make the support shaft 16 be reliably retreated from the central hole 2a of a given optical disc 2 and also prevent interference of the support shaft 16 with the extrusion lever 167, the support shaft 16 retreats also from the central hole 2a of another upper optical disc 2 adjacent to a given optical disc 2 which is inserted or ejected, and is inserted into the central holes 2a of other optical discs 2 stacked and stored more than three sheets thereon. Also, the support shaft 16 retreats also from the central holes 2a of other optical discs 2 stacked below a given optical disc 2. However, other optical discs 2 are restricted at given storage positions by the self-locking spring 53.

After the optical disc 2 is extruded from the disc ejection opening 50 by the extrusion lever 167, the loading arm 201 is moved down from the upper side of the gripping position and grips the rear side in the extrusion direction of the outer circumferential surface of the optical disc 2 by using the draw-in surface portions 228 formed on the lower surfaces 226a of the engaging claws 226. At this time, since the draw-in surface portion 228 has curvature approximately equal to that of the outer circumference of the optical disc 2, the engaging claw 226 comes into contact with the outer circumference of the optical disc 2 along a circular arc shape. Next, the loading arm 201 is moved to the lower side of the draw-in and waiting position, thereby drawing the optical disc 2 into the carrying loader 6 and delivering the optical disc to the transport mechanism of the recording and reproducing apparatus 7. Thereafter, the loading arm 201 is moved up to the upper side of the draw-in and waiting position and stops thereat. In this way, the loading arm 201 is separated from the optical disc 2 and does not impede the rotational driving of the optical disc 2 by the recording and reproducing apparatus 7.

If the optical disc 2 is inserted up to the inside of the recording and reproducing apparatus 7 by the loading arm 201, then, the transport mechanism automatically draws the optical disc 2 into the recording and reproducing apparatus 7. After the optical disc 2 is drawn in, the recording and reproducing apparatus 7 rotatably supports the optical disc 2 by using the chucking mechanism and performs writing and/or reading of an information signal with respect to the optical disc 2 by using the optical pickup mechanism.

Here, by the sliding of the ascent and descent plate 212 in the direction of the arrow F, the ascent and descent deck 211 is moved down, whereby the loading arm 201 moves from the upper side of the gripping position to the lower side of the gripping position where the loading arm grips the outer circumference of the optical disc 2 by using the engaging claws 226. At this time, in the arm driving mechanism 202 of the loading arm 201, if the ascent and decent plate 212 is further slid after the contact of the lower surfaces of the engaging claws 226 with the principal surface of the optical disc 2, excessive pressing of the optical disc 2 by the loading arm 201 is prevented by the ascent and decent limiter mechanism 257 provided at the ascent and decent cam groove 253 of the cam gear 208.

That is, in the arm driving mechanism 202, if the engaging claws 226 come into contact with the optical disc 2, since the descent of the ascent and descent deck 211 and the sliding of the ascent and descent plate 212 are restricted, the ascent and descent cam pin 266 of the ascent and descent plate 212 is not allowed to slide on the side surface of the ascent and descent cam groove 253 according to the rotation of the cam gear 208. Therefore, in the ascent and descent limiter mechanism 257, the retreat space 258 is provided over the range from the side surface of the outer circumferential surface side, in which the ascent and descent cam pin 266 moves in contact therewith, to the support shaft insertion hole 254 side, thereby allowing the ascent and descent cam pin 266 to retreat.

The ascent and descent cam pin 266 retreats to the retreat space 258, so that a driving force of the driving motor 209 which rotates the cam gear 208 is absorbed by extension of the ascent and descent biasing spring 213 provided to extend between the ascent and descent plate 212 and the base deck 210 and it becomes difficult for the driving force to be transmitted to the loading arm 201 and the optical disc 2 through the ascent and descent plate 212 and the ascent and descent deck 211. Therefore, the ascent and descent limiter mechanism 257 can prevent breakage of the loading arm 201 or damage or deformation of the optical disc 2 due to overload which is applied to the loading arm 201 or the optical disc 2.

Next, a process in which the optical disc 2, in which writing or reading of an information signal by the recording and reproducing apparatus 7 has ended, is pushed back to the lower shell 12 and the disc cartridge 1 is ejected from the disc changer apparatus 3 will be described.

The optical disc 2, in which writing or reading of an information signal by the optical pickup mechanism has ended, is ejected from the recording and reproducing apparatus 7 by the transport mechanism after release of the chucking thereof by the chucking mechanism. At this time, the optical disc 2 is ejected up to a position where the central hole 2a is exposed further outside than the recording and reproducing apparatus 7, so that the insertion surface portions 227 of the engaging claws 226 can come into contact with the rear side in the insertion direction into the lower shell 12 of the optical disc.

Also, by this time, in the selection loader 5, the second driving motor 163 and the surface cam gear 160 are rotated in reverse only by a given amount, so that the extrusion lever 167 turns and returns in the counter direction of the arrow P direction, thereby being retreated from the lower shell 12.

If the optical disc 2 is ejected from the recording and reproducing apparatus 7, in the carrying loader 6, the cam gear 208 is driven, thereby moving down the loading arm 201 from the upper side of the draw-in and waiting position to the lower side of the draw-in and waiting position. In this way, the loading arm 201 grips the rear side in the insertion direction into the lower shell 12 of the optical disc 2 by using the insertion surface portions 227 of the engaging claws 226. Next, the loading arm 201 is slid up to the lower side of the push-back position and pushes the optical disc 2 back to the storage position of the lower shell 12.

Figure 43:
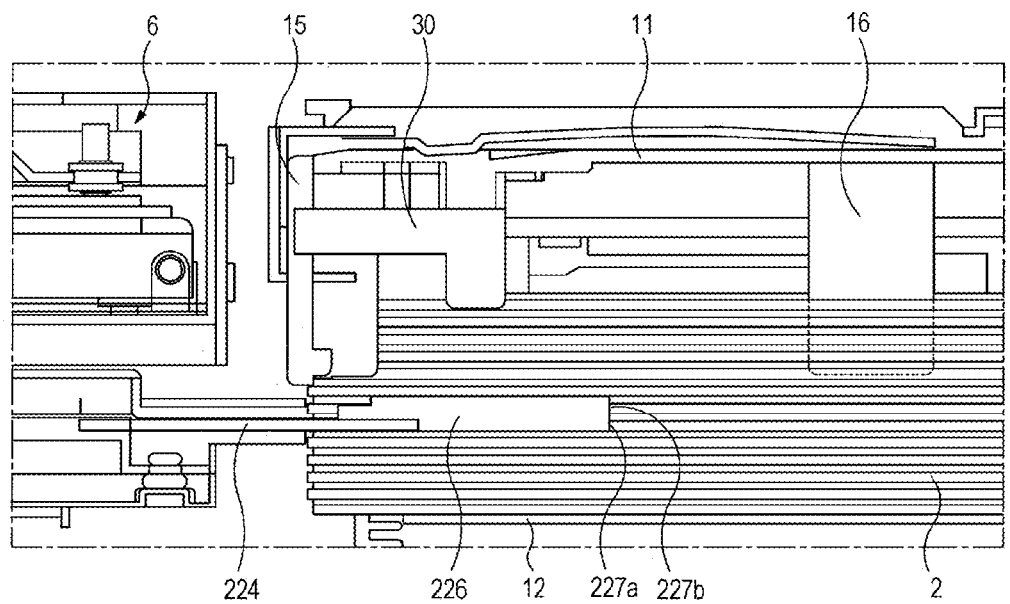
FIG. 43 is a cross-sectional view showing a process of pushing the optical disc back to the lower shell.

At this time, as shown in FIG. 43, the loading arm 201 presses the optical disc 2 by using the pressing portion 227a of the lower region of the insertion surface portion 227 and presses another optical disc 2 stored on one sheet of the optical disc 2 to the storage position by using the regulating portion 227b of the upper region of the insertion surface portion 227. As described above, another optical disc 2 adjacently stored on a given optical disc 2 which is ejected from or inserted into the lower shell 12 is restricted at the storage position only by the self-locking spring 53 without the insertion of the support shaft 16 therein. Therefore, in a case where by any possibility, accompanying ejection occurs in which, when a given optical disc 2 is extruded from the lower shell 12, another optical disc 2 is ejected together, or a case where another optical disc rocks from the storage position during the transport of a given optical disc 2, or the like, another optical disc is restricted at a given storage position by the regulating portion 227b.

Further, after the sliding of the loading arm 201 to the lower side of the push-back position, the loading arm 201 is slid to the upper side of the push-back position via the lower side of the gripping position and the upper side of the gripping position. In this way, the loading arm 201 presses another upper optical disc 2 adjacent to a given optical disc 2 by using the pressing portion 227a, thereby regulating it at the storage position, and also presses another upper optical disc 2 adjacent to another optical disc 2 mentioned above by using the regulating portion 227b, thereby regulating it at the storage position. By going through such a twice-push process, other optical discs 2 stored up to two discs on a given optical disc 2 which is inserted or ejected are restricted at the storage position and position regulation of other optical discs 2 which are stored above a given optical disc 2 and in which the support shaft 16 has retreated is performed.

In addition, the twice-push process of such a loading arm 201 may also be made so as to be performed more than two times by controlling the shapes of the slide cam groove 252 and the ascent and descent cam groove 253 of the cam gear 208 or the reverse rotation and the normal rotation of the cam gear 208. Also, a configuration may also be made such that by controlling the driving of the first and second backside gears 157 and 158 and the cam plates 82 by control of the first driving motor 156 of the selection loader 5, ascent of the lower holder 91 and push-back by the loading arm 201 are alternately performed and position regulation of another optical disc 2 located below a given optical disc 2 is performed.

After the optical disc 2 is pushed back to the inside of the lower shell 12, the loading arm 201 retreats to the upper side of the gripping position and is kept and stops in a neutral state. If the loading arm 201 retreats to the upper side of the gripping position and then retreats from the selection loader 5, in the selection loader 5, the second driving motor 163 and the surface cam gear 160 are further rotated in reverse, and the adjusting slide plate 161 slides to the front face 60a side, thereby sliding the height adjusting plate 120 to the back face 60b side. As a result, the engagement of the adjusting slit 121 of the height adjusting plate 120 with the height regulating piece 116 of the lower holder 91 is released, so that the lower holder 91 can ascend.

Next, in the selection loader 5, the first driving motor 156 and the first and second backside gears 157 and 158 are driven, so that the cam plates 82 are slid to the back face 60b side of the apparatus main body 60.

If the cam plates 82 are slid to the back face 60b side, the engaging cam pins 113 are slid from the ascent and descent guide portions 150b of the ascent and descent guide grooves 150 along the horizontal guide portions 150a, so that the lower holder 91 is moved up. Also at this time, the engaging cam pins 113 of the lower holder 91 are guided to the lower vertical portions 141b formed at the lower cam slits 141 of the holder cover 81. As a result, the engaging cam pins 113 enter into the slits 110a of the holder engaging pieces 100 of the upper holder 90, so that the lower holder 91 is combined with the upper holder 90.

The upper and lower holders 90 and 91 are combined with each other, so that the pushed pieces 126 of the shell positioning pins 117 are pushed down by the upper holder 90, whereby the ascent and descent blocks 125 descends on the ascent and descent shafts 128 against the biasing forces of the coil springs 129. As a result, the insertion pins 124 of the shell positioning pins 117 are retreated from the positioning holes 45 of the lower shell 12 and the pin holes 123 of the lower holder 91.

The upper and lower holders 90 and 91 are combined with each other, so that the upper and lower shells 11 and 12 supported on the upper and lower holders 90 and 91 are also combined with each other. After the combination of the upper and lower holders 90 and 91, the cam plates 82 are further slid to the back face 60b side, so that the spring engaging piece portions 142c of the holder latches 142 are pressed by the latch pressing pieces 152 of the cam plates 82, thereby being turned to the counter direction of the arrow L direction. As a result, the cartridge holder 80 is slid to the front face 60a side of the apparatus main body 60 by the tension coil springs 95, thereby moving to the cartridge insertion/removal position.

By the movement of the cartridge holder 80 to the cartridge insertion/removal position, the back face 10b side is protruded further outside than the cartridge insertion/removal opening 70, so that the cartridge main body 10 can be drawn out. Then, by drawing of the cartridge main body 10 out of the cartridge holder 80, the unlocking pieces 99 provided at the upper holder 90 are retreated from the unlocking holes 22. Therefore, the front-side locking pieces 31 are turned in the direction of the arrow R under the biasing forces of the coil springs 35, thereby making the engaging portions 31c be engaged with the engaged concave portions 56 of the lower shell 12. Also, by drawing of the cartridge main body 10 out of the cartridge holder 80, the upper shell dividing pieces 103 of the upper holder 90 are separated from the pressing piece portions 33b of the rear-side locking pieces 33. Therefore, the rear-side locking pieces 33 slide in the direction of the arrow S under the biasing forces of the coil springs 38, thereby making the engaging portions 33c be engaged with the engaged concave portions 57 of the lower shell 12. As a result, in the cartridge main body 10, the upper and lower shells 11 and 12 are locked to each other.

In addition, in the carrying loader 6, the slide limiter mechanism 255 is formed, and in a case where, when pushing the optical disc 2 back to the lower shell 12, the optical disc 2 enters into adjacent support groove 48, not the support groove 48 which is a storage source, or the like, when the sliding of the loading arm 201 to the push-back position is restricted, so that a load in the counter direction to the slide direction is applied to the slide arms 203 and 204 and the slide plate 206, the slide limiter mechanism allows the load to escape.

As described above, the slide limiter mechanism 255 is constituted by the retreat space 256 which is provided by the slide cam groove 252 over the range from the side surface of the outer circumferential surface side, in which the slide cam pin 250 moves in contact therewith, to the support shaft insertion hole 254 side.

Figure 41A:
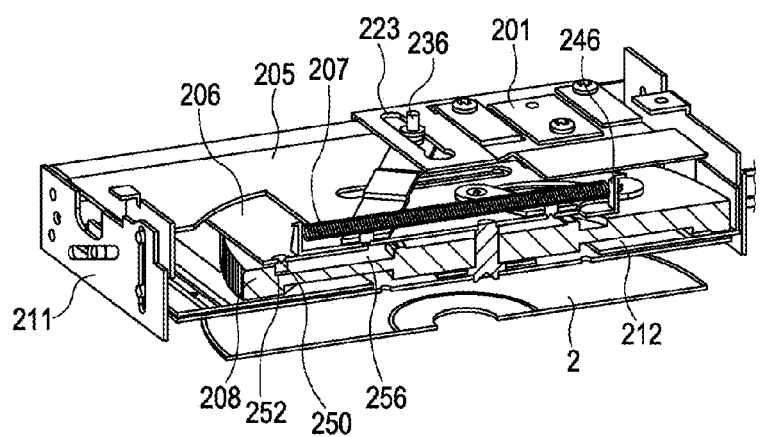
Figure 41B:
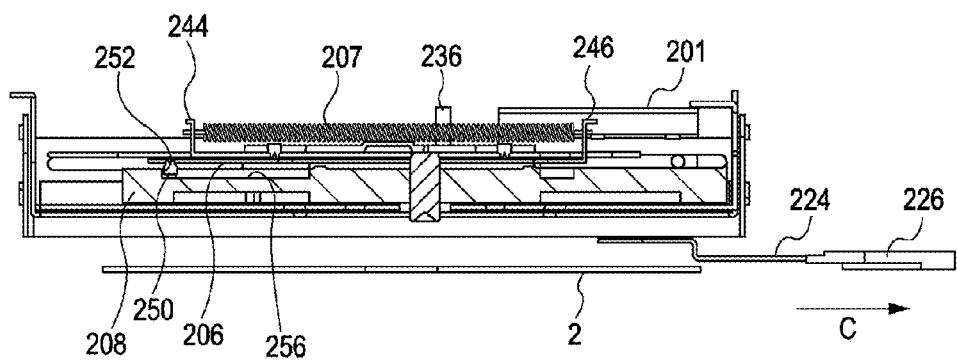

As shown in FIGS. 41A and 41B, in the slide limiter mechanism 255, in a state where the sliding of the loading arm 201 is not restricted, the slide cam pin 250 of the slide plate 206 is slid in the counter direction to the arrow E direction in FIGS. 41A and 41B while moving in contact with the side surface of the outer circumference side of the slide cam groove 252 of the cam gear 208. In the slide arms 203 and 204, by sliding of the side plate 206 in the counter direction to the arrow E direction, the slide pins 236 are turned to the front face 60a side of the apparatus main body 60. In this way, the loading arm 201 is slid in the direction of an arrow C in FIGS. 41A and 41B, in which the loading arm pushes the optical disc 2 back to the inside of the lower shell 12.

Figure 42A:
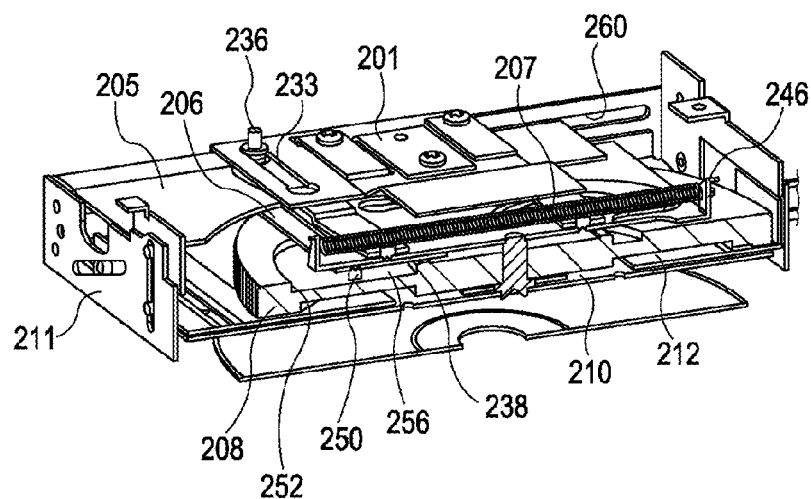
Figure 42B:
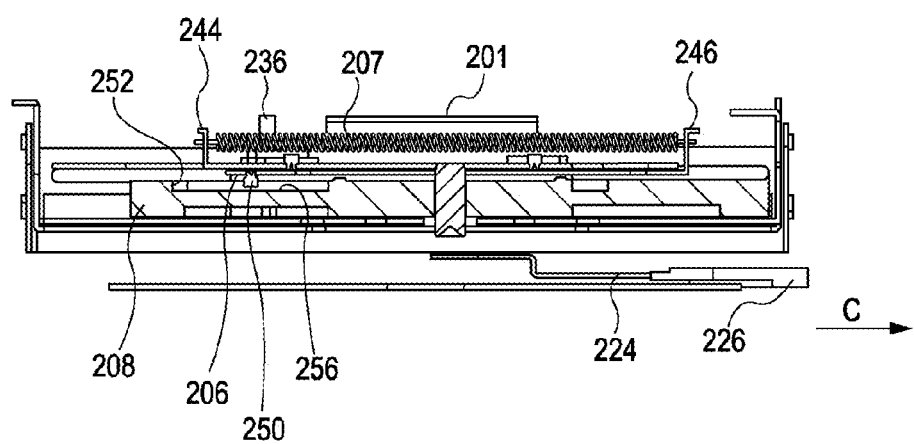

On the other hand, as shown in FIGS. 42A and 42B, if the sliding of the loading arm 201 in the direction of the arrow C is restricted, since the turning of the slide arms 203 and 204 and the sliding of the slide plate 206 in the counter direction to the arrow E direction are restricted, the slide cam pin 250 is not allowed to move in contact with the side surface of the outer circumference side of the slide cam groove 252. At this time, in the slide limiter mechanism 255, since the retreat space 256 is provided over the range from the side surface of the outer circumferential surface side of the slide cam groove 252 to the support shaft insertion hole 254 side, the slide cam pin 250 moves in the retreat space 256. As a result, to the loading arm 201 and the optical disc 2, only a load due to an obstacle regulating the sliding of the loading arm 201 and the extension of the slide biasing spring 207 between the slide deck and the slide plate 206 is applied, and the loading arm 201 is not clamped by the obstacle regulating the sliding of the loading arm 201 and a driving force transmitted from the driving motor 209 through the cam gear 208, so that deformation or the like due to application of an overload can be prevented.

The present application contains subject matter related to that disclosed in Japanese Priority Patent Application JP 2009-261405 filed in the Japan Patent Office on Nov. 16, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc loading mechanism which transports a disc between a disc cartridge, which stores the disc so as to be able to slide in a disc surface direction and in which the disc is inserted or ejected in the surface direction, and a recording and reproducing apparatus, the disc loading mechanism comprising:
    a loading arm with claw members, which come into contact with an outer circumference of the disc, to draw the disc into the recording and reproducing apparatus and to insert the disc into the disc cartridge;
    an arm driving mechanism to slide the loading arm in a transport direction of the disc;
    a disc extruding lever to extrude the disc up to a position where the claw members can come into contact with the disc, at a time of ejection of the disc; and
    a lever driving mechanism to drive the disc extruding lever, wherein each of the claw members includes a draw-in surface portion, which comes into contact with a rear side in an extrusion direction of the outer circumference of the disc extruded by the disc extruding lever, at a time of the drawing of the disc into the recording and reproducing apparatus, and an insertion surface portion which is provided at the opposite side to the draw-in surface portion and comes into contact with a rear side in an insertion direction of the outer circumference of the disc at a time of the insertion of the disc into the disc cartridge.

2. The disc loading mechanism according to claim 1, wherein the arm driving mechanism includes:
- a slide arm to slide the loading arm, a slide deck member which supports the slide arm,
- a slide plate which is slidably supported on the slide deck member and engaged with the slide arm with the slide deck member interposed therebetween,
- a slide biasing spring which is provided to extend between the slide deck member and the slide plate, thereby biasing the slide plate to the slide deck member, a cam gear in which a slide cam portion, with which a slide cam pin provided protruding from the slide plate is engaged, is formed and which slides the slide plate with respect to the slide deck member against a biasing force of the slide biasing spring, and
- a driving motor which drives the cam gear, and
- the slide cam portion has a slide limiter mechanism, wherein when the slide arm is subjected to a load in a counter direction to a slide direction, the slide limiter mechanism allows the load to escape.

3. The disc loading mechanism according to claim 2, wherein the slide limiter mechanism is constituted by providing the slide cam portion with a retreat space, in which the slide cam pin is retreated by extension of the slide biasing spring.

4. The disc loading mechanism according to claim 2 or 3, wherein the slide cam portion drives the slide plate and the slide arm so as to press the outer circumference of the disc more than once by the insertion surface portion of each of the claw members when inserting the disc into the disc cartridge.

5. The disc loading mechanism according to any one of claim 1, wherein
- the disc cartridge stores in a stacked state a plurality of the discs parallel to a principal surface of the cartridge main body, and
- in each of the claw members, the draw-in surface portion comes into contact with an upper surface side of the disc extruded by the extrusion lever and the insertion surface portion comes into contact also with a disc adjacent to the disc which is inserted into the disc cartridge.

6. The disc loading mechanism according to claim 2 or 3, wherein:
- the arm driving mechanism includes an ascent and descent deck member, which is connected to the loading arm and moves the loading arm up and down, an ascent and descent plate which is slidably engaged with an ascent and descent cam groove provided at the ascent and descent deck member and is slidably supported on a base deck with the ascent and descent deck member interposed therebetween, and an ascent and descent biasing spring which is provided to extend between the ascent and descent plate and the base deck, thereby biasing the ascent and descent plate to the cam gear,
- the ascent and descent plate includes an ascent and descent cam pin which is engaged with an ascent and descent cam portion provided at the cam gear, and moves the ascent and descent deck member up and down by sliding of the ascent and descent cam pin on the ascent and descent cam portion, and
- the ascent and descent cam portion comprises an ascent and descent limiter mechanism, wherein when the ascent and descent deck member is subjected to a load in a counter direction to an ascent and descent direction, the ascent and descent limiter mechanism allows the load to escape.

7. The disc loading mechanism according to claim 6, wherein the ascent and descent limiter mechanism is constituted by providing the ascent and descent cam portion with a retreat space, in which the ascent and descent cam pin is retreated by extension of the ascent and descent biasing spring.

8. The disc loading mechanism according to claim 7, wherein by rotation of the cam gear in one direction, the slide cam pin moves in contact with the slide cam portion and the ascent and descent cam pin moves in contact with the ascent and descent cam portion, whereby the slide plate and the ascent and descent plate operate the loading arm in conjunction with each other.

* * * * *